United States Patent
Masuda et al.

(10) Patent No.: US 7,694,218 B2
(45) Date of Patent: Apr. 6, 2010

(54) INFORMATION PROCESSING APPARATUS, METHOD THEREFOR, AND COMPUTER-READABLE MEMORY

(75) Inventors: Ryuichi Masuda, Tokyo (JP); Takafumi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1280 days.

(21) Appl. No.: 09/948,618

(22) Filed: Sep. 10, 2001

(65) Prior Publication Data

US 2002/0087602 A1    Jul. 4, 2002

(30) Foreign Application Priority Data

| Sep. 13, 2000 | (JP) | ............................. 2000-278293 |
| Sep. 20, 2000 | (JP) | ............................. 2000-285803 |
| Sep. 21, 2000 | (JP) | ............................. 2000-287595 |

(51) Int. Cl.
G06F 17/00    (2006.01)

(52) U.S. Cl. .................... 715/230; 715/231; 715/255

(58) Field of Classification Search ............... 715/530, 715/500, 513, 501.1, 522, 512, 230–234, 715/200, 205, 209, 248, 255, 225; 709/206, 709/227

See application file for complete search history.

(56) References Cited

U.S. PATENT DOCUMENTS

| 5,557,515 | A | * | 9/1996 | Abbruzzese et al. ............ 705/9 |
| 5,802,381 | A | * | 9/1998 | Matsumoto et al. ......... 715/517 |
| 5,950,215 | A | * | 9/1999 | Tabuchi ....................... 715/515 |
| 5,987,165 | A | * | 11/1999 | Matsuzaki et al. ........... 382/162 |
| 6,028,603 | A | * | 2/2000 | Wang et al. .................. 715/776 |
| 6,035,323 | A | * | 3/2000 | Narayen et al. ............. 709/201 |
| 6,154,755 | A | * | 11/2000 | Dellert et al. ................ 715/526 |
| 6,246,411 | B1 | * | 6/2001 | Strauss ........................ 715/863 |
| 6,301,586 | B1 | * | 10/2001 | Yang et al. ............... 707/104.1 |
| 6,393,441 | B1 | * | 5/2002 | Kanerva et al. ............. 715/514 |
| 6,499,016 | B1 | * | 12/2002 | Anderson .................... 704/275 |
| 6,509,974 | B1 | * | 1/2003 | Hansen ....................... 358/1.12 |
| 6,538,760 | B1 | * | 3/2003 | deBry et al. ................ 358/1.15 |
| 6,549,922 | B1 | * | 4/2003 | Srivastava et al. ........... 707/205 |
| 6,631,205 | B1 | * | 10/2003 | Melen et al. ................. 382/154 |
| 6,782,387 | B1 | * | 8/2004 | Kumashio ..................... 707/10 |
| 2002/0054059 | A1 | * | 5/2002 | Schneiderman ............. 345/700 |

(Continued)

FOREIGN PATENT DOCUMENTS

| JP | 6096077 | 4/1994 |
| JP | 7249032 | 9/1995 |
| WO | 9932982 | 7/1999 |

OTHER PUBLICATIONS

U.S. Appl. No. 09/387,567, filed Sep. 1, 1999.
U.S. Appl. No. 09/384,427, filed Aug. 27, 1999.

(Continued)

*Primary Examiner*—Thu Huynh
(74) *Attorney, Agent, or Firm*—Fitzpatrick, Cella, Harper & Scinto

(57) ABSTRACT

A plurality of kinds of electronic source documents are held, and an electronic binder builder selects a desired electronic source document page from electronic source document pages of the plurality of kinds of held electronic source documents. Based on the selected electronic source document page, an integrated electronic document is composed, and page relation between pages in the electronic source document having electronic source document pages constituting the integrated electronic document and pages in a converted integrated electronic document of electronic source document pages constituting the converted integrated electronic document with the integrated electronic document converted into a predetermined file format is managed.

7 Claims, 41 Drawing Sheets

U.S. PATENT DOCUMENTS

2002/0191213 A1* 12/2002 Laverty et al. .............. 358/1.15
2006/0082820 A1* 4/2006 Anderson et al. .......... 358/1.15

OTHER PUBLICATIONS

Gruber et al., "Model-based virtual document generation", Int. J. Human Computer Studies (1997), pp. 687-706 (XP-002515230).

Paradis et al., "A Virtual Document Interpreter for Reuse of Information", EP98 Saint-Malo, Apr. 1998 (provisional paper; Jul. 23, 1997) (XP-002515231).

Ranwez et al., "Conceptual Documents and Hypertext Documents are two Different Forms of Virtual Document" (XP-002515232).

* cited by examiner

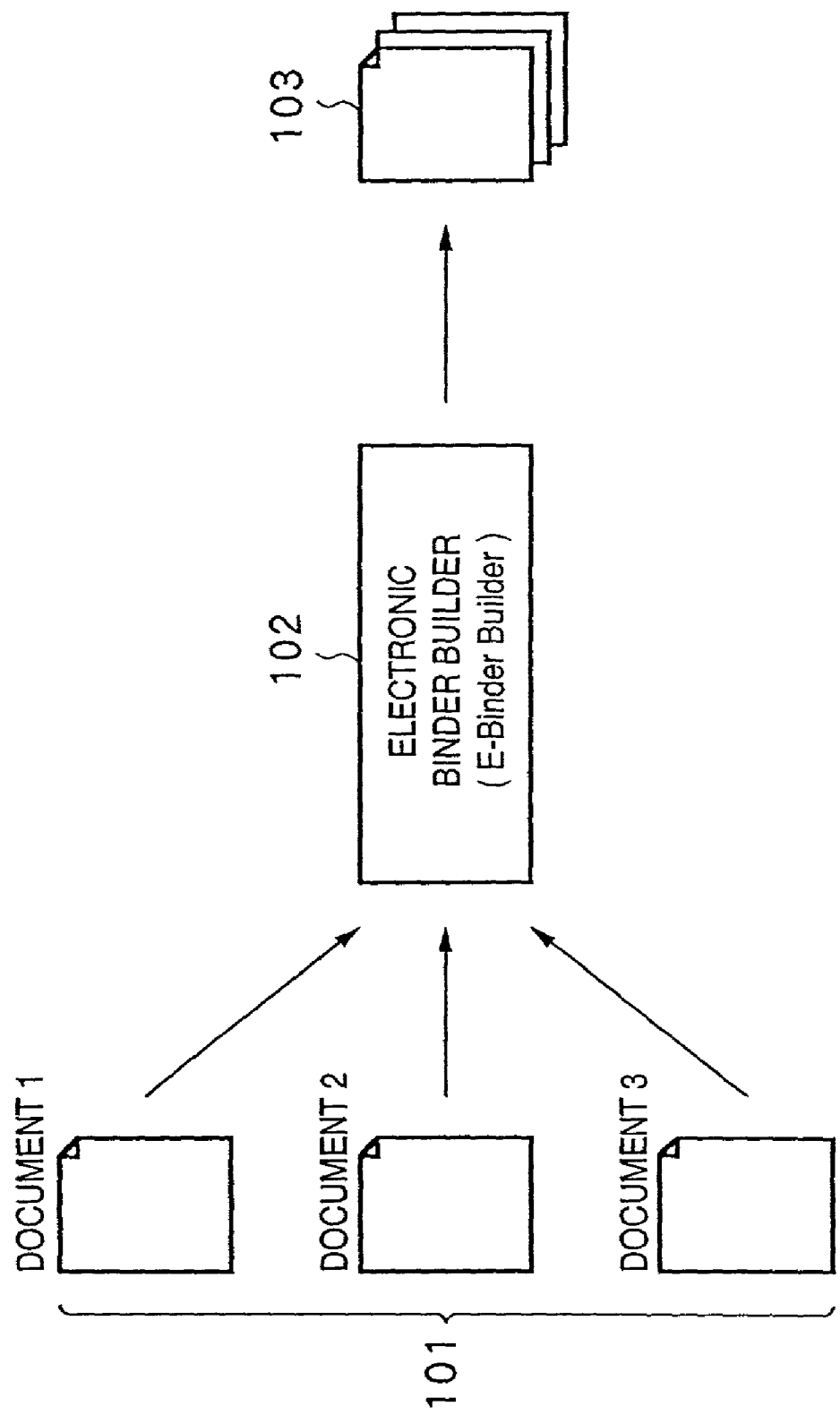

FIG. 2B

```xml
<?xml version="1.0"encoding="Shift_JIS"?>
<EBINDER>
 <EBINDER_INFO>
  <TITLE>PAF</TITLE>
  <CREATOR>Taro Suzuki</CREATOR>
  <CREATOR>Jun Tanaka</CREATOR>
  <CREATOR>Ichiro Sato</CREATOR>
  <DATE>1999-07-28</DATE>
 </EBINDER>_INFO>
 <MATERIAL files="2">
  <EFILEhref="Materialef0001¥Original¥F_c01.ppt"
    composedpagefile="Material¥ef0001¥ef0001.pdf"
    type="pdf"totalpage="2"id="ef0001">
   <EFILE_INFO datatype="PowerPoint2000">
     <TITLE>Sample PowerPoint</TITLE>
     <CREATOR>Jun Suzuki</CREATOR>
   </EFILE_INFO>
   <EPAGES>
      <EPAGE page="1"thumbnail="Material¥ef0001¥thumb1.bmp"/>
      <EPAGE page="2"thumbnail="Material¥ef0001¥thumb2.bmp"/>
   </EPAGES>
  </EFILE>
  <EFILE href="Material¥ef0002¥Original¥HTML.doc"
     composedpagefile="Material¥ef0002.pdf" type="pdf"totalpage="3"
     id="ef0002">
   <EFILE_INFO datatype="Word2000">
    <TITLE>HTML</TITLE>
    <CREATOR>Foo inc.</CRETOR>
   </EFILE_INFO>
   <DOC_SUMMARY>about HTML news</DOC_SUMMARY>
   <EPAGES>
      <EPAGE page="1"thumbnail="Material¥ef0002¥thumb1.bmp"/>
      <EPAGE page="2"thumbnail="Material¥ef0002¥thumb2.bmp"/>
      <EPAGE page="3"thumbnail="Material¥ef0002¥thumb3.bmp"/>
   </EPAGES>
  </EFILE>
 </MATERIAL>
 <PAGEINDEX>
    <INDEX page="1"idref="ef0002"efilepage="3"/>
    <INDEX page="2"idref="ef0002"efilepage="2"/>
    <INDEX page="3"idref="ef0002"efilepage="2"/>
 </PAGEINDEX>
 <BOOKBINDING href="Bookbinding¥bind.tiff"type="tiff">
    <BPAGE page="1"thumbnail="Bookbinding¥page1.png"/>
    <BPAGE page="2"thumbnail="Bookbinding¥page2.png"/>
    <BPAGE page="3"thumbnail="Bookbinding¥page3.png"/>
 </BOOKBINDING>
</EBINDER>
```

FIG. 2C

```xml
<?xml version="1.0" encoding="Shift_JIS"
    xmlns='http://www.eanon.co.jp/EBINDER'?>
<EBINDER>
 <EBINDER_INFO>
   <rdf:RDF
     xmlns:rdf="http://www.w3.org/...-rdf-syntax-ns"
     xmlns:rdfs="http://www.w3.org/TR/...-schema"
     xmlns:dc="http://purl.org/dc/elements/1.0/"
     xmlns:ebindermetadata="http://www.w3.org/...">
     <rdf:Description about=""
       dc:title="PAF"
       dc:description="various PAF specification"
       dc:publisher="Ganon Inc."
       dc:date="1999-07-28"
       dc:format="xml/ebinder"
       dc:language="en">
       <dc:creator>
         <rdf:Bag>
           <rdf:li>Taro Yamada</rdf:li>
           <rdf:li>Jun Suzuki</rdf:li>
         </rdf:Bag>
       </dc:creator>
       <ebindmetadate:CreateProgram application="GanoBureau"/>
     </rdf:Desciption>
   </rdf:RDF>
 </EBINDER_INFO>
 <MATERIAL files="2">
   <EFILE original="Material¥ef0001¥Original¥F_c01.ppt"
     composedfile="Material¥ef0001.pdf"
     type="pdf"totalpage="2"id="ef0001">
     <EFILE_INFO datatype="PowerPoint2000">
       <rdf:RDF
         xmlns:rdf="http://www.w3.org/...-rdf-syntax-ns"
         xmlns:rdfs="http://www.w3.org/TR/...-schema"
         xmlns:dc="http://purl.org/dc/elements/1.0/">
         <rdf:Description about=""
           dc:title="Sample PowerPoint"
           dc:creator="Taro Yamada"
         </rdf:Description>
       </rdf:RDF>
     </EFILE_INFO>
     <EPAGES>
       <EPAGE page="1"thumbnail="Material¥ef0001¥thumb1.bmp"/>
     </EPAGES>
     <EPAGES>
       <EPAGE page="2"thumbnail="Material¥ef0001¥thumb2.bmp"/>
     </EPAGES>
   </EFILE>
   <EFILE original="Material¥ef0002¥Original¥Sample1.doc"
     composedfile="Material¥ef0002.pdf"type="pdf"totalpage="3"id="ef0002">
     <EFILE_INFO datatype="Word2000">
       <rdf:RDF
         xmlns:rdf="http://www.w3.org/...-rdf-syntax-ns"
         xmlns:rdfs="http://www.w3.org/TR/...-schema"
         xmlns:dc="http://purl.org/dc/elements/1.0/">
         <rdf:Description about=""
           dc:title="HTML"
           dc:creator="Ganon Inc."
         </rdf:Description>
       </rdf:RDF>
     </EFILE_INFO>
     <DOC_SUMMARY>HTMLについて</DOC_SUMMARY>
     <EPAGES>
       <EPAGE page="1"thumbnail="Material¥ef0003¥thumb1.bmp"/>
     </EPAGES>
     <EPAGES>
       <EPAGE page="2"thumbnail="Material¥ef0002¥thunb2.bmp"/>
     </EPAGES>
     <EPAGES>
       <EPAGE page="3"thumbnail="Material¥ef0002¥thumb3.bmp"/>
     </EPAGES>
   </EFILE>
 </MATERIAL>
</EBINDER>
```

FIG. 3C

```xml
<?xml version="1.0" encoding="Shift_JIS"?>
<EBINDER>
 <EBINDER_INFO>
  <TITLE>PAF                </TITLE>
  <CREATOR>Taro Yamada</CREATOR>
  <CREATOR> Jun Suzuki</CREATOR>
  <DATE>1999-07-28</DATE>
 </EBINDER_INFO>
 <MATERIAL files="2>
  <EFILE href="Material\ef0001\Original\F_c01.ppt"
    composedpagefile="Material\ef0001.pdf"
    type="pdf"totalpage="2"id="ef0001">
   <EFILE_INFO datatype="PowerPoint2000">
    <TITLE>Sample PowerPoint</TITLE>
    <CREATOR>Jun Suzuki</CREATOR>
   </EFILE_INFO>
   <EPAGES>
    <EPAGE page="1"thumbnail="Material\ef0001\thumb1.bmp"/>
   </EPAGES>
   <EPAGES>
    <EPAGE page="2"thumbnail="Material\ef0001\thumb2.bmp"/>
   </EPAGES>
  </EFILE>
  <EFILE href="Material\ef0002\Original\Sample1.doc"
     composedpagefile="Material\ef0002.pdf"type="pdf"totalpage="3"
     id="ef0002">
   <EFILE_INFO datatype="Word2000">
    <TITLE>HTML</TITLE>
    <CREATOR>Ganon Inc.</CREATOR>
   </EFILE_INFO>
   <DOC_SUMMARY>HTML    </DOC_SUMMARY>
   <EPAGES>
    <EPAGE page="1"thumbnail="Material\ef0002\thumb1.bmp"/>
   </EPAGES
   <EPAGES>
    <EPAGE page="2"thumbnail="Material\ef0002\thumb2.bmp"/>
   </EPAGES>
   <EPAGES>
    <EPAGE page="3"thumbnail="Material\ef0002\thumb3.bmp"/>
   </EPAGES>
  </EFILE>
 </MATERIAL>
 <PAGEINDEX>
  <INDEX page="1"idref="ef0002"efilepage="3"/>
  <INDEX page="2"idref="ef0001"efilepage="2"/>
  <INDEX page="3"idref="ef0002"efilepage="2"/>
 </PAGEINDEX>
 <BOOKBINDING href="Bookbinding\bind.pdf"type="pdf">
  <BPAGE page="1"thumbnail="Bookbinding\page1.png"/>
  <BPAGE page="2"thumbnail="Bookbinding\page2.png"/>
  <BPAGE page="3"thumbnail="Bookbinding\page3.png"/>
 </BOOKBINDING>
</EBINDER>
```

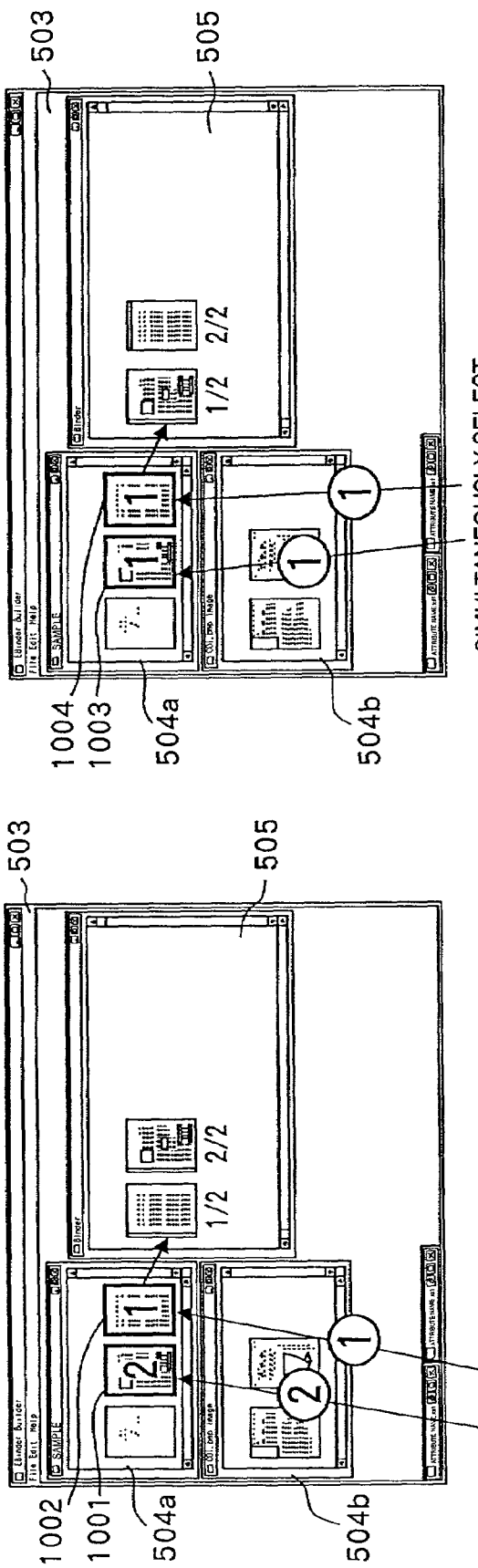
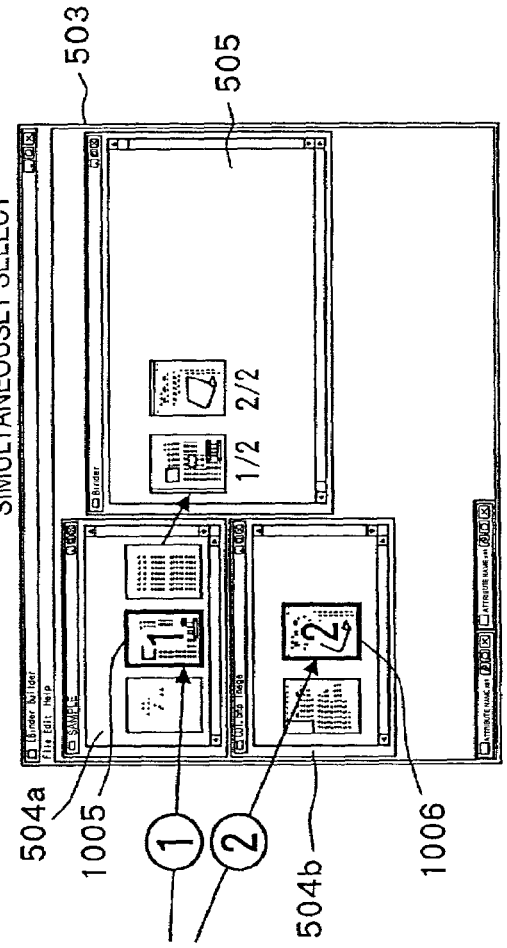

FIG. 12
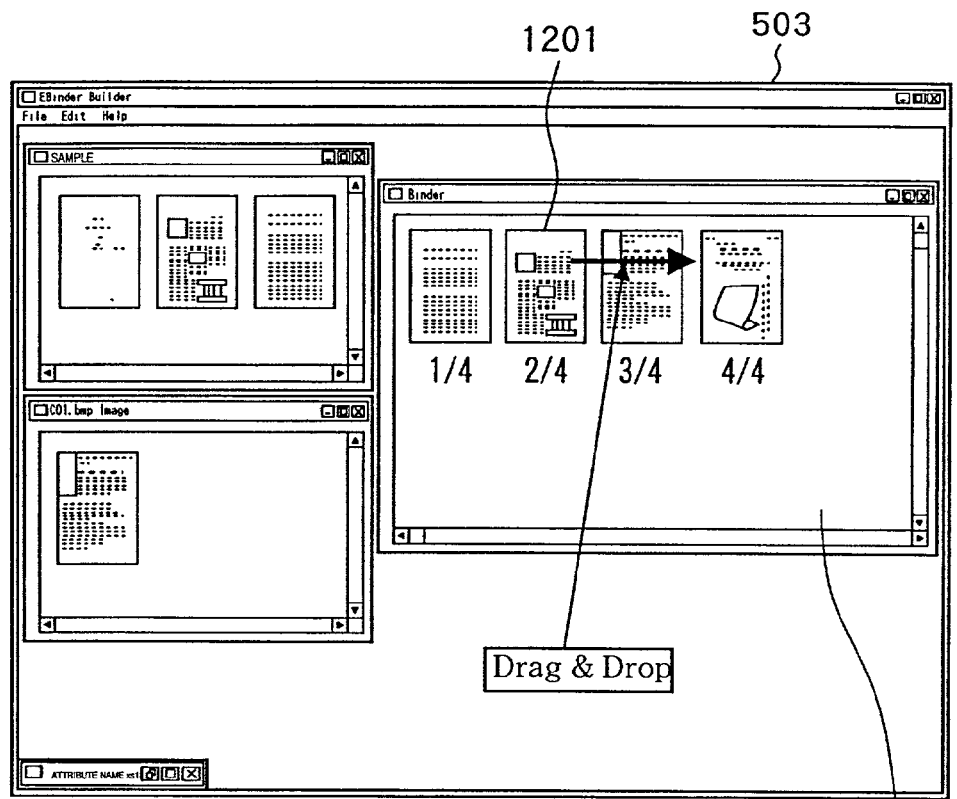
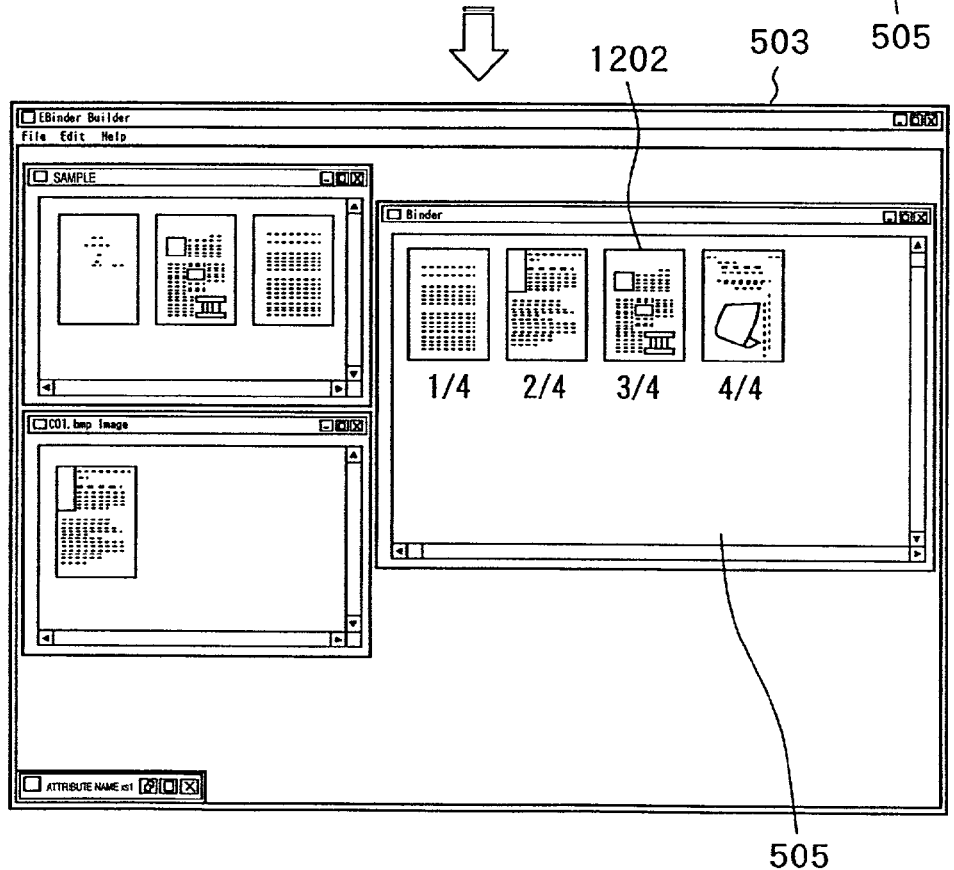

FIG. 13
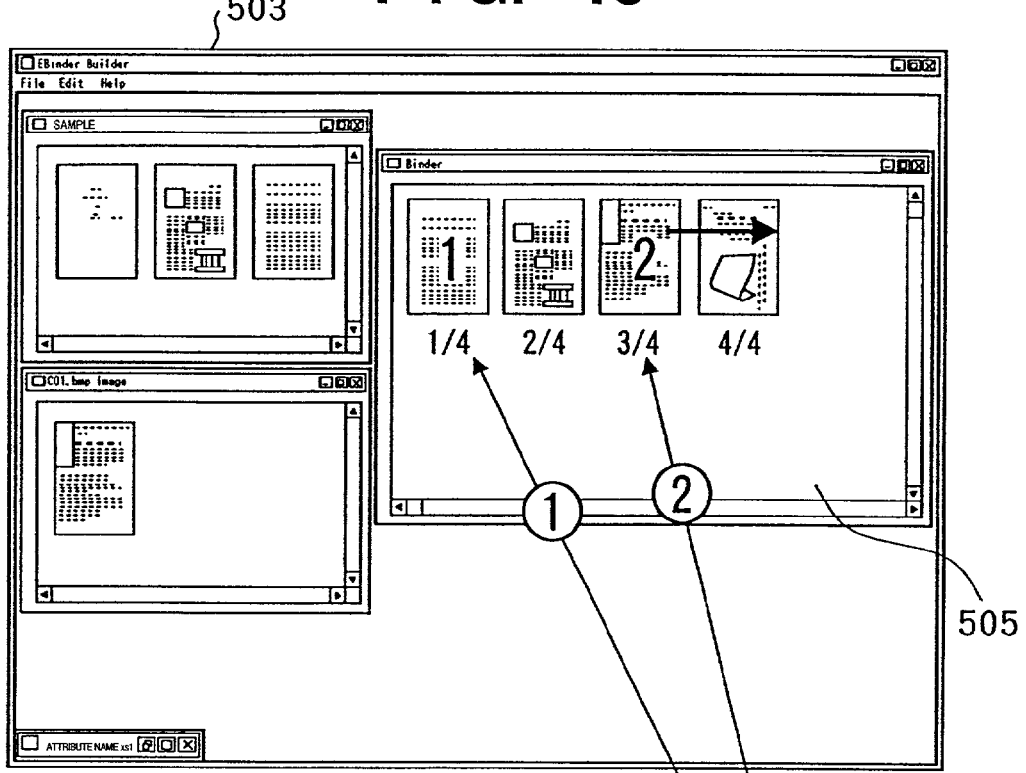
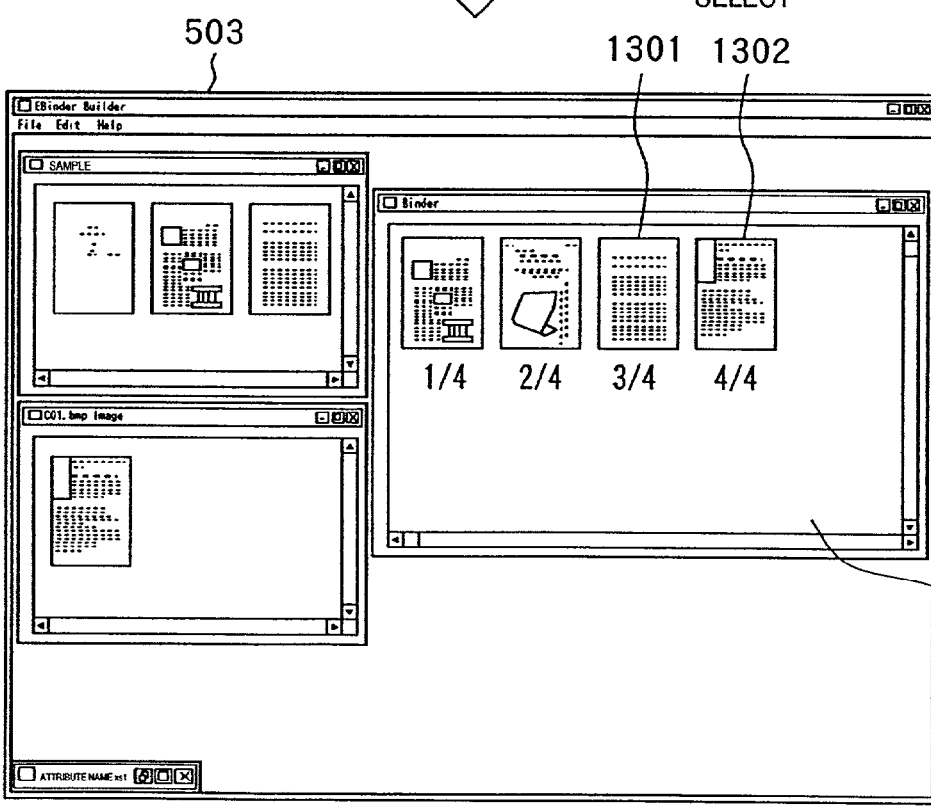

FIG. 16
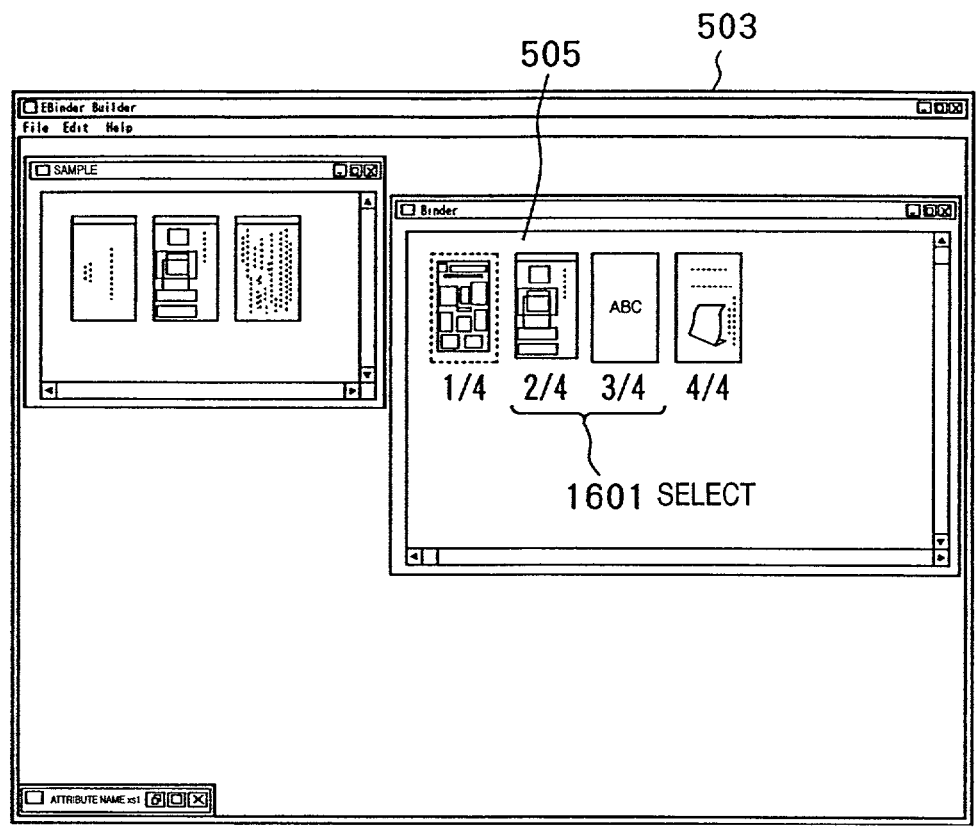
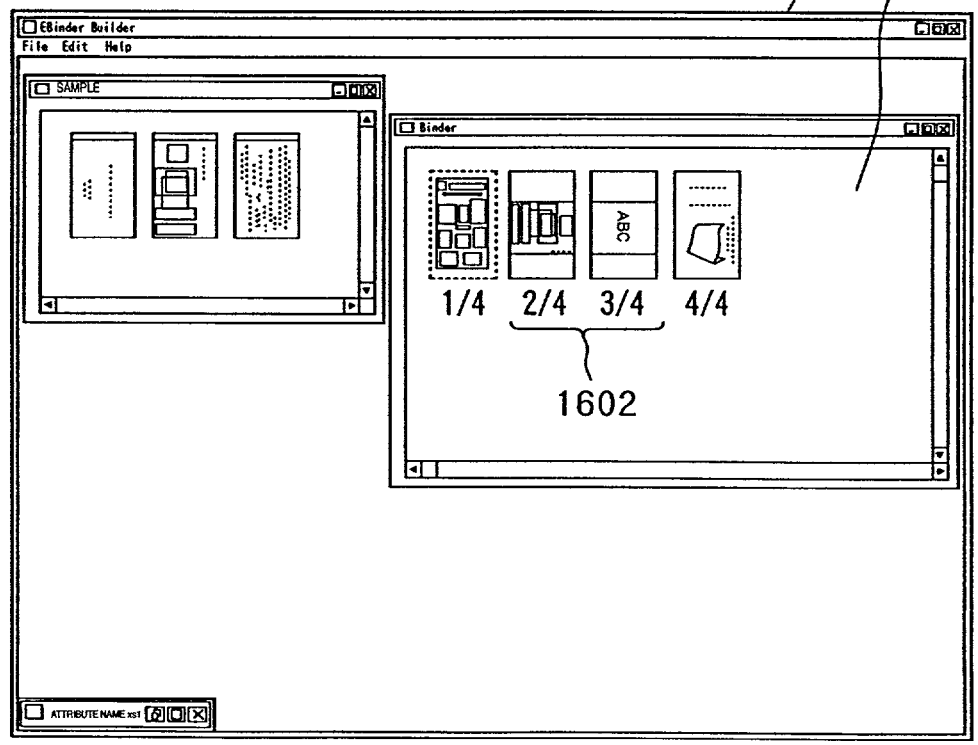

FIG. 17
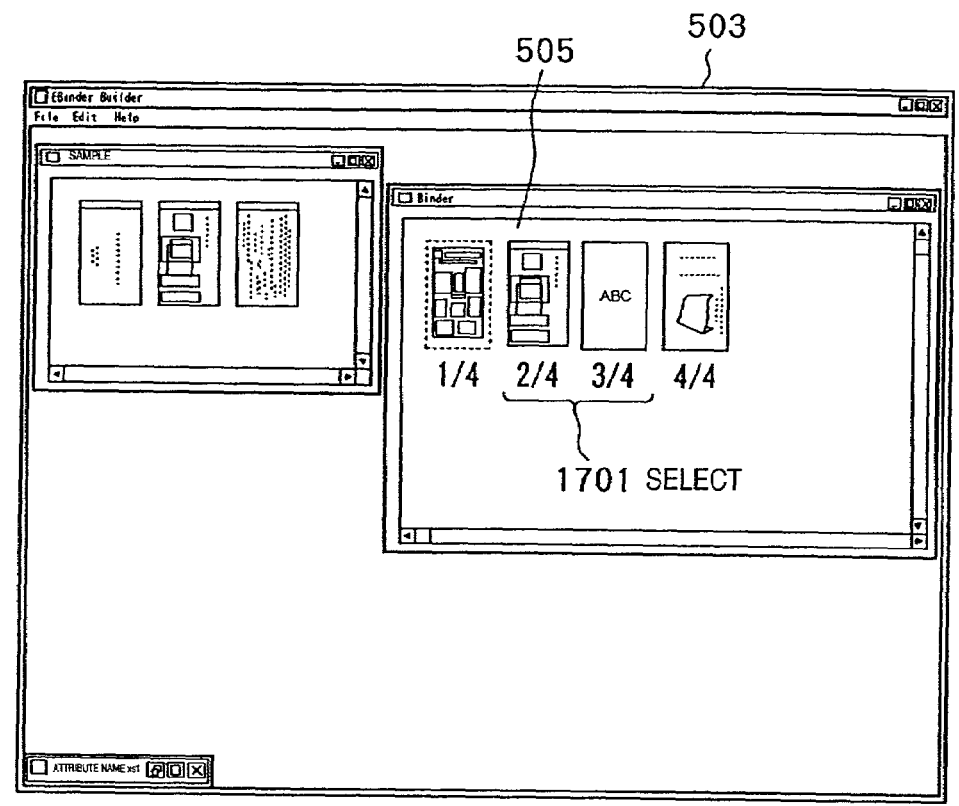
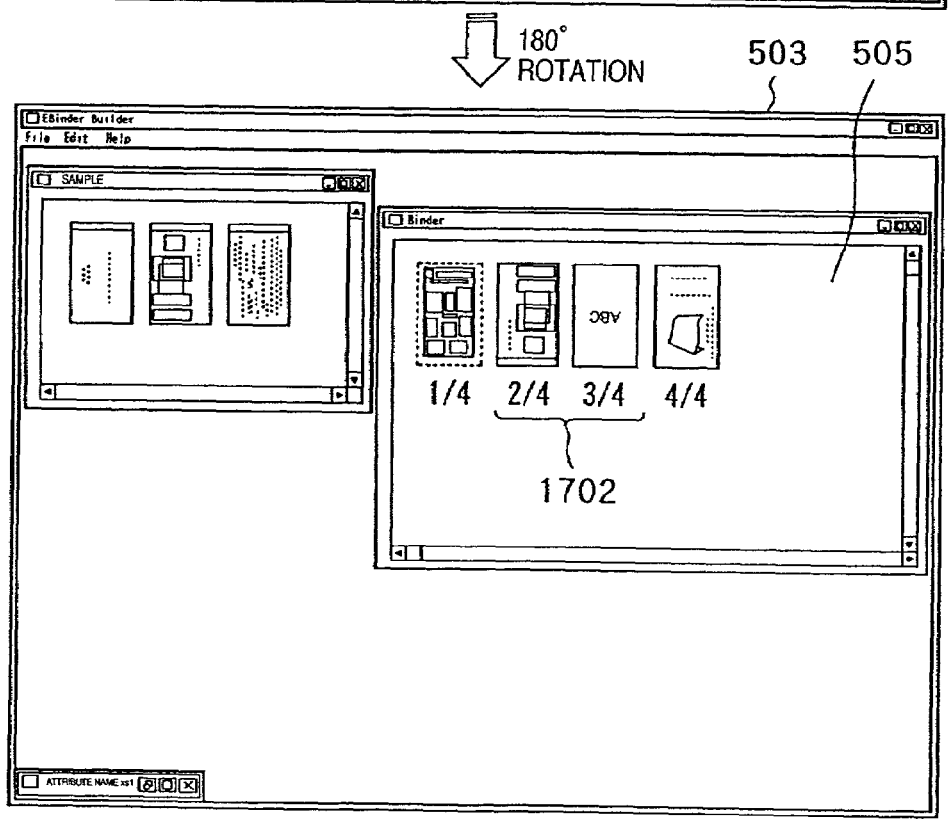

F I G. 20A
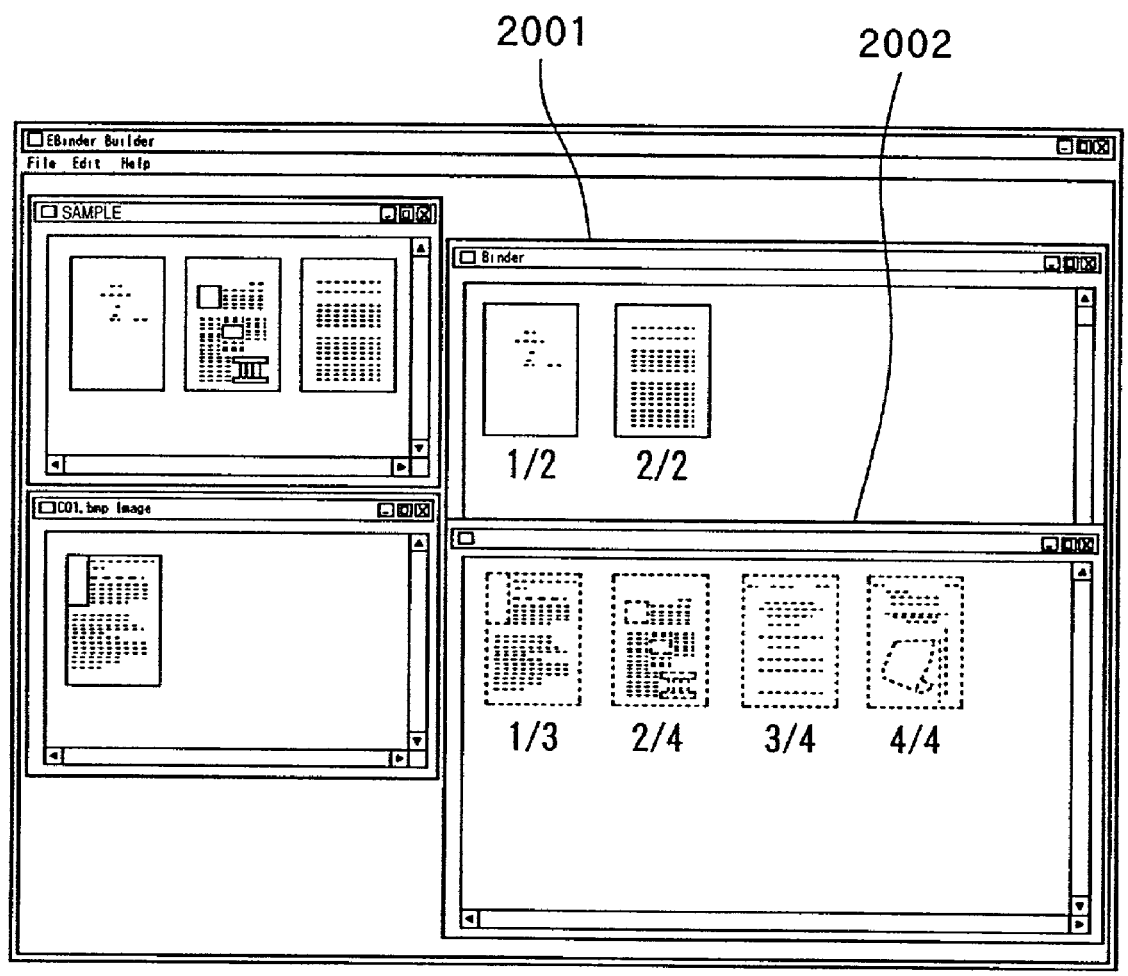

FIG. 25

```xml
<?xml version="1.0" encoding="Shift_JIS"?>
<EBINDER>
 <EBINDER_INFO>
   <TITLE>PAF          </TITLE>
   <CREATOR>Taro Yamada</CREATOR>
   <CREATOR>Jun Suzuki</CREATOR>
   <DATE>1999-07-28</DATE>
 </EBINDER_INFO>
```
2601 ———
```xml
 <MATERIAL files="2">
   <EFILE href="Material\ef0001\Original\F_c01.ppt"
      composedpagefile="Material\ef0001.pdf"
      type="pdf"totalpage="2"id="ef0001">
     <EFILE_INFO datatype="PowerPoint2000">
       <TITLE>Sample PowerPoint</TITLE>
       <CREATOR>Jun Suzuki</CREATOR>
```
2602 ———
```xml
     </EFILE_INFO>
```
2603 ———
```xml
     <ANNOTATIONS>
       <ANNOTATION href="Material\ef0001\Annotation\an0001.tiff"
          type="tiff"page="all"/>
     </ANNOTATIONS>
     <EPAGES>
       <EPAGE page="1"thumbnail="Material\ef0001\thumb1.bmp"/>
     </EPAGES>
     <EPAGES>
       <EPAGE page="2"thumbnail="Material\ef0001\thumb2.bmp"/>
     </EPAGES>
```
2604 ———
```xml
   </EFILE>
   <EFILE href="Material\ef0002\Original\Sample1.doc"
      composedpagefile="Material\ef0002.pdf"type="pdf"totalpage="3"
      id="ef0002">
     <EFILE_INFO datatype="Word2000">
       <TITLE>HTML</TITLE>
       <CREATOR>Ganon Inc.</CREATOR>
     </EFILE_INFO>
```
2605 ———
```xml
     <DOC_SUMMARY>HTML     </DOC_SUMMARY>
     <ANNOTATIONS>
```
2606 ———
```xml
       <ANNOTATION href="Material\ef0002\Annotation\an0002p0001.bmp"
          type="bmp"page="1"/>
```
2607 ———
```xml
       <ANNOTATION href="Material\ef0002\Annotation\an0002p0003.bmp"
          type="bmp"page="3"/>
     </ANNOTATIONS>
     <EPAGES>
       <EPAGE page="1"thumbnail="Material\ef0002\thumb1.bmp"/>
       <EPAGE page="2"thumbnail="Material\ef0002\thumb2.bmp"/>
       <EPAGE page="3"thumbnail="Material\ef0002\thumb3.bmp"/>
     </EPAGES>
   </EFILE>
 </MATERIAL>
</EBINDER>
```

FIG. 27

```xml
<?xml version="1.0" encoding="Shift_JIS"?>
<EBINDER>
 <EBINDER_INFO>
   <TITLE>PAF          </TITLE>
   <CREATOR>Taro Yamada</CREATOR>
   <CREATOR>Jun Suzuki</CREATOR>
   <DATE>1999-07-28</DATE>
 </EBINDER_INFO>
 <MATERIAL files="2>
   <EFILE href="Material¥ef0001¥Original¥F_c01.ppt"
     composedpagefile="Material¥ef0001.pdf"
     type="pdf"totalpage="2"id="ef0001">
    <EFILE_INFO datatype="PowerPoint2000">
      <TITLE>Sample PowerPoint</TITLE>
      <CREATOR>Jun Suzuki</CREATOR>
    </EFILE_INFO>
    <EPAGES>
      <EPAGE page="1"thumbnail="Material¥ef0001¥thumb1.bmp"/>
    </EPAGES>
    <EPAGES>
      <EPAGE page="2"thumbnail="Material¥ef0001¥thumb2.bmp"/>
    </EPAGES>
   </EFILE>
   <EFILE href="Material¥ef0002¥Original¥Sample1.doc"
       composedpagefile="Material¥ef0002.pdf"type="pdf"totalpage="3"
       id="ef0002">
    <EFILE_INFO datatype="Word2000">
      <TITLE>HTML</TITLE>
      <CREATOR>Ganon Inc.</CREATOR>
    </EFILE_INFO>
    <DOC_SUMMARY>HTML     </DOC_SUMMARY>
    <EPAGES>
      <EPAGE page="1"thumbnail="Material¥ef0002¥thumb1.bmp"/>
      <EPAGE page="2"thumbnail="Material¥ef0002¥thumb2.bmp"/>
      <EPAGE page="3"thumbnail="Material¥ef0002¥thumb3.bmp"/>
    </EPAGES>
   </EFILE>
 </MATERIAL>
 <PAGEINDEX>
   <INDEX page="1"idref="ef0002"efilepage="3"/>
   <INDEX page="2"idref="ef0001"efilepage="2"/>
   <INDEX page="3"idref="ef0002"efilepage="2"/>
 </PAGEINDEX>
 <BOOKBINDING href="Bookbinding¥bind.pdf"type="pdf">
   <BPAGE page="1"thumbnail="Bookbinding¥page1.png"/>
   <BPAGE page="2"thumbnail="Bookbinding¥page2.png"/>
   <BPAGE page="3"thumbnail="Bookbinding¥page3.png"/>
 </BOOKBINDING>
 <ANNOTATIONS>
   <ANNOTATION href="Annotation¥annotation.tiff"type="tiff"page="all"/>
 </ANNOTATIONS>
</EBINDER>
```

2901 — </BOOKBINDING>
2902 — </EBINDER>

FIG. 28

```
<?xml version="1.0" encoding="Shift_JIS"?>
<EBINDER>
 <EBINDER_INFO>
  <TITLE>PAF         </TITLE>
  <CREATOR>Taro Yamada</CREATOR>
  <CREATOR>Jun Suzuki</CREATOR>
  <DATE>1999-07-28</DATE>
 </EBINDER_INFO>
 <MATERIAL files="2">
  <EFILE href="Material\ef0001\Original\F_c01.ppt"
    composedpagefile="Material\ef0001.pdf"
    type="pdf"totalpage="2"id="ef0001">
   <EFILE_INFO datatype="PowerPoint2000">
    <TITLE>Sample PowerPoint</TITLE>
    <CREATOR>Jun Suzuki</CREATOR>
   </EFILE_INFO>
   <EPAGES>
    <EPAGE page="1"thumbnail="Material\ef0001\thumb1.bmp"/>
   </EPAGES>
   <EPAGES>
    <EPAGE page="2"thumbnail="Material\ef0001\thumb2.bmp"/>
   </EPAGES>
  </EFILE>
  <EFILE href="Material\ef0002\Original\Sample1.doc"
      composedpagefile="Material\ef0002.pdf"type="pdf"totalpage="3"
      id="ef0002">
   <EFILE_INFO datatype="Word2000">
    <TITLE>HTML</TITLE>
    <CREATOR>Ganon Inc.</CREATOR>
   </EFILE_INFO>
   <DOC_SUMMARY>HTML    /DOC_SUMMARY>
   <EPAGES>
    <EPAGE page="1"thumbnail="Material\ef0002\thumb1.bmp"/>
    <EPAGE page="2"thumbnail="Material\ef0002\thumb2.bmp"/>
    <EPAGE page="3"thumbnail="Material\ef0002\thumb3.bmp"/>
   </EPAGES>
  </EFILE>
 </MATERIAL>
 <PAGEINDEX>
  <INDEX page="1"idref="ef0002"efilepage="3"/>
  <INDEX page="2"idref="ef0001"efilepage="2"/>
  <INDEX page="3"idref="ef0002"efilepage="2"/>
 </PAGEINDEX>
 <BOOKBINDING href="Bookbinding\bind.pdf"type="pdf">
  <BPAGE page="1"thumbnail="Bookbinding\page1.png"/>
  <BPAGE page="2"thumbnail="Bookbinding\page2.png"/>
  <BPAGE page="3"thumbnail="Bookbinding\page3.png"/>
 </BOOKBINDING>              ← 3001
 <ANNOTATIONS>
  <ANNOTATION href="Annotation\annotation1.bmp"type="bmp"page="1"/>
  <ANNOTATION href="Annotation\annotation3.bmp"type="bmp"page="3"/>
 </ANNOTATIONS>              ← 3002
</EBINDER>
```

FIG. 30

```
<?xml version="1.0" encoding="Shift_JIS"?>
<EBINDER>
 <EBINDER_INFO>
   <TITLE>PAF          </TITLE>
   <CREATOR>Taro Yamada</CREATOR>
   <CREATOR>Jun Suzuki</CREATOR>
   <DATE>1999-07-28</DATE>
 </EBINDER_INFO>
 <MATERIAL files="2>
3203 ─── <EFILE href="Material¥ef0001¥Original¥F_c01.ppt"
     composedpagefile="Material¥ef0001.pdf"
     type="pdf"totalpage="2"id="ef0001">
   <EFILE_INFO datatype="PowerPoint2000">
    <TITLE>Sample PowerPoint</TITLE>
    <CREATOR>Jun Suzuki</CREATOR>
3205 ─── </EFILE_INFO>
3206 ─── <ANNOTATIONS>
       <ANNOTATION href="Material¥ef0001¥Annotation¥an0001.tiff"
         type="tiff"page="all"/>
    </ANNOTATIONS>
    <EPAGES>
     <EPAGE page="1"thumbnail="Material¥ef0001¥thumb1.bmp"/>
    </EPAGES>
    <EPAGES>
     <EPAGE page="2"thumbnail="Material¥ef0001¥thumb2.bmp"/>
3204   </EPAGES>
   </EFILE>
   <EFILE href="Material¥ef0002¥Original¥Sample1.doc"
     composedpagefile="Material¥ef0002.pdf"type="pdf"totalpage="3"
     id="ef0002">
    <EFILE_INFO datatype="Word2000">
     <TITLE>HTML</TITLE>
     <CREATOR>Ganon Inc.</CREATOR>
    </EFILE_INFO>
3207 ─── <DOC_SUMMARY>HTML     </DOC_SUMMARY>
3208 ─── <ANNOTATIONS>
       <ANNOTATION href="Material¥ef0002¥Annotation¥an0002p0001.bmp"
         type="bmp"page="1"/>
3209 ─── <ANNOTATION href="Material¥ef0002¥Annotation¥an0002p0003.bmp"
         type="bmp"page="3"/>
    </ANNOTATIONS>
    <EPAGES>
     <EPAGE page="1"thumbnail="Material¥ef0002¥thumb1.bmp"/>
     <EPAGE page="2"thumbnail="Material¥ef0002¥thumb2.bmp"/>
     <EPAGE page="3"thumbnail="Material¥ef0002¥thumb3.bmp"/>
    </EPAGES>
   </EFILE>
  </MATERIAL>
3202 ─── <PAGEINDEX>
      <INDEX page="1"idref="ef0002"efilepage="3"/>
3201 ─── <INDEX page="2"idref="ef0001"efilepage="2"/>
      <INDEX page="3"idref="ef0002"efilepage="2"/>
  </PAGEINDEX>
  <BOOKBINDING href="Bookbinding¥bind.pdf"type="pdf">
   <BPAGE page="1"thumbnail="Bookbinding¥page1.png"/>
   <BPAGE page="2"thumbnail="Bookbinding¥page2.png"/>
   <BPAGE page="3"thumbnail="Bookbinding¥page3.png"/>
  </BOOKBINDING>
</EBINDER>
```

FIG. 31

```xml
<?xml version="1.0" encoding="Shift_JIS"?>
<EBINDER>
 <EBINDER_INFO>
  <TITLE>PAF          </TITLE>
  <CREATOR>Taro Yamada</CREATOR>
  <CREATOR>Jun Suzuki</CREATOR>
  <DATE>1999-07-28</DATE>
 </EBINDER_INFO>
 <MATERIAL files="2">
  <EFILE href="Material\ef0001\Original\F_c01.ppt"
     composedpagefile="Material\ef0001.pdf"
     type="pdf"totalpage="2"id="ef0001">
   <EFILE_INFO datatype="PowerPoint2000">
    <TITLE>Sample PowerPoint</TITLE>
    <CREATOR>Jun Suzuki</CREATOR>
   </EFILE_INFO>
   <ANNOTATIONS>
    <ANNOTATION href="Material\ef0001\Annotation\an0001.tiff"
       type="tiff"page="all"/>
   </ANNOTATIONS>
   <EPAGES>
    <EPAGE page="1"thumbnail="Material\ef0001\thumb1.bmp"/>
   </EPAGES>
   <EPAGES>
    <EPAGE page="2"thumbnail="Material\ef0001\thumb2.bmp"/>
   </EPAGES>
  </EFILE>
  <EFILE href="Material\ef0002\Original\Sample1.doc"
     composedpagefile="Material\ef0002.pdf"type="pdf"totalpage="3"
     id="ef0002">
   <EFILE_INFO datatype="Word2000">
    <TITLE>HTML</TITLE>
    <CREATOR>Ganon Inc.</CREATOR>
   </EFILE_INFO>
   <DOC_SUMMARY>HTML     </DOC_SUMMARY>
   <ANNOTATIONS>
    <ANNOTATION href="Material\ef0002\Annotation\an0002p0001.bmp"
       type="bmp"page="1"/>
    <ANNOTATION href="Material\ef0002\Annotation\an0002p0003.bmp"
       type="bmp"page="3"/>
   </ANNOTATIONS>
   <EPAGES>
    <EPAGE page="1"thumbnail="Material\ef0002\thumb1.bmp"/>
    <EPAGE page="2"thumbnail="Material\ef0002\thumb2.bmp"/>
    <EPAGE page="3"thumbnail="Material\ef0002\thumb3.bmp"/>
   </EPAGES>
  </EFILE>
 </MATERIAL>
 <PAGEINDEX>
  <INDEX page="1"idref="ef0002"efilepage="3"/>
  <INDEX page="2"idref="ef0001"efilepage="2"/>
  <INDEX page="3"idref="ef0002"efilepage="2"/>
 </PAGEINDEX>
 <BOOKBINDING href="Bookbinding\bind.pdf"type="pdf">
  <BPAGE page="1"thumbnail="Bookbinding\page1.png"/>
  <BPAGE page="2"thumbnail="Bookbinding\page2.png"/>
  <BPAGE page="3"thumbnail="Bookbinding\page3.png"/>
 </BOOKBINDING>
 <ANNOTATIONS>
  <ANNOTATION href="Annotation\annotation1.bmp"
     type="bmp"page="1"/>
  <ANNOTATION href="Annotation\annotation2.bmp"
     type="bmp"page="2"/>
 </ANNOTATIONS>
</EBINDER>
```

3301 → (ANNOTATIONS block at bottom)

INFORMATION PROCESSING APPARATUS, METHOD THEREFOR, AND COMPUTER-READABLE MEMORY

FIELD OF THE INVENTION

The present invention relates to an information processing apparatus for composing an integrated electronic document from a plurality of kinds of electronic source documents, a method therefor, and a computer-readable memory.

BACKGROUND OF THE INVENTION

Business entities try to promote reuse of documents by introducing a document management system. Products at early stage receive a paper document as an image using a scanner and registers and saves the image. Recently, many electronic documents are created by personal computers, and even they can also be registered and saved. In addition, recently, arbitrary pages can be extracted from a plurality of registered electronic documents and bound like a binder to form one electronic document. This will be referred to as an electronic binder hereinafter.

Conventionally, however, when documents composed by selecting only required partial documents from a plurality of electronic source documents (application files and scan images) are managed with electronic binders, these selected partial documents are managed as converted and generated documents generated in such a manner that they are converted into unified predetermined file formats defined in advance (image file formats, PDF formats, MultiPage TIFF formats). Therefore, if one wants to delete a part of the converted and generated electronic document and thereafter bring back the deleted part, the converted and generated electronic document should be recomposed using a partial document including the deleted part before being managed with the electronic binder.

To realize such an electronic binder, conventionally, a plurality of different electronic documents are temporarily converted into a unitary electronic document format, and the converted electronic documents are edited to compose a desired generated electronic document. In this method, new electronic documents, which are completely separated from electronic source documents as materials, are edited to compose a generated electronic document. When the electronic source documents are changed, the changed electronic source documents are temporarily deleted from the generated electronic document, and then the changed electronic source documents are input again.

At this time, when a plurality of generated electronic documents, for example, generated electronic documents for sales, planning and development are created from one and the same electronic source document, relation of the electronic source document with the generated electronic documents cannot be managed, and therefore if the electronic source document is changed, all the generated electronic documents having the electronic source document as a component must be modified one by one, which leads to much expense in time and effort. There is also a disadvantage that oversights are likely to be caused and failures in modification frequently occur.

Furthermore, annotation information to be attached to the conventional electronic binder can be attached to each of the electronic document in the material (electronic source document) constituting the electronic binder and the generated electronic document generated by binding the electronic source document, but the annotation information has no relation with each other. Therefore, in the case where the generated electronic document is composed of the electronic source document to which annotation information has already been attached, and annotation information is further added to this generated electronic document, for example, the each annotation information should be managed separately, even though the file format of the annotation information attached to the electronic source document for composition and the format of the annotation information that is further attached to the generated electronic document are identical to each other.

Also, if the generated electronic document is composed using as an image the electronic source document with annotation information attached thereto, the annotation information will have relation only with the image. Therefore, when the generated electronic document is composed with an image newly created by changing the electronic source document, for example, the annotation information attached to the pre-change electronic source document before it is changed cannot be incorporated in the post-change electronic source document.

SUMMARY OF THE INVENTION

The present invention has been made in consideration of the above situation, and has its first object to provide an information processing apparatus capable of creating one integrated electronic document from a plurality of different electronic source documents, and easily editing the electronic document while maintaining relation between the electronic source documents and the integrated electronic document, a method therefor, and a computer-readable memory. Also, the present invention has second object to provide an information processing apparatus capable of creating a plurality of integrated electronic documents having a common electronic source document, and easily editing the electronic document while maintaining relation between the common electronic source document and the plurality of integrated electronic documents, a method therefor, and a computer-readable memory.

Also, the present invention has third object to provide an information processing apparatus capable of creating one integrated electronic document from a plurality of different electronic source documents with annotation information attached thereto, and easily editing the electronic document while maintaining relation between the annotation information attached to the electronic source document and annotation information newly added/further added to the integrated electronic document, a method therefor, and a computer-readable memory.

According to the present invention, the first object is attained by providing an information processing apparatus for composing an integrated electronic document composed of a plurality of kinds of electronic source documents, comprising:

holding means for holding the plurality of kinds of electronic source documents;

selection means for selecting a desired electronic source document page from electronic source document pages of the plurality of kinds of electronic source documents held by said holding means; and composition means for composing the integrated electronic document on the basis of the electronic source document page selected by said selection means;

wherein said composition means manages page relation between pages in the electronic source document having electronic source document pages constituting said integrated electronic document and pages in a converted integrated electronic document of electronic source document pages constituting the converted integrated electronic document with the integrated electronic document converted into a predetermined file format.

According to the present invention, the second object is attained by providing an information processing apparatus for composing an integrated electronic document composed of a plurality of kinds of electronic source documents, comprising:

holding means for holding the plurality of kinds of electronic source documents;

selection means for selecting a desired electronic source document page from electronic source document pages of the plurality of kinds of electronic source documents held by said holding means;

composition means for composing the integrated electronic document on the basis of the electronic source document page selected by said selection means;

managing means for managing page relation between pages in the integrated electronic document of electronic source document pages constituting each of said plurality of integrated electronic documents and pages in the electronic source document having the electronic source document pages as components;

editing means for editing each page of the integrated electronic document; and control means for controlling the composition of each of said plurality of integrated electronic documents on the basis of the editing result of said editing means, referring to the page relation managed by said managing means.

According to the present invention, the third object is attained by providing an information processing apparatus for composing an integrated electronic document composed of a plurality of kinds of electronic source documents, comprising:

holding means for holding said plurality of kinds of electronic source documents with annotation information attached thereto;

selection means for selecting a desired electronic source document page from electronic source document pages of the plurality of kinds of electronic source documents held by said holding means; and composition means for composing an integrated electronic document including control information for controlling attachment of said annotation information, on the basis of the electronic source document pages selected by said selection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a view showing the concept of a document management system that is applied in each embodiment of the present invention;

FIG. 2B is a view showing an example of XML description of the generated electronic document composed by the electronic binder builder of the first embodiment;

FIG. 2C is a view showing an example of XML description when an RDF is used as meta information of the generated electronic document composed by the electronic binder builder of the first embodiment;

FIG. 3C is a view showing an example of XML description of the generated electronic document of FIG. 3B of the first embodiment;

FIG. 10A is a view showing still another operation example of the electronic binder builder of the first embodiment;

FIG. 10B is a view showing still another operation example of the electronic binder builder of the first embodiment;

FIG. 10C is a view showing still another operation example of the electronic binder builder of the first embodiment;

FIG. 12 is a view showing still another operation example of the electronic binder builder of the first embodiment;

FIG. 13 is a view showing still another operation example of the electronic binder builder of the first embodiment;

FIG. 16 is a view showing still another operation example of the electronic binder builder of the first embodiment;

FIG. 17 is a view showing still another operation example of the electronic binder builder of the first embodiment;

FIG. 20A is a view showing still an operation example of the electronic binder builder of the second embodiment;

FIG. 25 is a view showing an example of XML description of the electronic source document of FIG. 24 of the third embodiment;

FIG. 27 is a view showing an example of XML description of the generated electronic document of FIG. 26 of the third embodiment;

FIG. 28 is a view showing an example of another XML description of the generated electronic document of FIG. 26 of the third embodiment;

FIG. 30 is a view showing an example of XML description of the generated electronic document obtained through the processes of FIGS. 29A and 29B of the third embodiment;

FIG. 31 is a showing an example of XML description of the generated electronic document obtained through the processes of FIG. 29 of the third embodiment;

DETAILED DESCRIPTION OF THE PREFERRED EMBODIMENTS

Figure 2A:
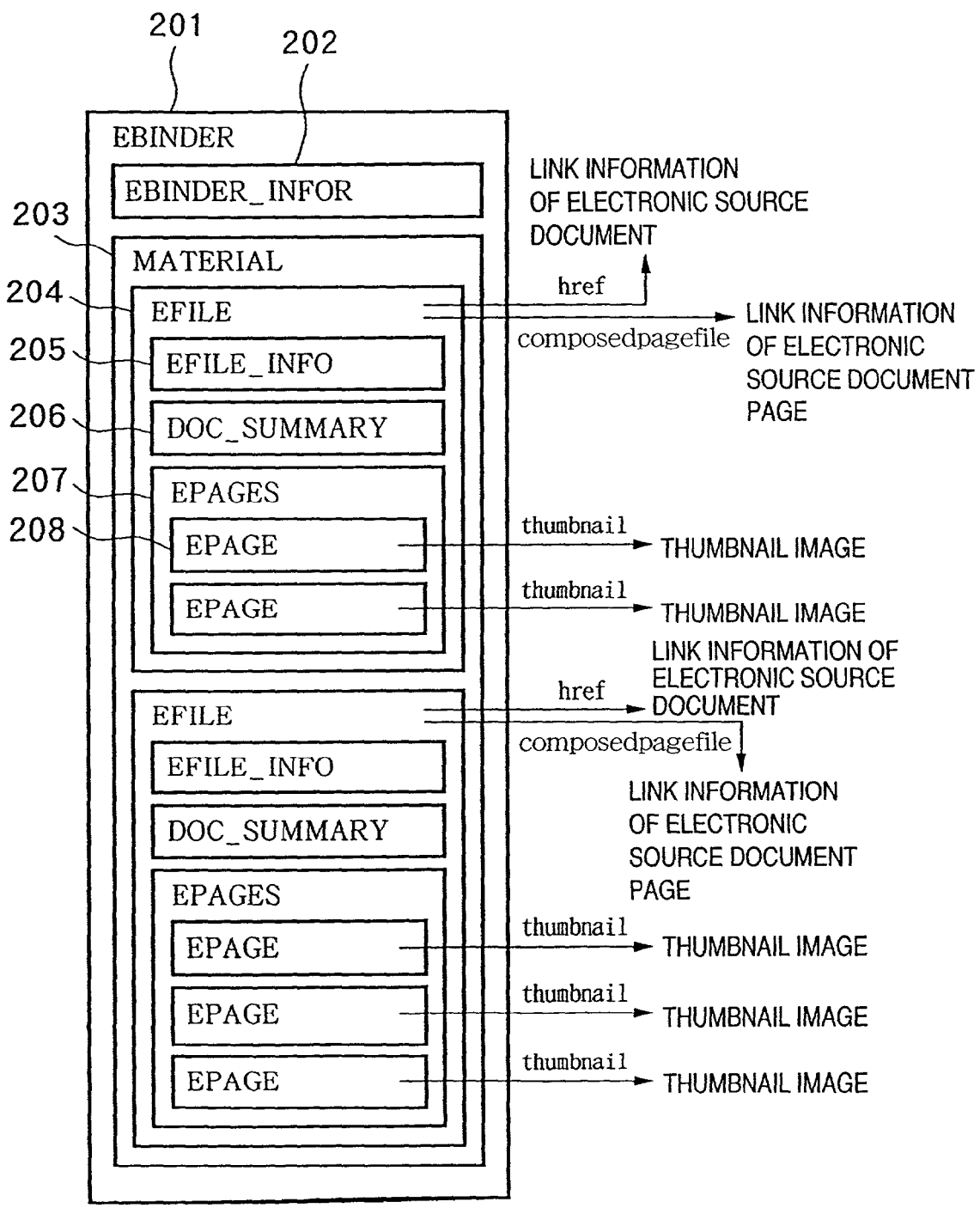
FIG. 2A is a view showing the format block structure of a generated electronic document composed by an electronic binder builder of the first embodiment.

Preferred embodiments of the present invention will be described in detail below, referring the drawings.

FIG. 1 is a view showing the concept of a document management system that is applied in each embodiment of the present invention.

Referring to FIG. 1, reference numeral 101 denotes electronic documents created by different application software programs. Assume that the electronic documents include electronic document 1 created by Microsoft Word, electronic document 2 created by Microsoft PowerPoint, and electronic document 3 having an HTML format which is used by an image read with a scanner or in the Internet. An electronic binder builder (e-binder builder) 102 can bind pages of the electronic documents 1 to 3 to compose one generated electronic document 103.

First Embodiment

An example of the generated electronic document composed by the electronic binder builder 102 of the document management system of the first embodiment will be described next with reference to FIGS. 2A to 2C.

FIG. 2A is a view showing the format block structure of a generated electronic document composed by the electronic binder builder of the first embodiment, and FIG. 2B is a view showing a detailed example of XML description thereof.

Figure 4:
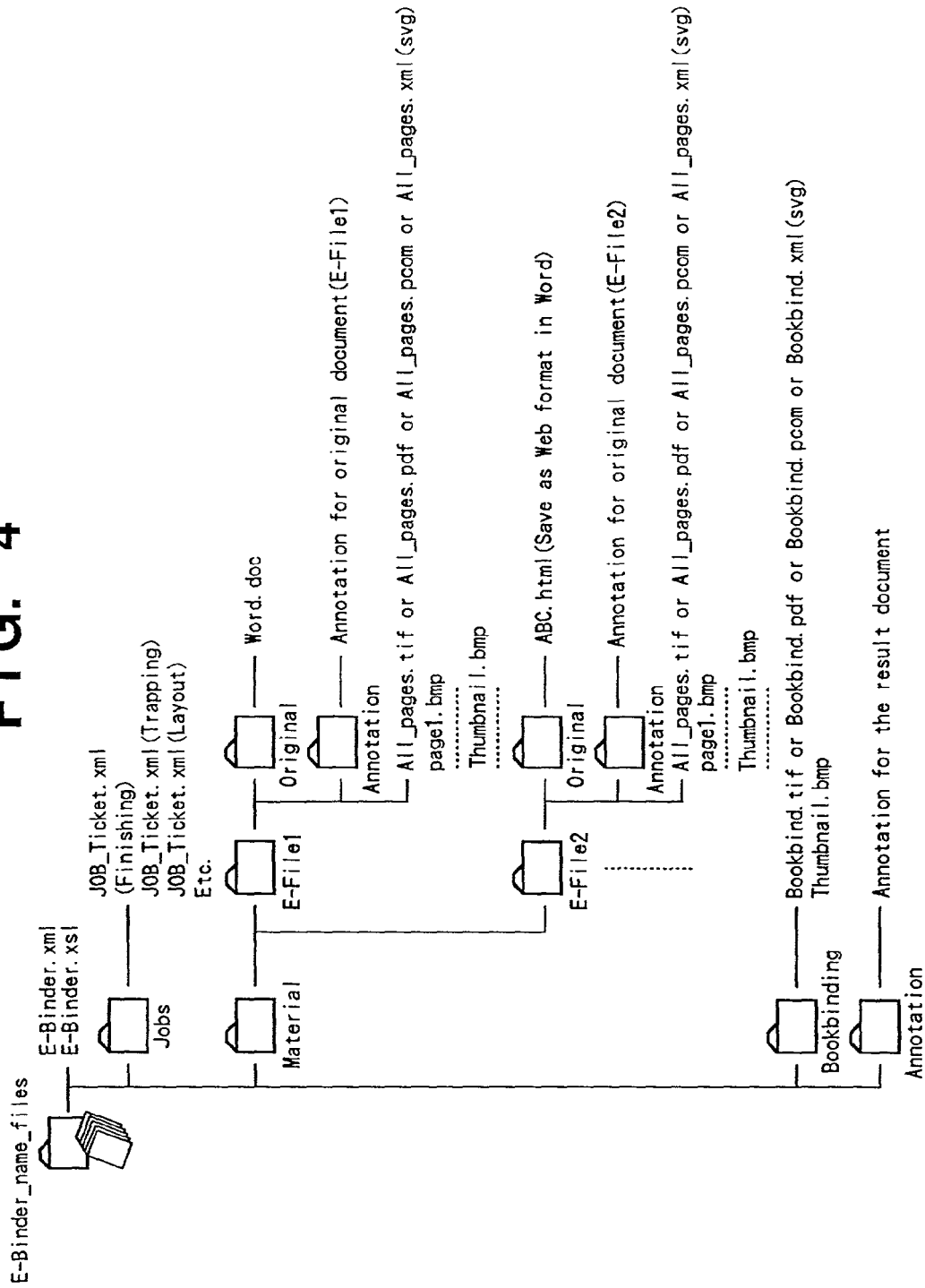
FIG. 4 is a view showing the arrangement of folders and files of the generated electronic document of the first embodiment.

In the present invention, a generated electronic document is composed using an XML (extensional Markup Language) description. A generated electronic document is composed of a plurality of kinds of electronic source documents created by different application software programs. As the basic composition, a document E-Binder.xml is formed as a Top description, a predetermined description is done therein, and elements (contents) such as relational files are indicated by external link. The locations of the elements indicated by the external link must be known. FIG. 4 shows the arrangement of folders and files of the generated electronic document. The holding positions of the external link elements can be known as relative positions from E-Binder.xml as the Top document.

Referring to FIG. 2B, <?xml version="1.0" encoding="Shift_JIS"?> is the description of declaration at the start.

An EBINDER portion (201) in FIG. 2A indicates the start of the document. A portion between <EBINDER> and </EBIDNER> in FIG. 2B is the main body of the document.

An EBINDER_INFOR portion (202) in FIG. 2A is a portion that holds the meta information (management information) of the document. A portion between <EBINDER_INFO> and </EBINDER_INFO> holds the meta information. Especially, pieces of meta information <TITLE> to </TITLE> representing the file name, <CREATOR> to </CREATOR> representing the creator name, and <DATE> to </DATE> representing the date of creation are held here.

Furthermore, expression of this meta information is not limited thereto, and for example, arrangements of the RDF (Resource Data Framework) defined by the W3C (World Wide Web Consortium) as shown in the portion surrounded by <EFILE_INFO> and <EFILE_INFO> and the portion surrounded by <EBINDER_INFO> and </EBINDER_INFO> of FIG. 2C may also be used.

A MATERIAL portion (203) in FIG. 2A is a portion that holds the information of electronic source documents. A portion between <MATERIAL files="2"> and </MATERIAL> holds the information, in which files= indicates the number of electronic source documents, and two files are held here.

An EFILE portion (204) in FIG. 2A is a portion that holds the information of one electronic source document, i.e., the information obtained by converting an electronic source document into electronic document pages. A portion between <EFILE href="office¥ppt0000¥F_c01.ppt" composedpagefile="pimg¥efile0001.pdf" type="pdf" totalpage="2" id="ef0001"> and </EFILE> holds the information. Hereinafter, "¥" corresponds to "\" (backslash). Here, href= indicates the link information of the electronic source document, composedpagefile= indicates the link information of a file in which the pages of the electronic source document are put together, and type= indicates the file format. In this example, the PDF format of Adobe is indicated. Alternatively, MultiPageTIFF or the like, that is a format capable of storing a plurality of images, can be set. In addition, totalpage= indicates the number of pages of the electronic source document, and id= indicates the identification number.

An EFILE_INFO portion (205) in the EFILE portion (204) shown in FIG. 2A holds the management information of an electronic source document. A portion between <EFILE_INFO datatype="PowerPoint2000"> and </EFILE_INFO> holds the management information. In this case, datatype= indicates the type of the electronic source document, which represents PowerPoint2000. <TITLE> to </TITLE> representing the file name and <CREATOR> and </CREATOR> representing the creator name hold the management information.

A DOC_SUMMARY portion (206) in FIG. 2A holds the summary information of an electronic source document. This portion holds a text obtained by summarizing a full text using a summarizing engine so that the summary of the material contents can be known. This portion is omitted in FIG. 2B.

An EPAGES portion (207) in FIG. 2A saves documents (electronic source document pages) obtained by changing an electronic source document into information pages. For example, for the electronic source document of Word, pages are determined only in displaying or printing the document. The EPAGES portion (207) saves the determined electronic source document pages. A portion between <EPAGE> and </EPAGE> saves electronic source document pages. Actually, the following <EPAGE.../> portion such as <EPAGE page="1" thumbnail="Material¥ef0000¥thumb1.bmp"/> or <EPAGE page="2" thumbnail="Material¥ef0000¥thumb2.bmp"/> holds an electronic source document page. Here, page= is information representing the ordinal number of a page in the entire electronic source document, and thumbnail= is information that holds the thumbnail image (reduced image) of the page. The next description also indicates the information of the electronic source document page. In this way, the page bitmapping information of an electronic source document (the information of an electronic source document page) is held. The bitmapped document of an electronic source document page, e.g., an image bitmapped to A4 size is also held here.

<EPAGE page="1" thumbnail="Material¥ef0000¥thumb1.bmp" Pagefile="office¥ppt0000¥page0001.bmp" type="bmp"/>

In this example, pagefile= holds the thumbnail image of the first page, and type= indicates the holding file format. In this example, the electronic source document page is held by an image file format "bmp". However, PDF or any other compression file format may be used. The necessary condition is that each page of a document can be held. The number of <EPAGE.../> portions is determined by the number of pages of an electronic source document.

Figure 3A:
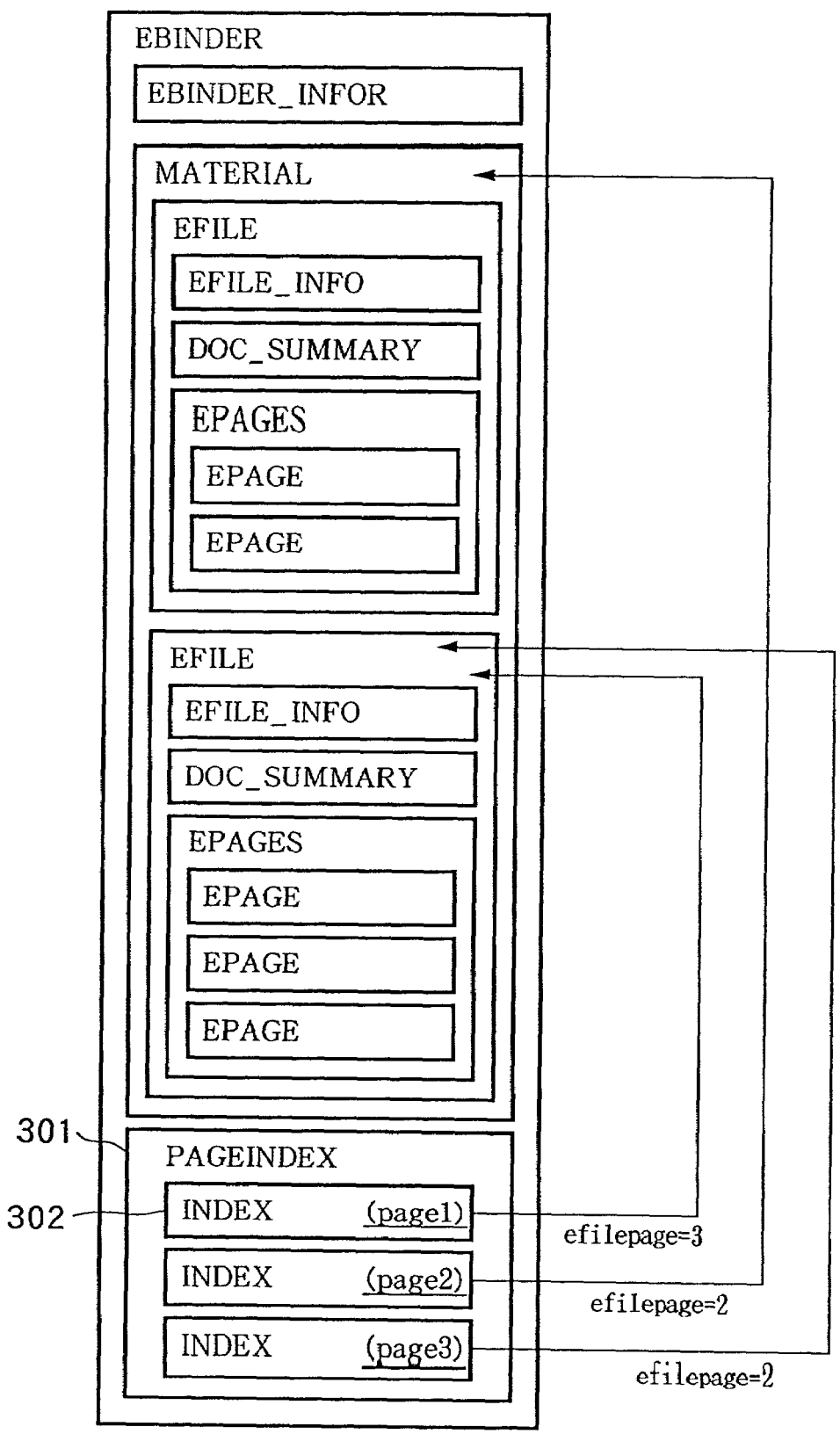
FIG. 3A is a view showing the format block structure of another generated electronic document composed by the electronic binder builder of the first embodiment.

FIG. 3A is a view showing the format block structure of another generated electronic document in which necessary electronic source document pages are selected from electronic source documents and held.

A PAGEINDEX portion (301) in FIG. 3A holds information that indicates the position of each page-bitmapped portion of electronic source documents. For a generated electronic document, the ids and page numbers of electronic source documents are managed, and page images are read out in that order, thereby composing a continuous electronic document. A portion between <PAGEINDEX> and </PAGEINDEX> in the description example shown in FIG. 2B is a description for managing and saving the pages of the generated electronic document. In this portion, <INDEX page="1" idref="ef0002" efilepage="3"/>
    <INDEX page="2" idref="ef0001" efilepage="2"/> and the like are described. Each <INDEX.../> indicates a page of the generated electronic document. Here, page= indicates a page of the generated electronic document, idref= indicates the id of an electronic source document, and efilepage= indicates a use page number of the electronic source document corresponding to id. In the above description example, pages separately designated from two electronic source documents are used. Specifically, the first page of the generated electronic document corresponds to the third page of the electronic source document of which id is "efile0002", and the second page of the generated electronic document corresponds to the second page of the electronic source document of which id is "efile0001".

The format block structure of this generated electronic document can be displayed for its display through application software by which each electronic source document constituting the generated electronic document has been created, but there may be cases where the generated electronic document converted into a predetermined file format is more convenient especially when the generated electronic document is printed with a printer, and it is attached to e-mail or the like for distribution. In these cases, the BOOKBINDING portion (2201) as shown in FIG. 3B is introduced in the format block structure of FIG. 3.

This BOOKBINDING portion (2201) is a portion that holds the generated electronic document made by converting the generated electronic document composed of each electronic source document page obtained from the PAGEINDEX portion (301) for managing the pages of the generated electronic document into a predetermined file format, for example a predetermined image file format (tiff, etc.) and a file format such as the PDF. In FIG. 3C, a specific example of this XML description is <BOOKBINDING href="Bookbinding¥bind.pdf" type="pdf">, wherein the href= represents information of the file with the generated electronic document converted into a predetermined file format. Also, the type= represents information of the format form used for converting the generated electronic document into a predetermined file format. In this example, the format form is the PDF.

Figure 3B:
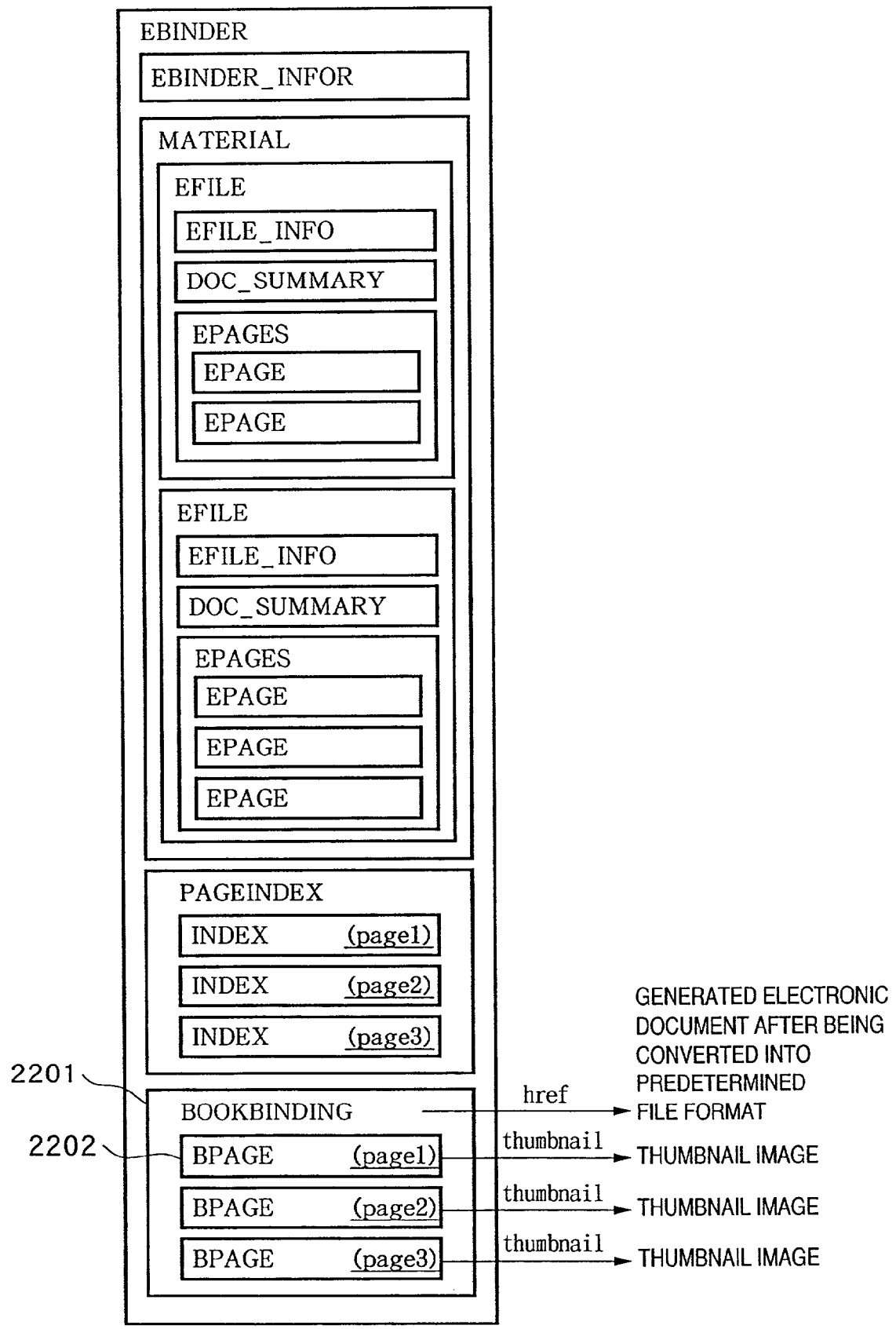
FIG. 3B is a view showing the format block structure of still another generated electronic document composed by the electronic binder builder of the first embodiment.

Also, the <BPAGE> portion (2202) of FIG. 3B is a portion that holds the thumbnail image of each page constituting the generated electronic document converted into a predetermined file format. In FIG. 3C, a specific example of this XML description is <BPAGE page="2" thumbnail="Bookbinding¥page2.png"/>, wherein the page= represents information of the page number in the total document. The thumbnail= represents information of holding the thumbnail image (contracted image) of that page.

The format block structure of a generated electronic document described above can simultaneously save electronic source documents, electronic source document pages, and generated electronic document. Hence, in editing, the original electronic documents of the electronic source documents can be referred to, and pages can be replaced again. An electronic source document page can be an imaged document or a document with the PDF or XML format. The format can be switched in accordance with the software environment for forming electronic source document pages.

Operation windows related to processing of the electronic binder builder 102 will be described next with reference to FIG. 5.

Figure 5:
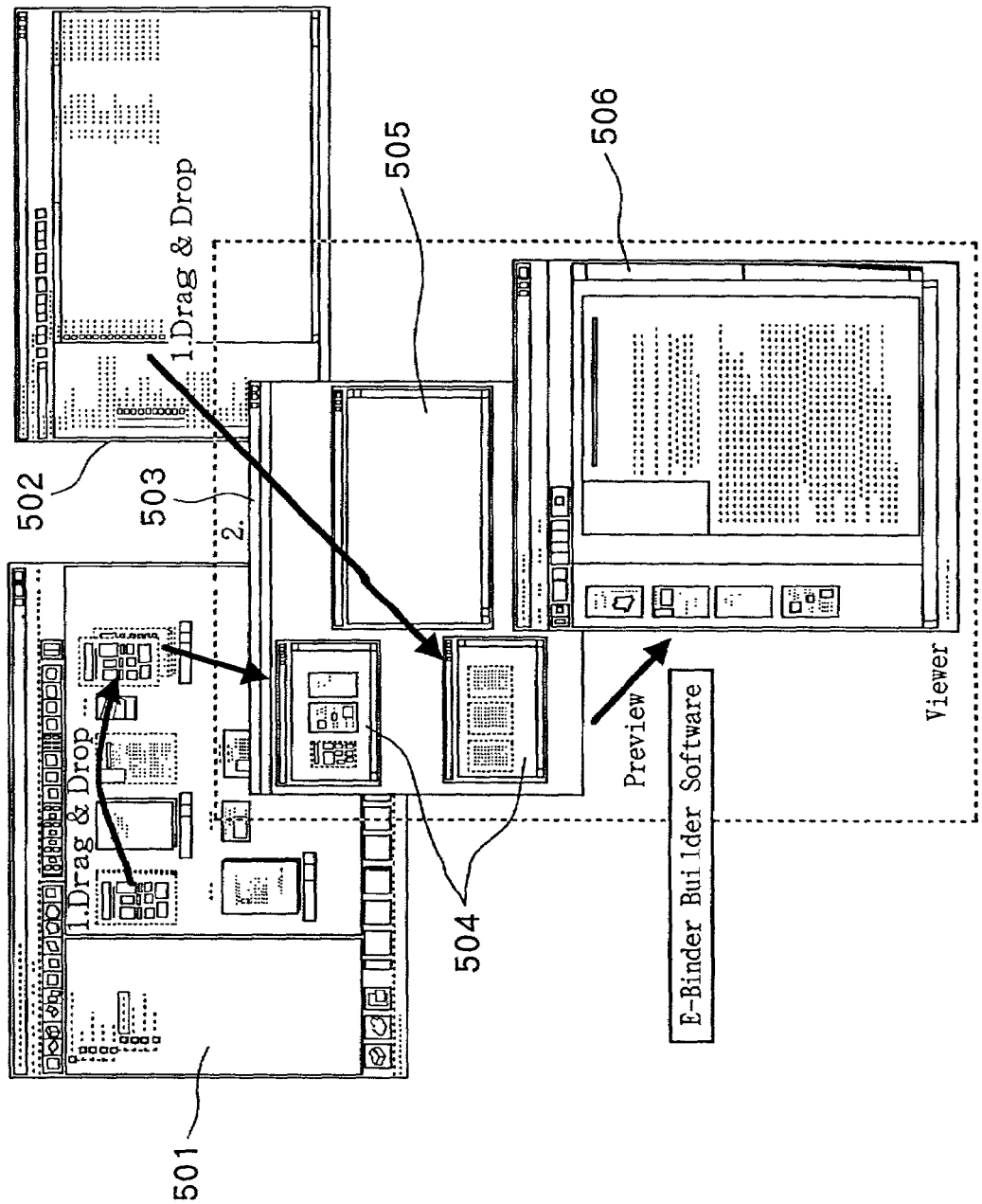
FIG. 5 is a view showing operation windows related to processing of the electronic binder builder of the first embodiment.

FIG. 5 is a view showing operation windows related to processing of the electronic binder builder of the first embodiment.

Reference numeral 501 denotes a document management software window; 502, a file management window managed on the OS of the computer; 503, a software (e-binder builder) window of the electronic binder builder 102; 504, collection windows for managing an electronic source documents, respectively; 505, a composed window for managing a generated electronic document; and 506, a display software (viewer) window for displaying a generated electronic document.

Generated electronic document creation processing will be described next with reference to FIGS. 5 and 6.

Figure 6:
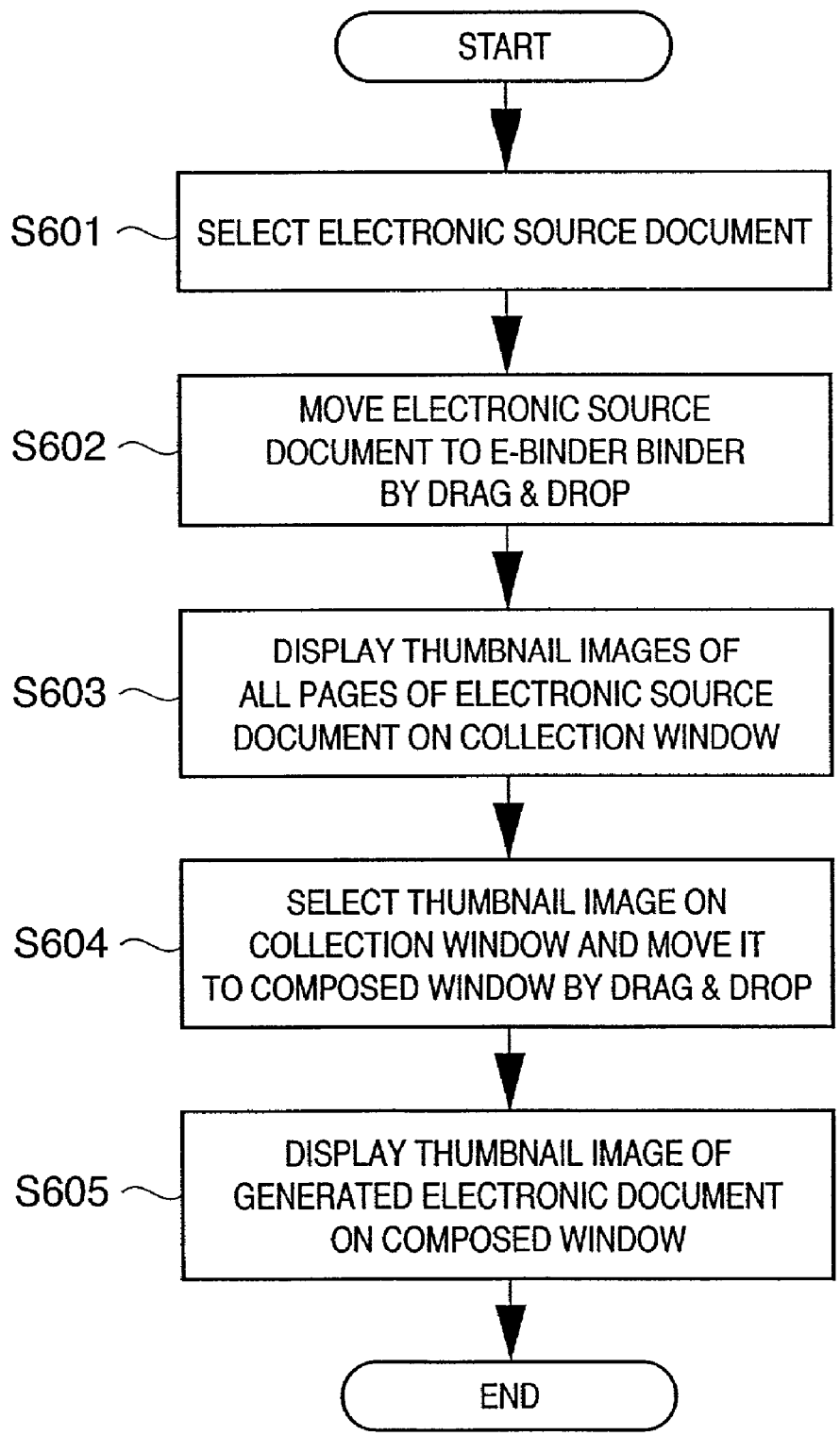
FIG. 6 is a flow chart showing generated electronic document creation processing of the first embodiment.

FIG. 6 is a flow chart showing generated electronic document creation processing of the first embodiment.

First, in step S601, an electronic source document is selected from the file management window 502. In step S602, the selected electronic source document is moved to the software window 503 of the electronic binder builder 102 by drag & drop. In this operation, the file is moved using a mouse as indicated by an arrow in FIG. 5. In step S603, thumbnail images are created from the moved file and displayed on the collection window 504. In this operation, the creation software for the electronic source document opens the document, executes pseudo printing operation, and creates files (electronic source document pages) with which the respective pages of the document can be processed. For example, when software ImageDriver is used, page images can be created. Thumbnail images can also be simultaneously created. In step S603, the created thumbnail images are displayed. In actually creating a file, the link destination (address) of an electronic source document is described by href= in <EFILE href="..."> between <MATERIAL> and </MATERIAL> shown in FIG. 2B, and each thumbnail image is held by thumbnail= in <EPAGE page="1" thumbnail="...¥thumb1.bmp"/>. The same operation is also executed to move a plurality of electronic source document pages.

In step S604, thumbnail images on the collection windows 504 are selected and moved to the composed window 505 by drag & drop. In this operation, the thumbnail images of electronic source document pages which are necessary for a final generated electronic document are selected from the collection windows 504 and moved to the composed window 505 where the generated electronic document is composed, thereby preparing the pages.

Furthermore, the method for inputting the electronic source document is not limited to the above described method by drag & drop, but it is also possible to select the electronic source document on the local or network from on the electronic binder builder 102 to input the electronic source document. Furthermore, in the software on the call side (the document management system in the first embodiment), for example, a required electronic source document may be selected by the software on the call side in advance, and then inputted through action of pressing a button for starting the electronic binder builder 102 and so on.

In step S605, the thumbnail images of the generated electronic document are displayed on the composed window 505. In this operation, the thumbnail images moved in step S604 are displayed at designated positions where the images have been dropped.

When this processing is ended, a generated electronic document composed of necessary pages of electronic source documents can be composed.

A detailed example in which the thumbnail image of a necessary electronic source document page is selected from the collection window 504 and moved to the composed window 505 where a generated electronic document is composed will be described next with reference to FIG. 7.

Figure 7:
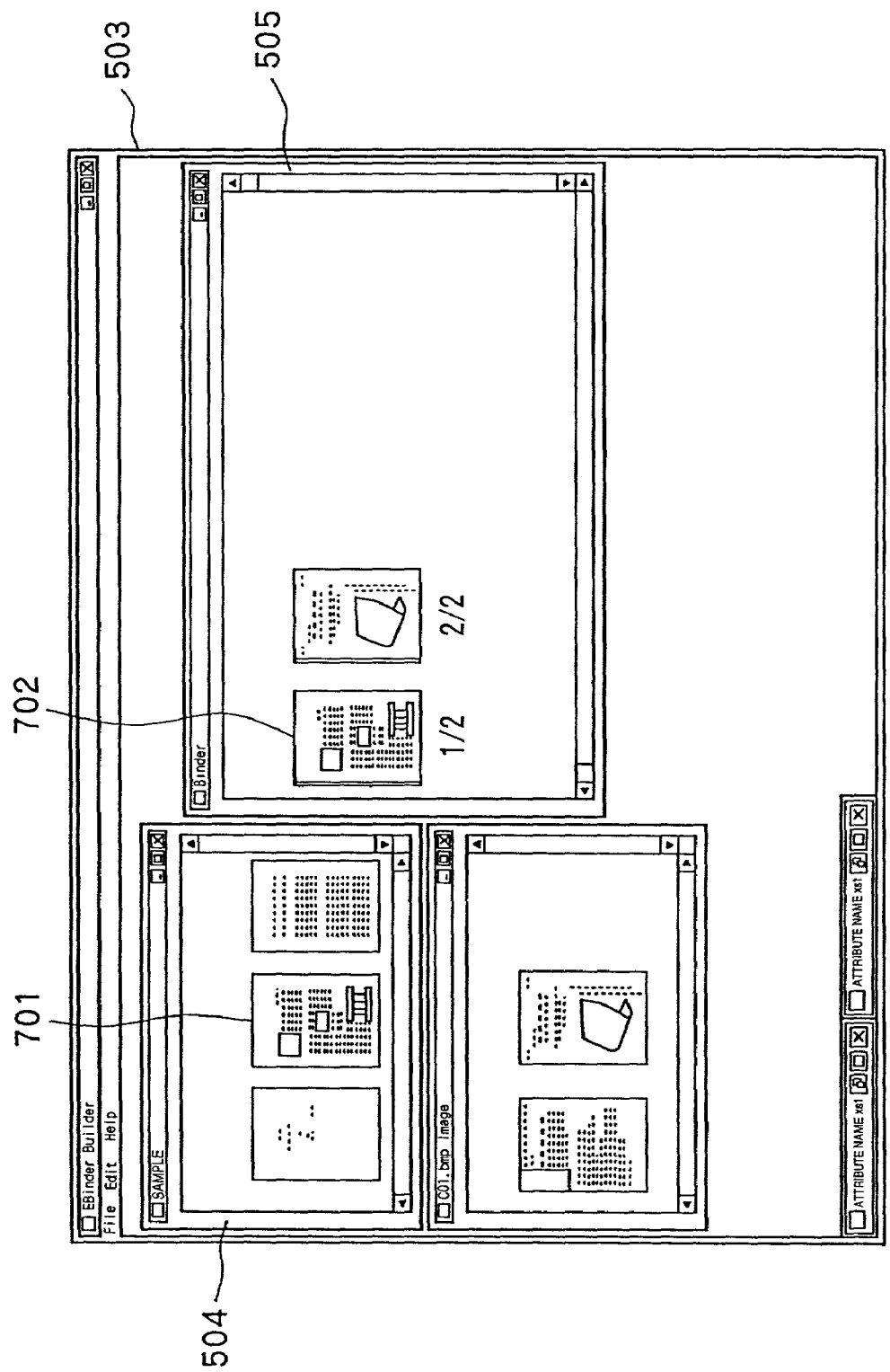
FIG. 7 is a view showing an operation example of the electronic binder builder of the first embodiment.

Referring to FIG. 7, reference numeral 701 denotes each electronic source document page selected from the corresponding electronic source document on the collection window 504; and 702, a state wherein the electronic source document pages 701 are moved to the pages of the generated electronic document on the composed window 505.

This state will be described with reference to FIG. 2B. A description shown in FIG. 2B

```
<EFILE...>
    <EPAGES>
        <EPAGE page="1" thumbnail="Material¥ef0000¥thum1.bmp"/>
        ......
    </EPAGES>
</EFILE>
......
<PAGEINDEX>
    <INDEX page="1" idref="ef0002" efilepage="3"/>
    <INDEX page="2" idref="ef0001" efilepage="2"/>
    <INDEX page="3" idref="ef0002" efilepage="2"/>
</PAGEINDEX>
``` includes between <EPAGE...> and </EPAGE> descriptions representing that thumbnail images are held. This indicates thumbnail images displayed on the collection window 504. The portion between <PAGEINDEX> and </PAGEINDEX> contains the page information of the thumbnail images displayed on the composed window 505. Instead of holding the entities of the thumbnail images, file names and pages in electronic source documents are indicated. For example, <INDEX page="1" idref="ef0002" efilepage="3"/> means that the id of an electronic source document is designated, and the third page of the file is used as the first page of the generated electronic document.

As described above, the electronic binder builder 102 can select necessary electronic source document pages from electronic source documents with different formats and re-edit them. Especially, as a characteristic feature in composing a generated electronic document, an original electronic source document used to generate a page can be found by link and operation can be performed for each electronic source document page.

A detailed example in which an electronic source document saved on the collection window 504 is moved to the composed window 505 will be described next with reference to FIG. 8.

Figure 8:
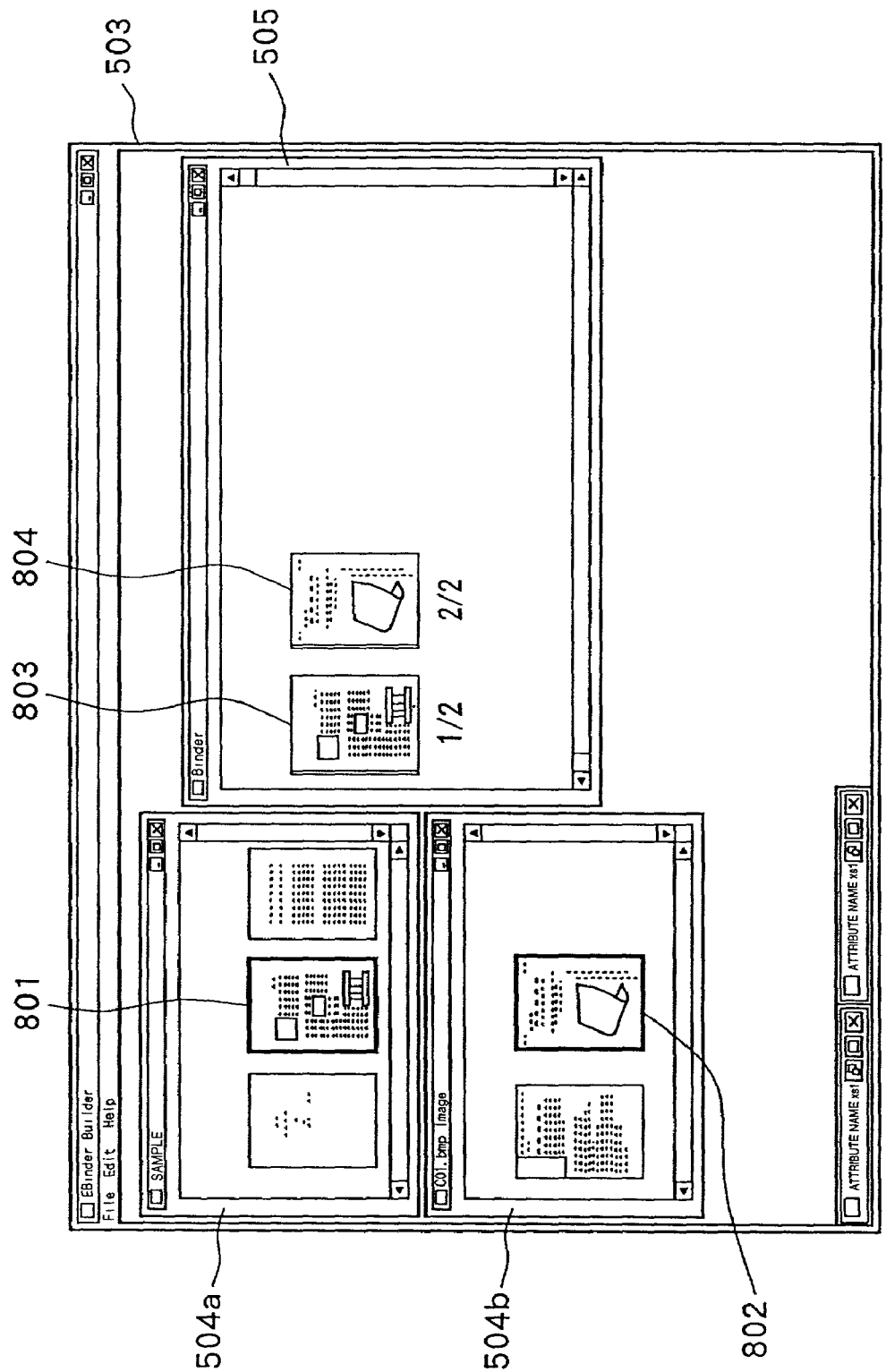
FIG. 8 is a view showing another operation example of the electronic binder builder of the first embodiment.

FIG. 8 shows a state wherein two electronic source documents are input to the software window 503 of the electronic binder builder 102 and respectively held on collection windows 504a and 504b.

Reference numeral 801 denotes a selected thumbnail image of a page of electronic source document 1; and 802, a selected thumbnail image of a page of electronic source document 2. When these thumbnail images are moved to the composed window 505, the thumbnail images are displayed in the order of selection. In this case, as the thumbnail images 801 and 802 are selected in this order, thumbnail images 803 and 804 are displayed on the composed window 505.

Figure 9:
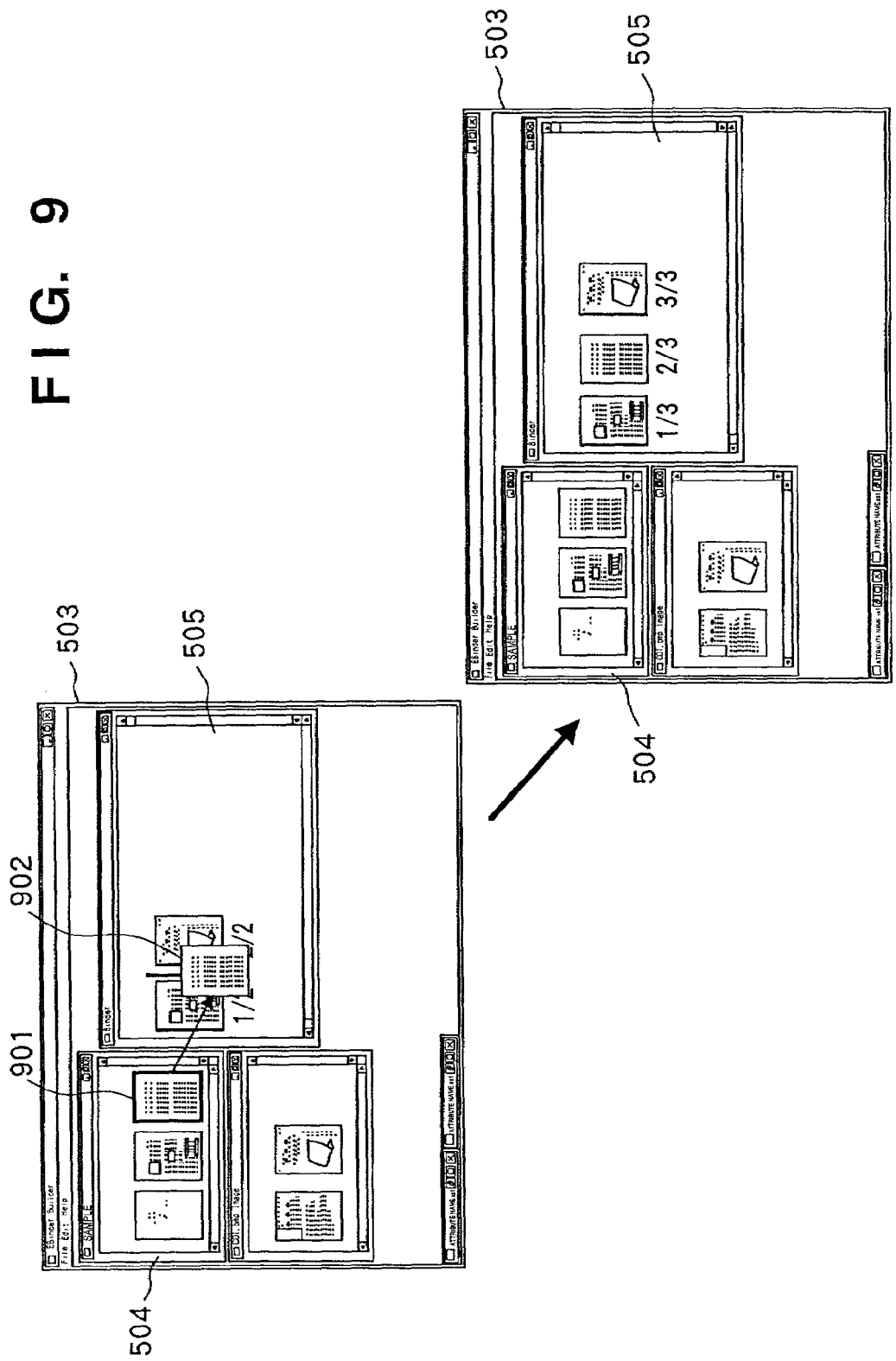
FIG. 9 is a view showing still another operation example of the electronic binder builder of the first embodiment.

FIG. 9 shows a detailed example in which when a thumbnail image 901 of another page of the electronic source document on the collection window 504 is moved by drag & drop to a position between the two thumbnail images displayed on the composed window 505, the thumbnail image 901 is inserted between the two thumbnail images as a thumbnail image 902. With this operation, the total number of pages is incremented by one.

FIGS. 10A to 10C show detailed examples which indicate that the pages of the generated electronic document generated by moving thumbnail images on the collection window 504 to the composed window 505 are laid out in the order of selection of electronic source document pages.

FIG. 10A shows a state wherein thumbnail images 1002 and 1001 on the collection window 504a are selected in the selection order shown in FIG. 10A. When the thumbnail images 1002 and 1001 are moved to the composed window 505 in the selection order shown in FIG. 10A, the thumbnail images are laid out on the composed window 505 in that selection order.

FIG. 10B shows a state wherein thumbnail images 1003 and 1004 on the collection window 504a are simultaneously selected. When the thumbnail images 1003 and 1004 are moved to the composed window 505, the thumbnail images are laid out in the order of pages of the electronic source document.

FIG. 10C shows a state wherein thumbnail images are selected from a plurality of electronic source documents, i.e., a thumbnail image 1005 on the collection window 504a and a thumbnail image 1006 on the collection window 504b are selected in the selection order shown in FIG. 10C. When the thumbnail images 1005 and 1006 shown in FIG. 10C are moved to the composed window 505, the thumbnail images are laid out on the composed window 505 in that selection order. Batch selection of thumbnail images from a plurality of electronic source documents is inhibited, or a priority order is set for electronic source documents such that thumbnail images are laid out on the composed window 505 in accordance with the priority order.

Figure 11:
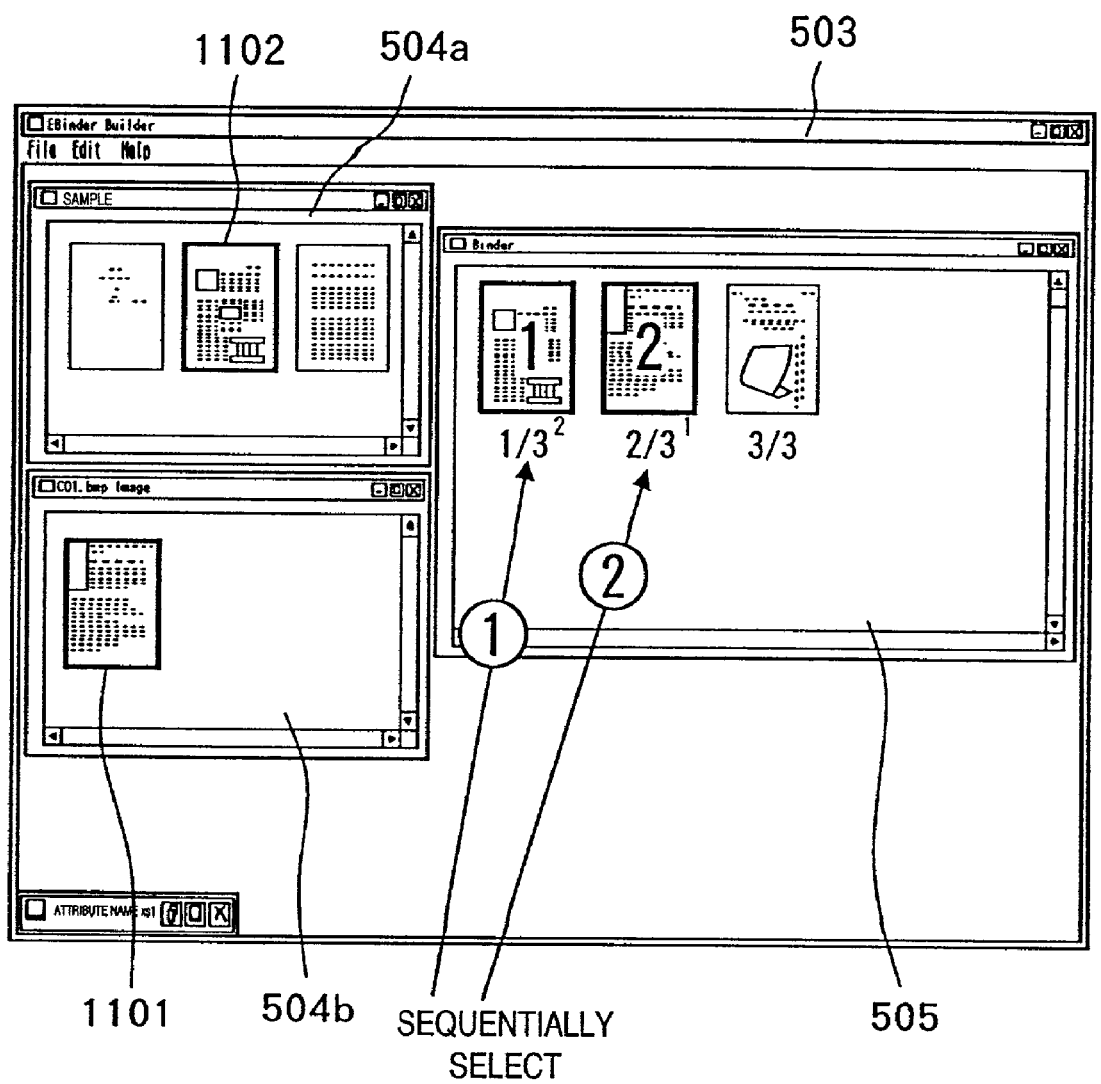
FIG. 11 is a view showing still another operation example of the electronic binder builder of the first embodiment.

FIG. 11 shows a detailed example in which an original electronic source document from which a thumbnail image has been moved to the composed window 505 is indicated. When the thumbnail images of 1/3 and 2/3 pages on the composed window 505 are selected, a thumbnail image 1101 on the collection window 504a and a thumbnail image 1102 on the collection window 504b, which correspond to the thumbnail images on the composed window 505, are displayed as frames or semitransparent images, thereby indicating that the thumbnail images are being selected.

Since the identification number and page number of electronic source document are described in <INDEX page="1" idref="ef0002" efilepage="3"/> in <PAGEINDEX>, each page of the electronic source document can be traced.

FIG. 12 shows a detailed example in which the pages of thumbnail images saved on the composed window 505 are replaced. In this example, a thumbnail image 1201 of 2/4 page is moved next to the thumbnail image on the right side by drag & drop, the thumbnail image 1201 replaces the adjacent thumbnail image and is displayed as a thumbnail image 1202. With this operation, a description

```
<PAGE INDEX>
    <INDEX page="1" idref="ef0001" efilepage="3"/>
    <INDEX page="2" idref="ef0001" efilepage="2"/>
    <INDEX page="3" idref="ef0002" efilepage="2"/>
    <INDEX page="4" idref="ef0001" efilepage="4"/>
</PAGEINDEX>
changes to
<PAGEINDEX>
    <INDEX page="1" idref="ef0001" efilepage="3"/>
    <INDEX page="2" idref="ef0002" efilepage="2"/>
    <INDEX page="3" idref="ef0001" efilepage="2"/>
    <INDEX page="4" idref="ef0001" efilepage="4"/>
</PAGEINDEX>
```

The description is edited as indicated by the underlines.

FIG. 13 shows a detailed example in which a plurality of thumbnail images saved on the composed window 505 are separately selected to replace their pages. The numbers are stored in the selection order, and thumbnail images are directly moved to the designated positions. Reference numerals 1301 and 1302 denote results of movement of selected thumbnail images. In this movement, since the thumbnail images are replaced in the selection order, a forward order is shown in FIG. 13. However, when a thumbnail image with a larger page number is selected first, the page layout is reversed after replacement. In the example shown in FIG. 13, if the selection order is reversed to 2 and 1, the layout order of the thumbnail images 1301 and 1302 is reversed.

The page of a thumbnail image saved on the composed window 505 can also be copied. As in page replacement, a thumbnail image on the composed window 505 is selected. The user instructs "copy" and then "paste" at an arbitrary position on the composed window 505, thereby copying the selected thumbnail image to that position.

When the third page is inserted between the first and second pages of a generated electronic document having three pages, a description

```
<PAGEINDEX>
    <INDEX page="1" idref="ef0002" efilepage="3"/>
    <INDEX page="2" idref="ef0001" efilepage="2"/>
    <INDEX page="3" idref="ef0002" efilepage="2"/>
</PAGEINDEX>
changes to
<PAGEINDEX>
    <INDEX page="1" idref="ef0002" efilepage="3"/>
    <INDEX page="2" idref="ef0002" efilepage="2"/>
    <INDEX page="3" idref="ef0001" efilepage="2"/>
    <INDEX page="4" idref="ef0002" efilepage="2"/>
</PAGEINDEX>
```

The description is edited as indicated by the underline.

The page of a thumbnail image saved on the composed window 505 can also be deleted. As in page replacement, the user selects a thumbnail image on the composed window 505 and then instructs "delete", thereby deleting the selected thumbnail image.

When the third page of a generated electronic document having three pages is deleted, a description

```
<PAGEINDEX>
    <INDEX page="1" idref="ef0002" efilepage="3"/>
    <INDEX page="2" idref="ef0001" efilepage="2"/>
    <INDEX page="3" idref="ef0002" efilepage="2"/>
</PAGEINDEX>
```

```
-continued changes to
<PAGEINDEX>
    <INDEX page="1" idref="ef0002" efilepage="3"/>
    <INDEX page="2" idref="ef0002" efilepage="2"/>
</PAGEINDEX>
```

Figure 14:
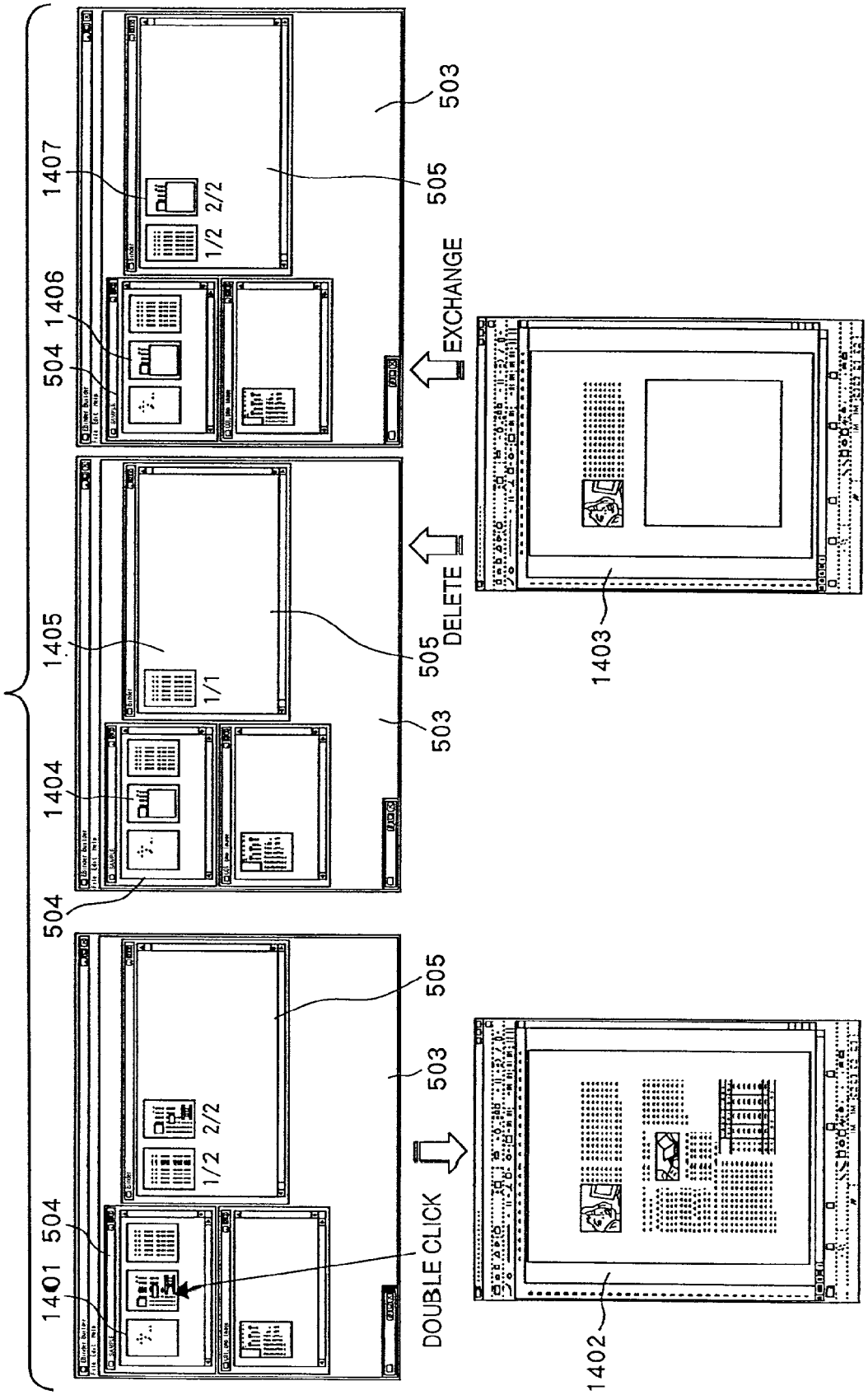
FIG. 14 is a view showing still another operation example of the electronic binder builder of the first embodiment.
Figure 15:
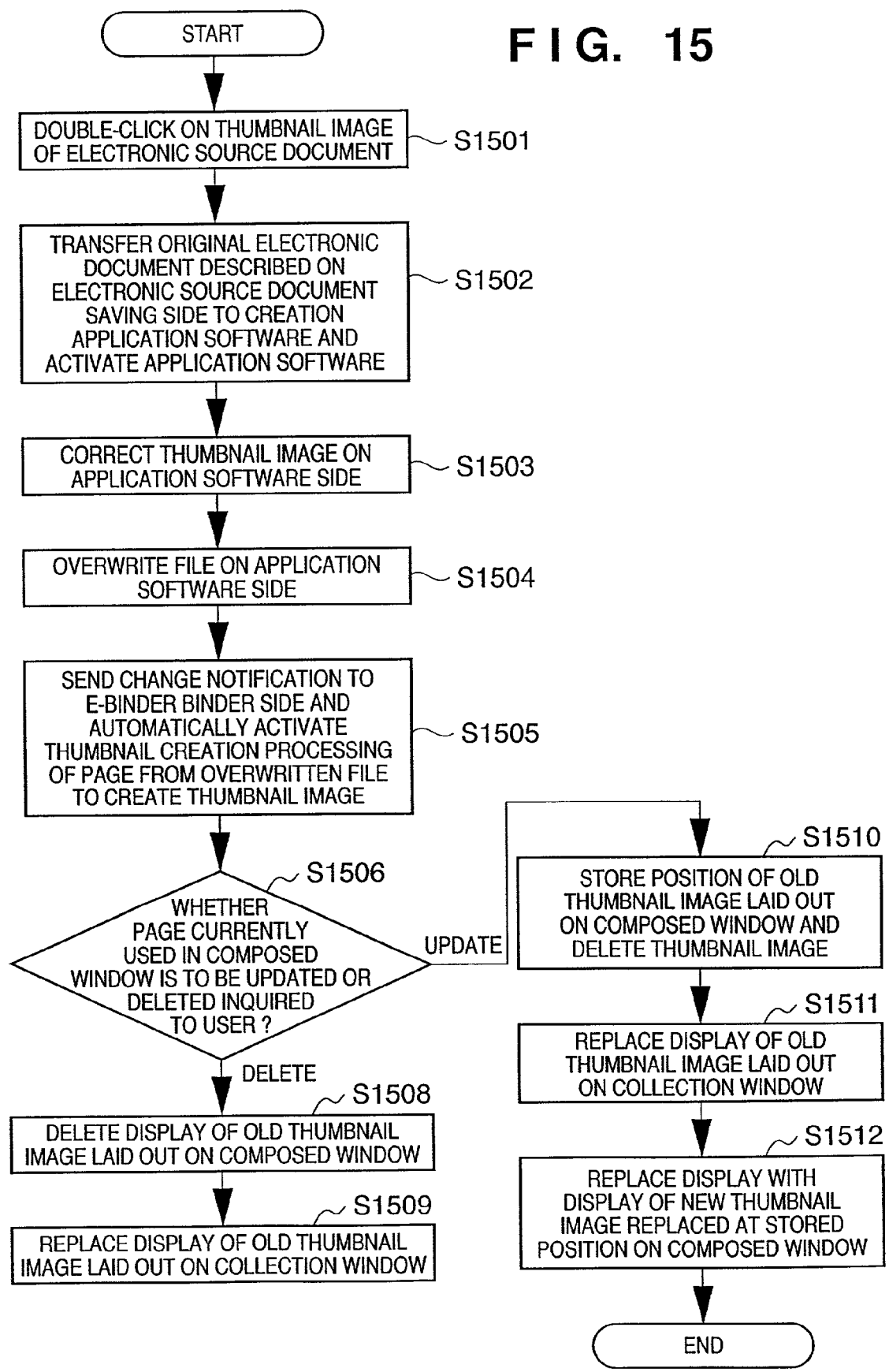
FIG. 15 is a flow chart showing generated electronic document edit processing of the first embodiment.

FIG. 14 shows a detailed example in which an electronic source document which has already been used is re-edited and reused. This detailed example will be described also using the flow chart shown in FIG. 15.

In step S1501, a thumbnail image 1401 of an electronic source document page on the collection window 504 is double-clicked. As a result, in step S1502, application software which has created the electronic source document receives the electronic source document containing an electronic source document page 1402 and is activated.

In step S1503, the electronic source document page is corrected on the application software side. After correction, an electronic source document 1403 corrected on the application software side is overwritten and saved in step S1504. As a result of this saving, the electronic binder builder 102 receives a change notification and promotes the user to input an instruction. In step S1505, thumbnail creation processing for creating the thumbnail image of the updated electronic source document page is activated.

In step S1506, the user is inquired about whether the electronic source document page that is currently being used on the composed window 505 is to be updated or deleted. This is because when the electronic source document page is updated, the contents of the page of the electronic source document change, and those on the generated electronic document side must also be changed.

When a delete instruction is input, an old thumbnail image 1405 laid out on the composed window 505 is deleted in step S1508. In step S1509, the display of the old thumbnail image 1401 laid out on the collection window 504 is replaced with a new thumbnail image 1404. Thus, delete processing is ended.

When not a delete instruction but an update instruction is input, in step S1510, the position of the old thumbnail image laid out on the composed window 505 is stored, and the old thumbnail image is deleted. In step S1511, the display of the old thumbnail image 1401 on the collection window 504 is replaced with a new thumbnail image 1406. In step S1512, a new thumbnail image 1407 is displayed at the stored position on the composed window 505.

FIG. 16 shows a detailed example in which a thumbnail image saved on the composed window 505 is rotated.

Referring to FIG. 16, two thumbnail images indicated by 1601 are selected. Assume that an instruction of 90° clockwise rotation is input. In this case, although the page direction (portrait) is kept unchanged, the displayed contents are rotated through 90° with respect to the page direction, as indicated by 1602. An instruction of 90° counterclockwise rotation can also be input.

FIG. 17 shows another detailed example in which a thumbnail image saved on the composed window 505 is rotated.

Referring to FIG. 17, two thumbnail images denoted by 1701 are selected. When an instruction of 180° rotation is input, the selected thumbnail images are rotated through 180°, i.e., upside down, as indicated by 1702.

Figure 18:
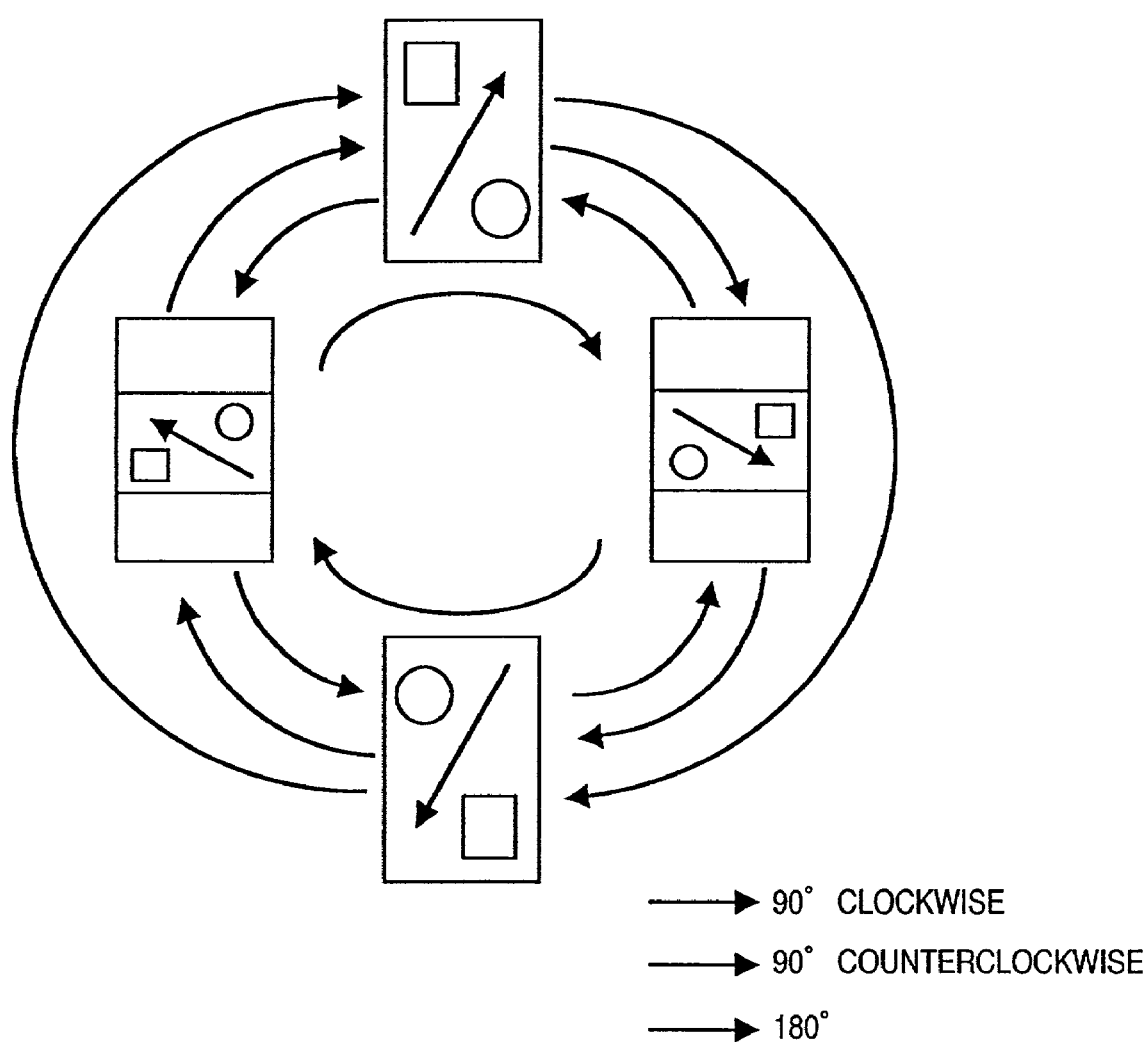
FIG. 18 is a view showing the correlation in rotation of a thumbnail image of the first embodiment.

FIG. 18 is a view showing the correlation in rotation of a thumbnail image in the first embodiment.

A case wherein the first and second pages of a generated electronic document having three pages are rotated through 90° clockwise will be described below.

A description

```
<PAGEINDEX>
    <INDEX page="1" idref="ef0002" efilepage="3"/>
    <INDEX page="2" idref="ef0001" efilepage="2"/>
    <INDEX page="3" idref="ef0002" efilepage="2"/>
</PAGEINDEX>
changes to
<PAGEINDEX>
    <INDEX page="1" idref="ef0002" efilepage="3" rotate="90"/>
    <INDEX page="2" idref="ef0001" efilepage="2" rotate="90"/>
    <INDEX page="3" idref="ef0002" efilepage="2"/>
</PAGEINDEX>
```

The description is edited as indicated by the underlines. In this case, rotate= indicates rotation of the page. In this embodiment, the unit of rotation is degree, and clockwise rotation is described by a positive value. The unit may be radian, and counterclockwise rotation may be described by a positive value. If a page is not rotated, like the third page of the above generated electronic document, rotate= is omitted, or rotate="0" is described.

Some formats are used to finally store a generated electronic document by rotation.

(1) A format for storing all pieces of information containing the electronic source documents and the generated electronic document (2) A format for storing only the generated electronic document (3) A format for storing only the electronic source documents The above formats will be sequentially described.

(1) Format For Storing All Pieces of Information Containing Electronic Source Documents And Generated Electronic Document This is a description format described with reference to FIGS. 2A and 2B with which the information of each electronic source document can be found from the generated electronic document. This state can be represented as follows by a part selected from an XML description.

```
<EBINDER>
    <MATERIAL files="2">
        <EFILE...>
            <EPAGES>
                <EPAGE page="1"
thumbnail="Material¥ef0000¥thumb1.bmp"
pagefile="office¥ppt0000¥page1.tiff" type="tiff">
            ......
            <EPAGES>
        <EFILE...>......
        </EFILE>
    </MATERIAL>
<PAGEINDEX>
        <INDEXpage="1" idref="ef0002" efilepage="3"/>
        <INDEXpage="2" idref="ef0001" efilepage="2"/>
        <INDEXpage="3" idref="ef0002" efilepage="2"/>
    </PAGEINDEX>
</EBINDER>
```

In this state, the thumbnail images of the respective pages of electronic source documents and document pages used in the generated electronic document are held using an image file format (TIFF) in this example (an intermediate format capable of describing each page, such as PDF or XML/SVG, may be used). Since the pages are designated on the generated electronic document side, all information documents capable of reconstructing the pages are held. Conversely, electronic source document pages on the electronic source document side, which are not designated on the generated electronic document side, need not always be held because the file size becomes large. In this way, the generated electronic document is stored as a set of a plurality of electronic documents on the electronic source document side and on the generated electronic document side.

(2) Format for Storing Only Generated Electronic Document

This storing method is used when only the generated electronic document is necessary.

In the document with the format (1), the electronic source documents and generated electronic document are integrated. When pieces of information of electronic source document pages are collected to a Bookbinding portion (303) shown in FIG. 3B, the electronic source document pages are completely extracted from the electronic source documents and held. This state can be represented as follows by a part selected from an XML description.

```
<EBINDER>
 <MATERIAL files="2">
  <EFILE...>
    <EPAGES>......
    <EPAGES>
    </EFILE>
    <EFILE>
    </EFILE>
  </MATERIAL>
  <PAGEINDEX>
      <INDEX page="1" idref=" ef0002" efilepage="3"/>
      <INDEX page="2" idref=" ef0001" efilepage="2"/>
      <INDEX page="3" idref=" ef0002" efilepage="2"/>
  </PAGEINDEX>
  <BOOKBINDING href="Bookbinding¥bind.tiff type="tiff">
      <BPAGE page="1" thumbnail="Bookbinding¥page1.png"/>
      <BPAGE page="2" thumbnail="Bookbinding¥page2.png"/>
      <BPAGE page="3" thumbnail="Bookbinding¥page3.png"/>
  </BOOKBINDING>
</EBINDER>
```

In this format, the portion between <BOOKBINDING href="Bookbinding¥bind.tiff type="tiff"> and </BOOKBINDING> is added, and in this state, the generated electronic document composed of electronic source document pages is stored in one file format. In the example, the generated electronic document is stored as a file bind.tiff in which images of a plurality of pages are bound (bind.pdf or bind.xml may also be used). The thumbnail images of the respective pages are described by <BPAGE page="1" thumbnail="Bookbinding¥page1.png"/> and the like. This means that thumbnail images used in electronic source documents are copied and subordinated to the generated electronic document. A complete state on the generated electronic document side means a state wherein all the thumbnail images are complete. At this time, information sandwiched between <MATERIAL> and </MATERIAL> or between <EFILES> and </EFILES> can be omitted.

Hence, the above description can be simplified to

```
<EBINDER>
    <BOOKBINDING href="Bookbinding¥bind.tiff" type="tiff">
        <BPAGE page="1" thumbnail="Bookbinding¥page1.png"/>
        <BPAGE page="2" thumbnail="Bookbinding¥page2.png"/>
        <BPAGE page="3" thumbnail="Bookbinding¥page3.png"/>
    </BOOKBINDING>
</EBINDER>
```

In addition, there is a description for storing only the bind.tiff file, more simply. In this case, the description is used when one wants to obtain only a bound file.

(3) The Format for Storing Only the Electronic Source Document

This is a format for storing only the electronic source document, and the electronic source document once brought to the electronic binder builder 102 holds per-page thumbnail images together with its original document. This state is as follows if shown with excerpts from the XML description.

More simply, only the bind.tiff file may be stored. This description is used when only a file binding page is to be simply acquired.

(3) Format for Storing Only Electronic Source Documents

This format stores only electronic source documents. An electronic source document temporarily moved to the electronic binder builder 102 side holds its original document and the thumbnail images of the respective pages. This state can be represented as follows by a part selected from an XML description.

```
<EBINDER>
    <EBINDER_INFO>......
    </EBINDER_INFO>
  <MATERIAL files="2">
     <EFILE href="Material¥ef0001¥Original¥F_c01.ppt" composedpagefile="Material¥efile0001.pdf" type="pdf" totalpage="2" id="ef0001">
        <EFILE_INFO datatype="PowerPoint2000">
        ......
        </EFILE_INFO>
          <EPAGES>
            <EPAGE page="1" thumbnail="Material¥ef0001¥thumb1.bmp"/>
            <EPAGE page="2" thumbnail="Material¥ef0001¥thumb2.bmp"/>
          </EPAGES>
        </EFILE>
        <EFILE href="Material¥ef0001¥HTML.doc" composedpagefile="Material¥efile0002.pdf" type="pdf" totalpage="3" id="ef0002"
<EFILE_INFO datatype="Word2000">......
        </EFILE_INFO>
     </EFILE>
  </MATERIAL>
</EBINDER>
```

In this example, only the electronic source documents are stored, and the generated electronic document is not stored. This format is often used to temporarily stop building a generated electronic document and store it. Alternatively, when an original electronic document is changed by the electronic binder builder 102 or when only the original electronic document of corrected version is necessary, only the electronic document described by href="Material¥ef0001¥Original¥F_c01.ppt" is extracted and stored.

Figure 19:
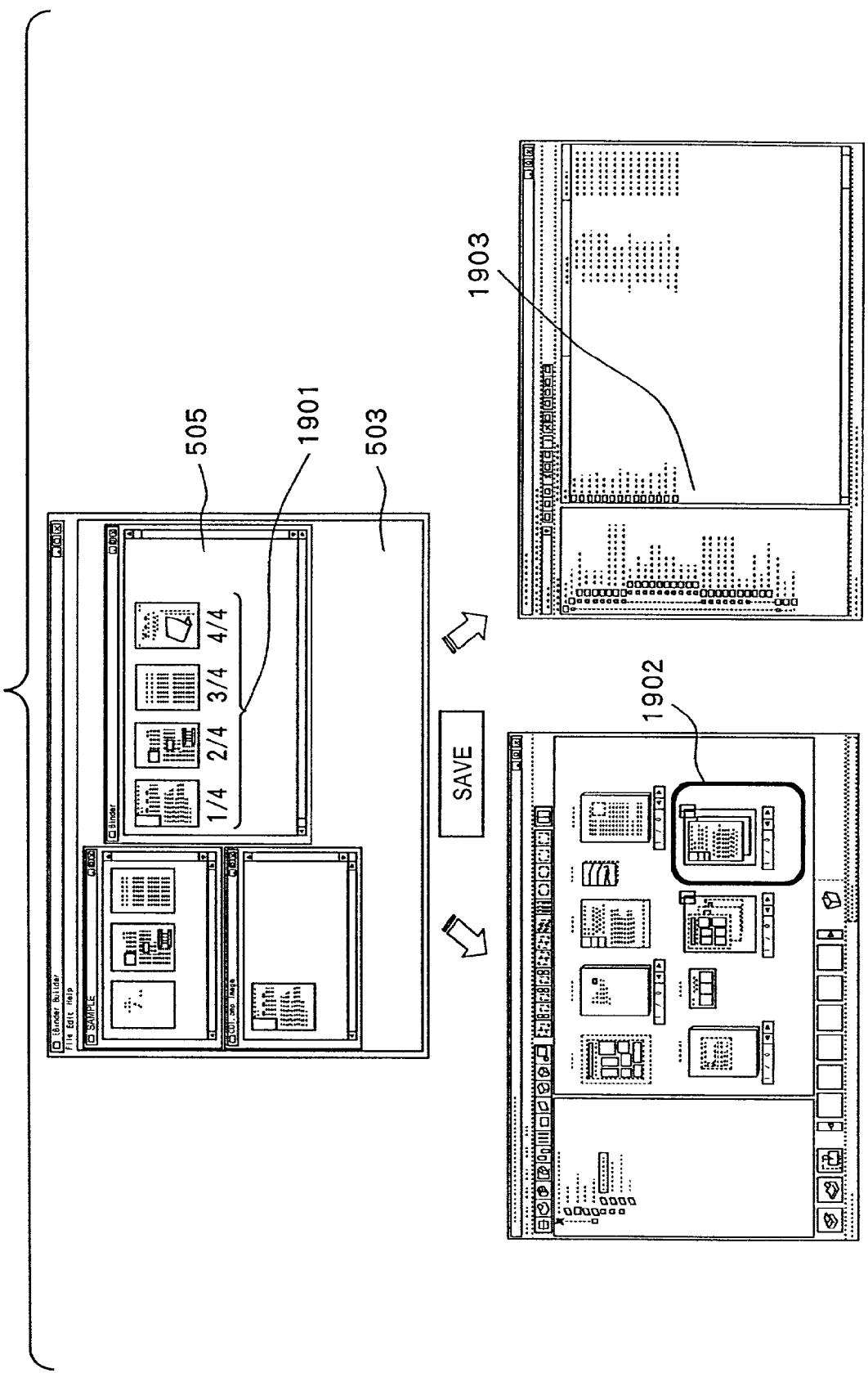
FIG. 19 is a view showing still another operation example of the electronic binder builder of the first embodiment.

The three formats have been described above. FIG. 19 shows a detailed example, and this will be described below.

Referring to FIG. 19, reference numeral 1901 denotes a state wherein a generated electronic document is created on the composed window 505. In the document management system, when this state is directly stored, a binder mark is added to the upper right corner, as indicated by 1902, to represent a form of a composite document. On the document management system side, the thumbnail image of the generated electronic document is displayed, and the user is notified of the presence of electronic source documents by the binder mark. When the generated electronic document is stored in a file management window 1903 on a normal OS, the generated electronic document is stored as a structure with a plurality of files and a plurality of folders, as shown in FIG. 4. To confirm the generated electronic document on the normal OS, a method of confirming two files, for example, the XML document in which this structure is described (E-Binder.xml in this example) and the style sheet (CSS: Cascading Style Sheet, XSL: Extensible Stylesheet Language and the like) using a browser is generally used. The bound generated electronic document in the Bookbinding folder may be directly browsed. In either case, linked files can be obtained.

As described above, according to the first embodiment, one integrated electronic document (generated electronic document) is created from a plurality of different electronic documents (electronic source documents), and the documents are closely bound. That is, a document structure in which the relationship between the electronic source documents and the generated electronic document is provided. As a result, when an electronic source document is changed, the generated electronic document can also be changed.

Also, a converted generated document with the generated electronic document converted into a predetermined file format is composed in the generated electronic document, and for example, this converted generated electronic document is used for print and attachment to e-mail of the generated electronic document, thereby making it possible to perform easily and efficiently print and attachment to e-mail of the generated electronic document.

Second Embodiment

Figure 20B:
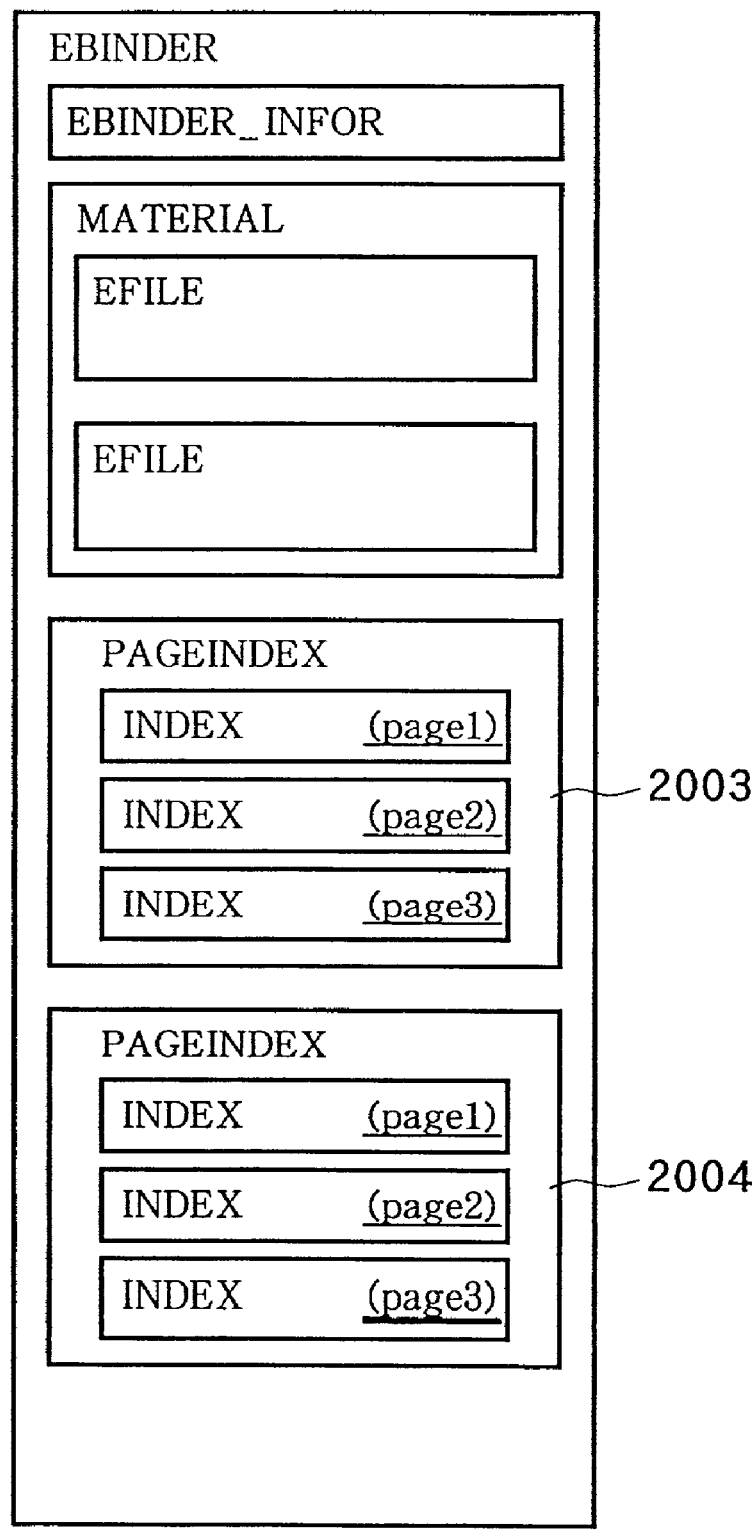
FIG. 20B is a view showing the format block structure of a generated electronic document composed by the electronic binder builder of the second embodiment.

FIGS. 20A and 20B show a structure with a plurality of generated electronic documents. Especially, FIG. 20A shows a detailed example. Reference numerals 2001 and 2002 denote composed windows for operating generated electronic documents. FIG. 20B is a view showing the format block structure of generated electronic documents corresponding to FIG. 20A. In this embodiment, a plurality of PageIndex portions are prepared. With this structure, the plurality of composed windows 2001 and 2002 are laid out, as shown in FIG. 20A, and a plurality of generated electronic documents can be created. Reference numerals 2003 and 2004 in FIG. 20B denote structures in which a plurality of generated electronic documents are held. For example, confidential and unconfidential documents can be separated by changing the cover.

Figure 21:
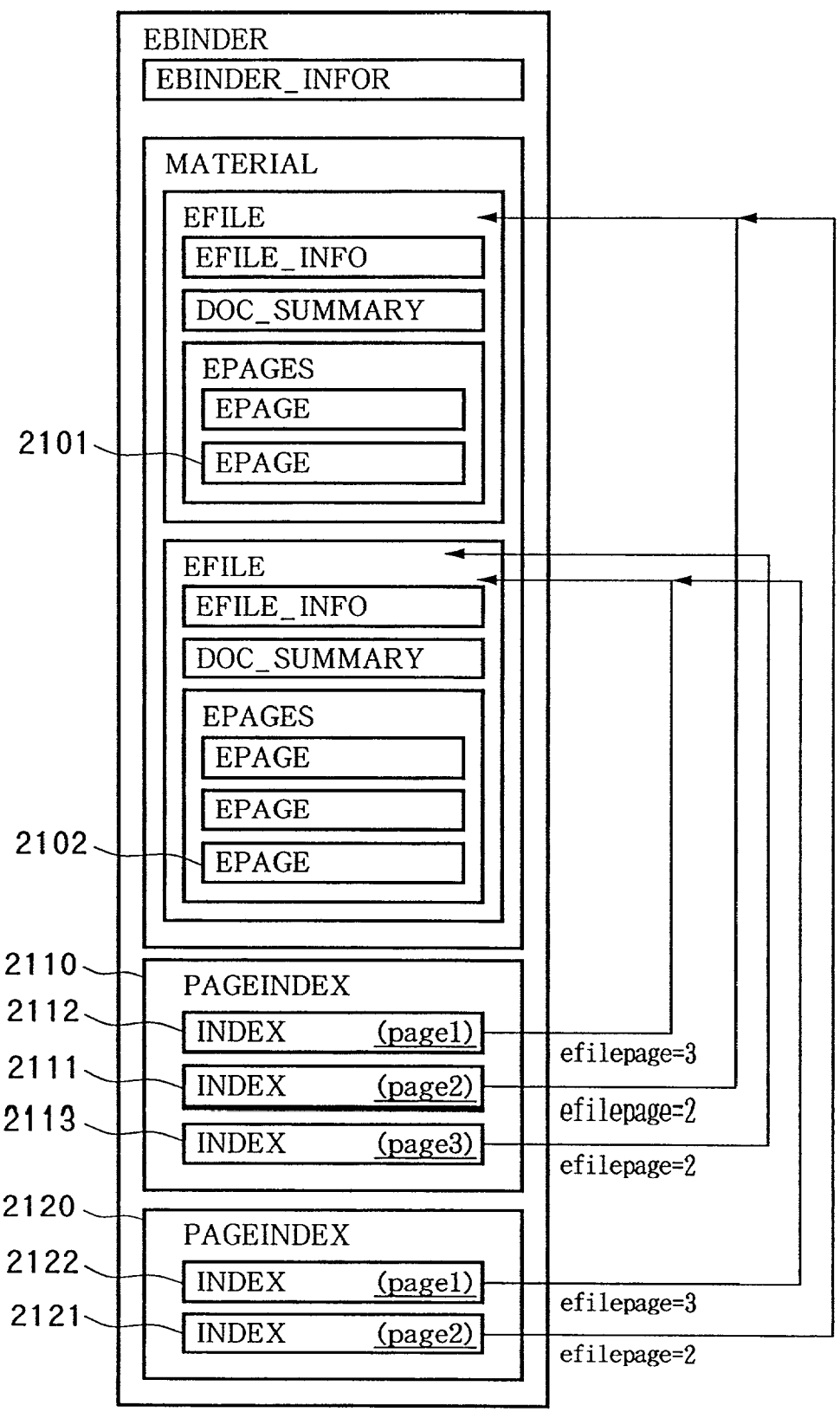
FIG. 21 is a view showing the format block structure of a plurality of generated electronic documents composed by the electronic binder builder of the second embodiment.

As an example of application of FIGS. 20A and 20B, the case where pages of the generated electronic document are linked to a common electronic source document page in the configuration of the electronic binder builder 102 holding information of a plurality of generated electronic documents is shown in FIG. 21.

Reference numerals 2110 and 2120 denote the PageIndex portions of the generated electronic document, respectively. In this example, pages 2111 and 2121 of the generated electronic document are linked to a page 2101 of the electronic source document. Also, pages 2112 and 2122 are linked to a page 2102 of the electronic source document.

In the case where such an information structure is provided, if the page of the electronic source document, for example the page 2102 is edited and modified, it is possible to know the fact that the page 2102 of the electronic source document is modified with respect to each of the pages 2112 and 2122 of the generated electronic document. When the modification is detected, operations as described with FIG. 14 can be performed with respect to each generated electronic document.

Also, as in the case of the page 2113 of the generated electronic document, pages that exist only in one document may be composed. For example, a generated electronic document having an excerpted summary and a generated electronic document including all the contents are composed separately, and each of them is provided with a different title, and if a common part is modified, the modification can surely be incorporated in the both documents.

As described above, according to the second embodiment, when a plurality of generated electronic documents is created, relation between all the generated electronic documents and electronic source documents constituting them can be maintained, and therefore if the electronic source document that is commonly used with different generated electronic documents is modified, the modification can be detected to conduct replacement of the modified contents with respect to each of the plurality of generated electronic documents. On the other hand, each generated electronic document can also be modified individually, and thus for example, a document structure including slightly different contents can be created by a distribution department. This is achieved by setting a confirmation function which checks whether or not each generated electronic document is modified individually.

Also, it is not necessary to have images that are development documents of the electronic source document page held in the EPAGE portion, in the format of the generated electronic document described in the above the first embodiment. That is, another format is composed for the format of three generated electronic documents to be stored finally, described in the above embodiment. That is, (4) the format in which the electronic source document and generated electronic document are included, and the developed image of the electronic source document page is not included in the EPAGE portion.

This is a storage method in the case where a generated electronic document converted into a predetermined file format is composed in advance, but if the electronic source document having electronic source document pages constituting the generated electronic document is modified, the generated electronic document converted into a predetermined file format is created again. This storage format is characterized in that the total file size can be reduced as a whole, because relation between the generated electronic document converted into a predetermined file format and the electronic source document is maintained, and the development image and thumbnail image of the electronic source document page are not held.

Information of the electronic source document (information showing which page of which electronic source document) is obtained for the BOOKBINDING portion (2201) of FIG. 3B, using the PAGEINDEX portion and the thumbnail image of the electronic source document page is extracted from the electronic source document and held. This state is as follows if shown with excerpts from the XML description of FIG. 2B.

```
<EBINDER>
    <MATERIAL files="2">
        <EFILE href="Material¥ef0001¥Original¥F_c01.ppt"
type="pdf" totalpage="2" id="ef0001">
            <EFILE_INFO datatype="PowerPoint2000">
            .....
            </EFILE_INFO>
        </EFILE>
        <EFILE->
        .....
        </EFILE>
    </MATERIAL>
<PAGEINDEX>
    <INDEX page="1" idref="efile0002" efilepage="3"/>
    <INDEX page="2" idref="efile0001" efilepage="1"/>
    <INDEX page="3" idref="efile0002" efilepage="2"/>
</PAGEINDEX>
<BOOKBINDING href="Bookbinding¥bind.tiff" type="tiff">
    <BPAGE page="1" thumbnail="Bookbinding¥page1.png"/>
    <BPAGE page="2" thumbnail="Bookbinding¥page2.png"/>
    <BPAGE page="3" thumbnail="Bookbinding¥page3.png"/>
</BOOKBINDING>
</EBINDER>
```

It should be noted here that the portion of <EPAGES> to </EPAGES> does not exist below the <EFILE->, and the composedpagefile="Material¥efile0001.pdf is not described in the description of <EFILE->. The portion of <EPAGES> to </EPAGES> is not described because the description for holding the thumbnail image of the electronic source document page is made in the BOOKBINDING portion, and thus redundancy should be prevented. However, it is possible to prepare the portion of <EPAGES> to </EPAGES> and make therein a description for holding the thumbnail image of the electronic source document page, if redundancy is accepted. Also, the composedpagefile="Material¥efile0001.pdf is not described because the generated electronic document is created using the electronic source document including the electronic source document page when it is required, which is characiscttic of this storage format.

Also, as another storage format, there is a format in which the electronic source document itself is not stored, but only those divided per page created from the electronic source document are held. This can be applied to all the cases previously described where the electronic source document is stored. Specifically, it is described as follows.

```
<EBTNDER>
  <MATERIAL files="2">
    <EFILE href="Material¥ef000l¥Original¥F_c01.ppt"
nohref="YES" type="pdf" totalpage="2" id="ef000l">
      <EFILE_INFO datatype="PowerPoint2000">
      .....
      </EFILE_INFO>
      <EPAGES>
        <EPAGE page="l"
thumbnail="Material¥ef0001¥thumb1.bmp"/>
        <EPAGE page="2"
thumbnail="Material¥ef0001¥thumb2.bmp"/>
      </EPAGES>
    </EFILE>
    <EFILE href="Material¥ef0001¥Original¥HTML.doc"
nohref="YES" composedpagefile="Material¥efile0002.pdf"
type=" pdf" totalpage="3" id="ef0002">
      <EFILE_INFO datatype="Word2000">
      .....
      </EFILE_INFO>
      <EPAGES>
      .....
      </EPAGES>
    </EFILE>
  </MATERIAL>
</EBINDER>
```

In the <EFILE> portion of this description, an attribute of nohref="YES" is added. If this nohref attribute is YES, then it shows that the electronic source document itself does not exist. That is, for example, the href="Material¥ef0001¥Original¥F_c01.ppt" is described, but a file shown by the href does not exist. In the case of such a storage format, edition operations such as rearrangement of pages can be performed even if the electronic source document is not held. The format can be used when the size of the electronic source document is large, one does not want to modify the material, one wants to perform edition operations but does not want to attach the material and so on.

Also, the previously described storage formats are for dealing with a plurality of files as shown in FIG. 4, but those may be combined together to form a compressed format.

Third Embodiment

Figure 22:
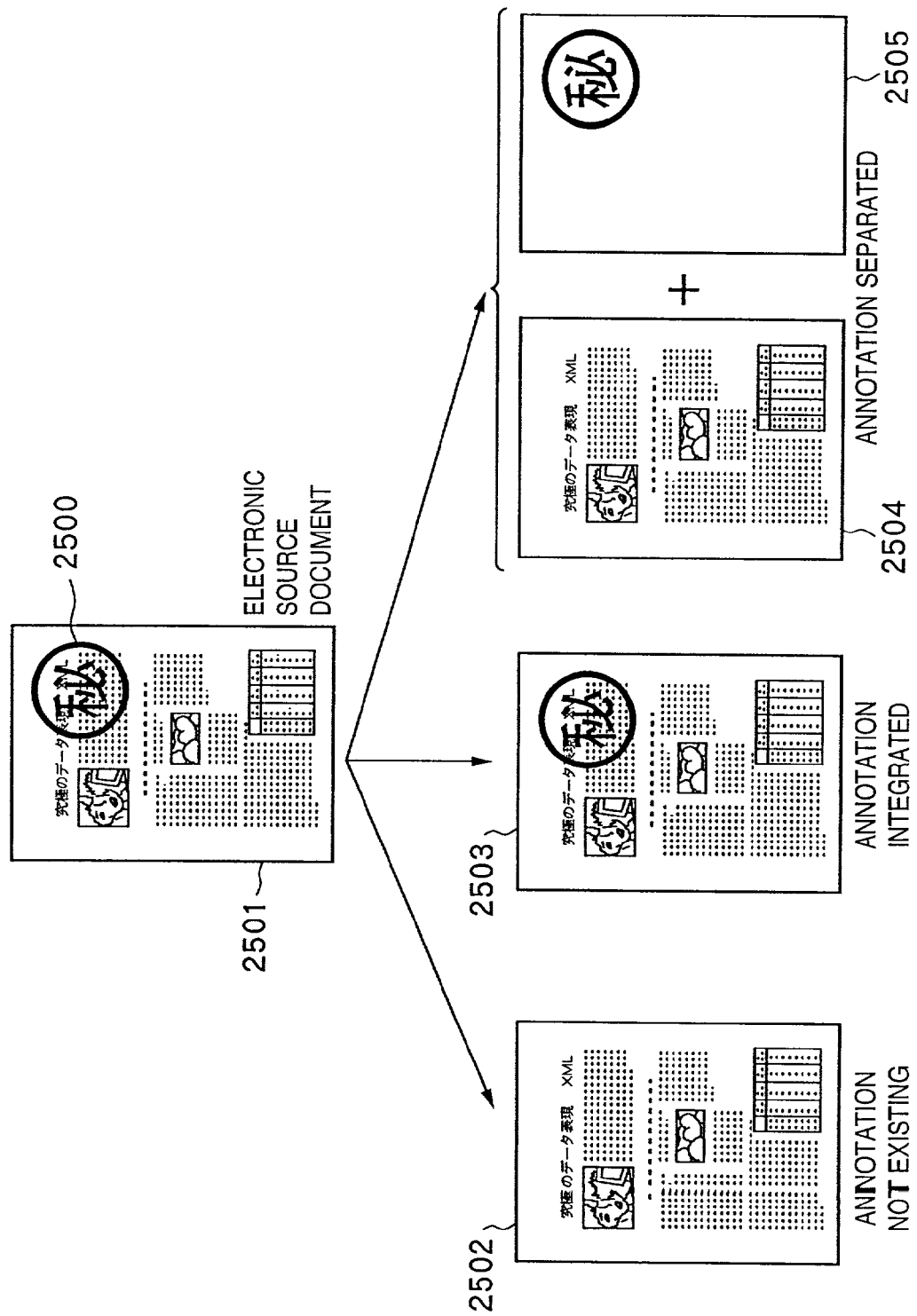
FIG. 22 illustrates a method of holding annotation information of the third embodiment.

In FIG. 3A of the first embodiment, if the electronic source document has annotation information and the annotation information is held on the generated electronic document, three different holding methods as shown in FIG. 22 can be considered.

For example, a first holding method is a method in which annotation information as shown with reference numeral 2502 is ignored, with respect to the electronic source document page 2501 having annotation information 2500. At this time, only the electronic source document page is held in the generated electronic document. The structure of the generated electronic document is not different from those described above.

For a second holding method, as shown with reference numeral 2503, the electronic source document page 2501 and the annotation information 2500 are combined and converted into a file format (e.g. image, PDE, etc.) capable of being treated for one electronic source document and are then held. In this case, for holding the converted electronic source document, the electronic source document converted into any one of the composedpagefile in the <EFILE> portion (204) and the pagefile in the <EPAGE> portion (207) is described.

For a third holding method, as shown by reference numerals 2504 and 2505, the electronic source document page and the annotation information are separated from each other and held in the generated electronic document. That is, in the generated electronic document, the electronic source document and the annotation information are held individually.

Furthermore, annotation information may or may not be held in the generated electronic document. If it is not held, the structure of the generated electronic document is not different from those described above. On the other hand, if annotation information is held, the document takes on a format block structure as shown in FIG. 23.

Figure 23:
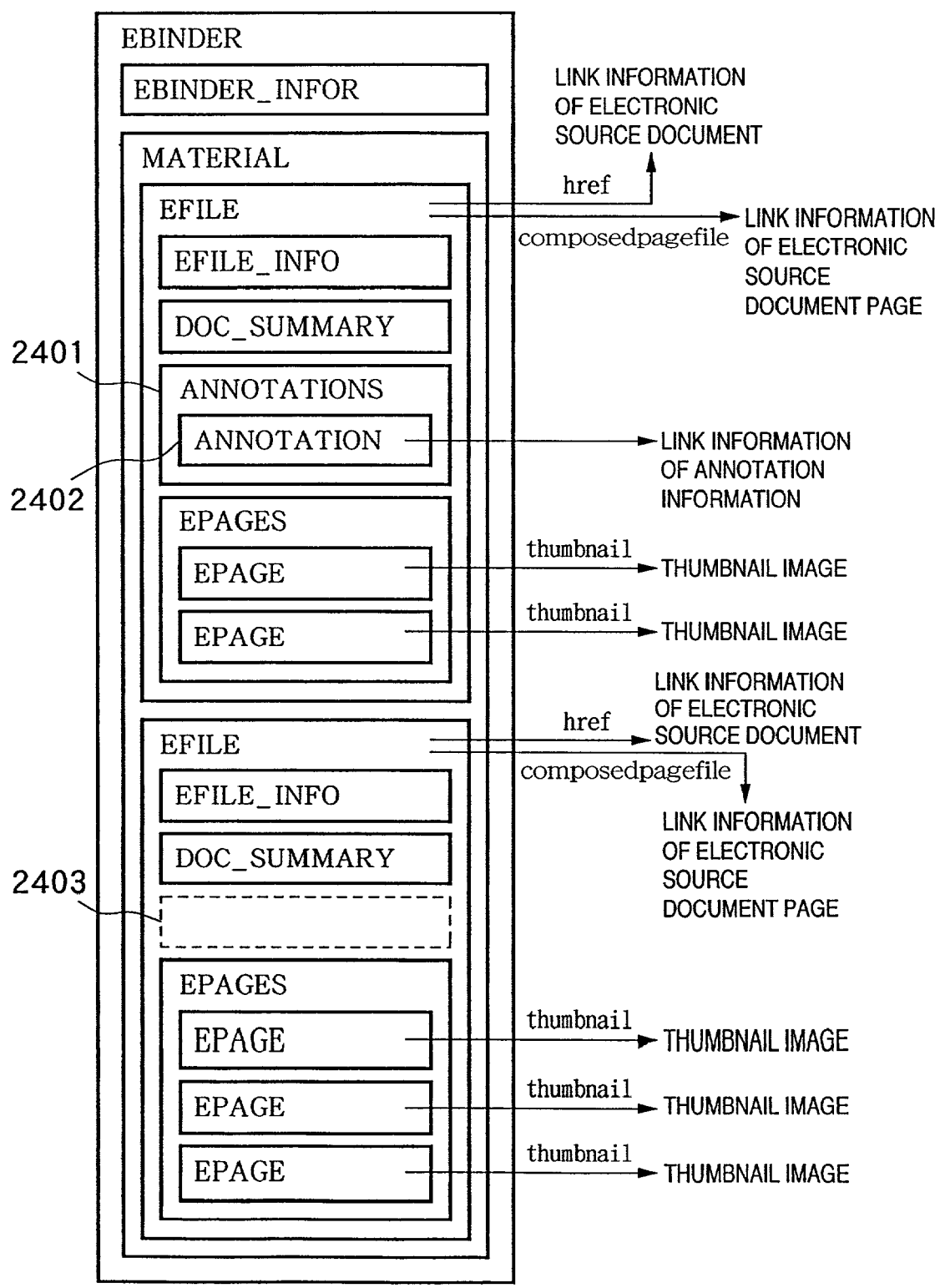
FIG. 23 is a view showing the format block structure of the electronic source document with annotation information attached thereto, composed by the electronic binder builder of the third embodiment.

In FIG. 23, annotation information is held in an ANNOTATION portion (2402) in an ANNOTATIONS portion (2401). The information may be held as an external file, or may be held in the ANNOTATION portion (2402) if it is in XML format. External files include, for example, image files and the FDF (Forms Data Format) of Adobe Co. An electronic source document that has no annotation information has no ANNOTATIONS portion as shown by reference numeral 2403.

Figure 24:
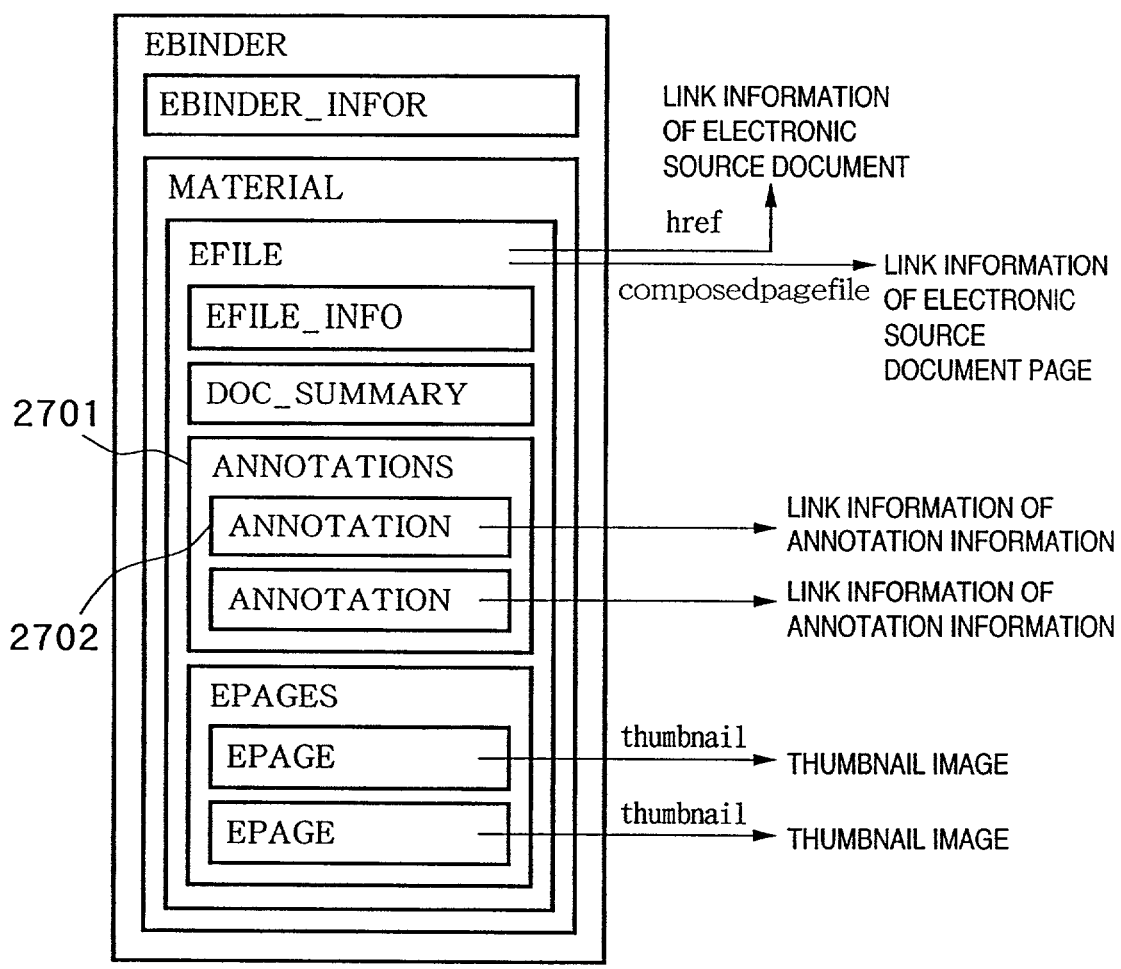
FIG. 24 is a view showing the format block structure of the electronic source document with annotation information attached thereto, composed by the electronic binder builder of the third embodiment.

Also, if annotation information is held per page, the document takes on a format block structure as shown in FIG. 24.

In FIG. 24, annotation information per page is held in the ANNOTATION portion (2702) in the ANNOTATIONS portion (2701).

A specific XML description in the case of holding annotation information will now be described using FIG. 25.

Excerpting a part of FIG. 2B, FIG. 25 shows the case where annotation information for all the electronic source documents is held with respect to a first electronic source document (2601), and annotation information is held in the second page with respect to a second electronic source document (2604).

In an <ANNOTATION> tag (2602) is described an <ANNOTATIONS> tag (2603) as shown below.

<ANNOTATON href="Material¥ef0001¥Anotation¥an0001.tiff" type="tiff" page="all"/>

Here, the href=shows that annotation information of all the electronic source documents is held. The annotation information for all the electronic source documents is determined from the value of page= being all. The type= shows the file format in which the annotation information is held. In this example, the format of the electronic source document page is an image format of tiff, but it may be FDF format or other file format.

Also, in an <ANNOTATIONS> tag (2605) are described <ANNOTATION> tags (2606) and (2607) as shown below.

---

<ANNOTATION href="Material¥ef0002¥Annotation¥an0002p0001.bmp" type="bmp" page="1"/>
  <ANNOTATION href="Material¥ef0002¥Annotation¥an0002p0003.bmp" type="bmp" page="3"/>

---

Here, the value of page= is a number (not all), and thus the annotation information per page is shown. Annotation information described by the href= is applied to the number of pages given by the value of page=. The type= shows a file format in which the annotation information is held. In this example, the format of the electronic source document is an image format of bmp, but it may be the FDF format or other file format.

Figure 26:
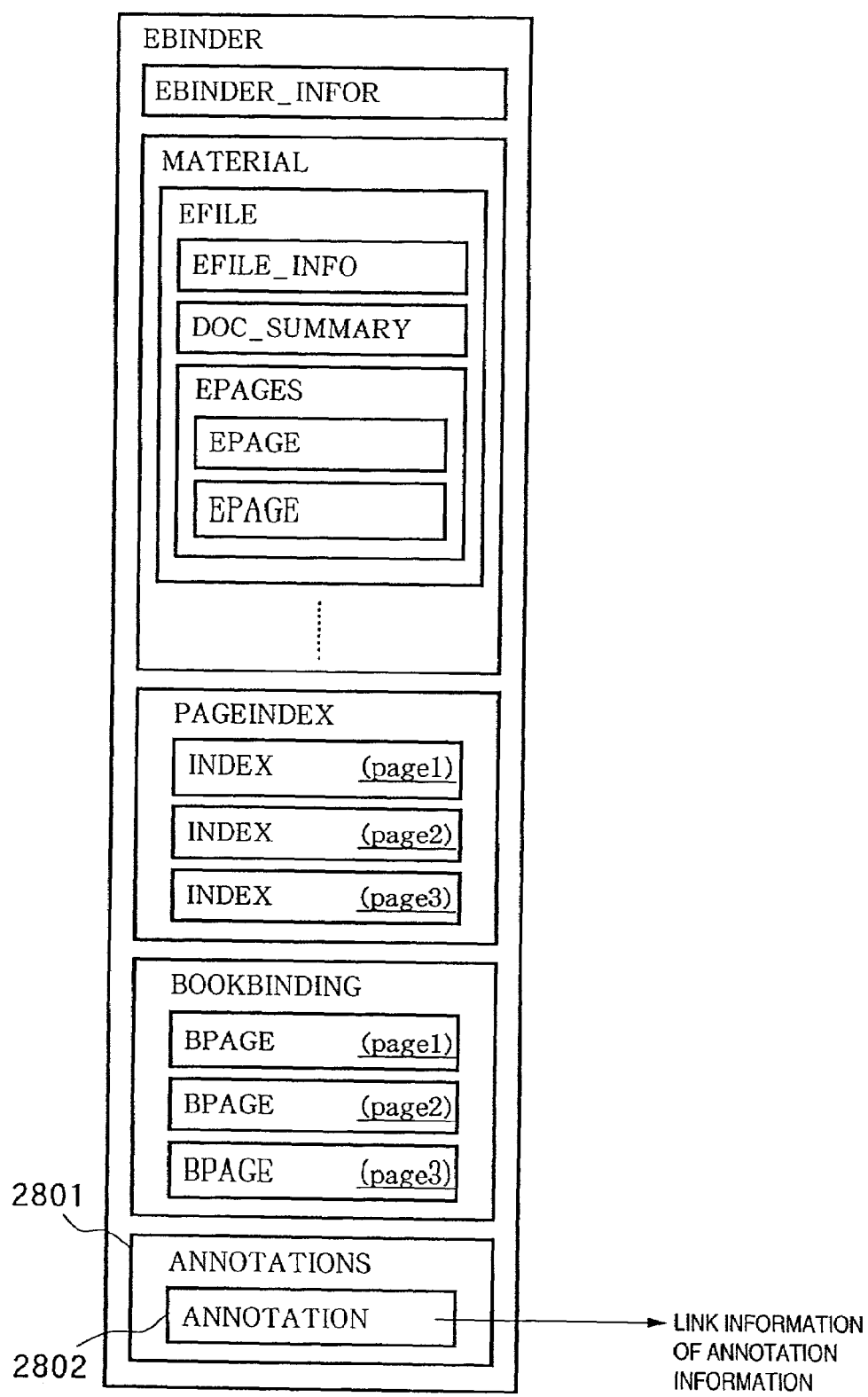
FIG. 26 is a view showing format block structure of the generated electronic document with annotation information attached thereto, composed by the electronic binder builder of the third embodiment.

In the case where the generated electronic document has annotation information, the document takes on a format block structure as shown in FIG. 26.

FIG. 26 shows a file format structure as in the case where the electronic source document has annotation information, wherein annotation information is held in an ANNOTATIONS portion (2801) and an ANNOTATION portion (2802) therein, as shown in FIGS. 23 and 24 described above. Also, as described with the above FIGS. 23 and 24, annotation information for all the electronic source documents and annotation information per page can be held in the ANNOTATION portion (2802).

A specific XML description in the case of having annotation information for all the generated electronic documents will now be described using FIG. 27.

In FIG. 27, in an <ANNOTATIONS> tag (2901) is described <ANNOTATIONS> tag (2902) as shown below.

<ANNOTATION href="Annotation¥annotation.tiff" type="tiff" page="all"/>

Here, the href= shows that annotation information for all the generated electronic documents is held. The annotation information for all the generated electronic documents is determined from the value of page= being all. The type= shows the file format in which the annotation information is held. In this example, the format of the electronic source document page is an image format of tiff, but it may be FDF format or other file format.

Also, a specific XML description in the case of having annotation information for each page of the generated electronic document will now be described using FIG. 28.

In FIG. 28, in an <ANNOTATIONS> tag (3001) is described an <ANNOTATION> tag (3002) as shown below.

---

<ANNOTATION href="Annotation¥annotation1.bmp" type="bmp" page="1"/>
  <ANNOTATION href="Annotation¥annotation3.bmp" type="bmp" page="3"/>

---

Here, the value of page= is a number (not all), and thus the annotation information per page is shown. Annotation information described by the href= is applied to the number of pages given by value of the page=. The type= shows a file format in which the annotation information is held. In this example, the format of the electronic source document is an image format of bmp, but it may be the FDF format or other file format.

A process for attaching annotation information to the generated electronic document will now be described. The file format structure having annotation information held in the generated electronic document is same as those described with FIGS. 26, 27 and 28, but in the case where annotation information is attached to the generated electronic document, the following two forms can be considered.

(A) Annotation information is newly attached.

(B) Annotation information is attached in such a manner that it is added to existing annotation information.

In the case of (A), the XML description shown in FIG. 27 or the XML description shown in FIG. 28 is adopted depending on whether annotation information is attached to the entire generated electronic document or annotation information is attached per page. In this case, the file format of annotation information may be any file format as long as its system can understand.

On the other hand, in the case of (B), existing annotation information attached to the electronic source document constituting the generated electronic document and annotation information that is attached to the generated electronic document must be first integrated into one file format. A process for further attaching annotation information in such a manner that it is added to the existing annotation information attached to the electronic source document constituting the generated electronic document will be described below, using the flowcharts in FIGS. 29A and 29B, and the examples of XML description of the generated electronic document in FIGS. 30 and 31 as specific examples thereof.

Figure 29A:
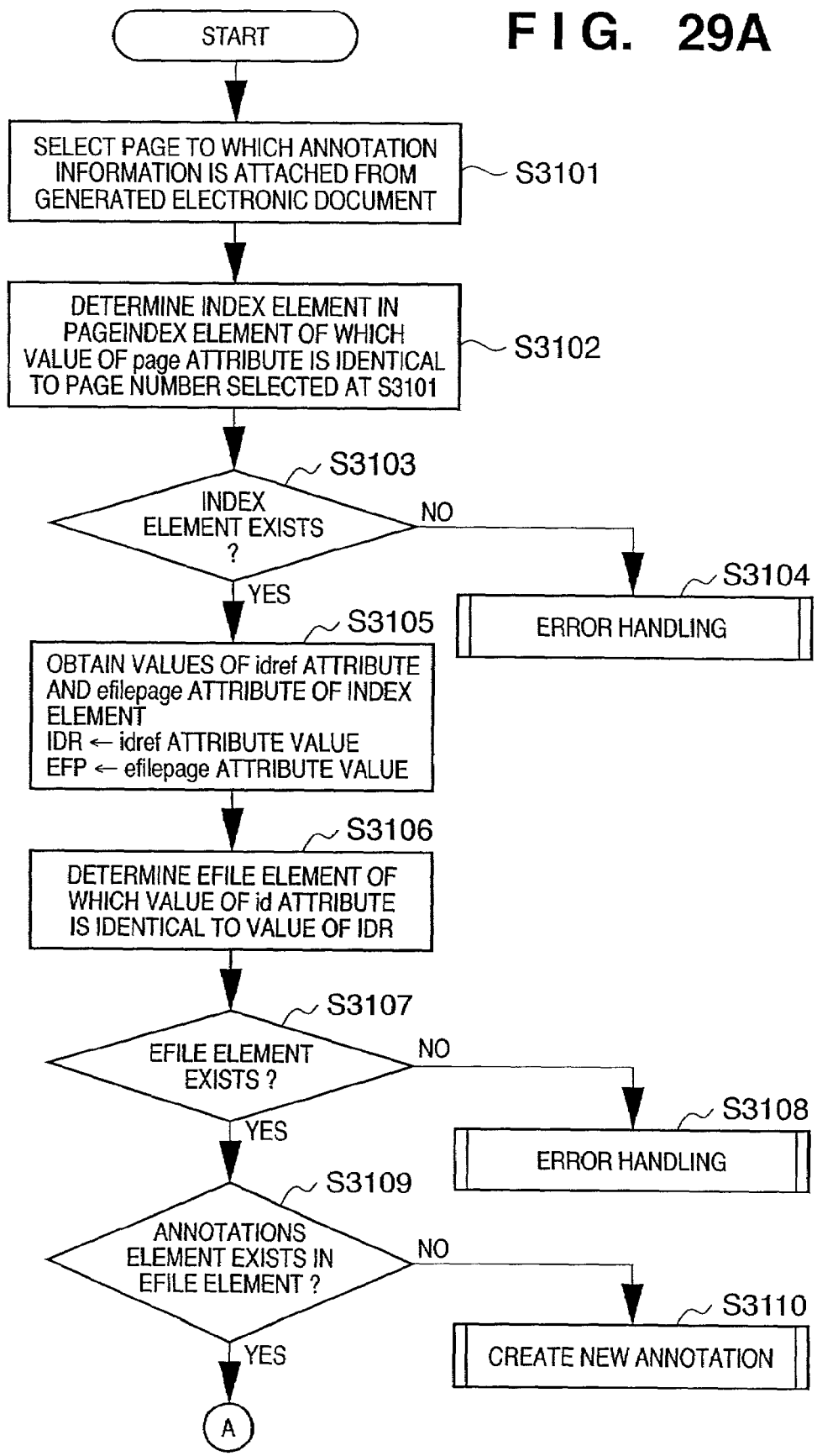
FIG. 29A is a flowchart showing a process for attaching annotation information to the generated electronic document of the third embodiment.
Figure 29B:
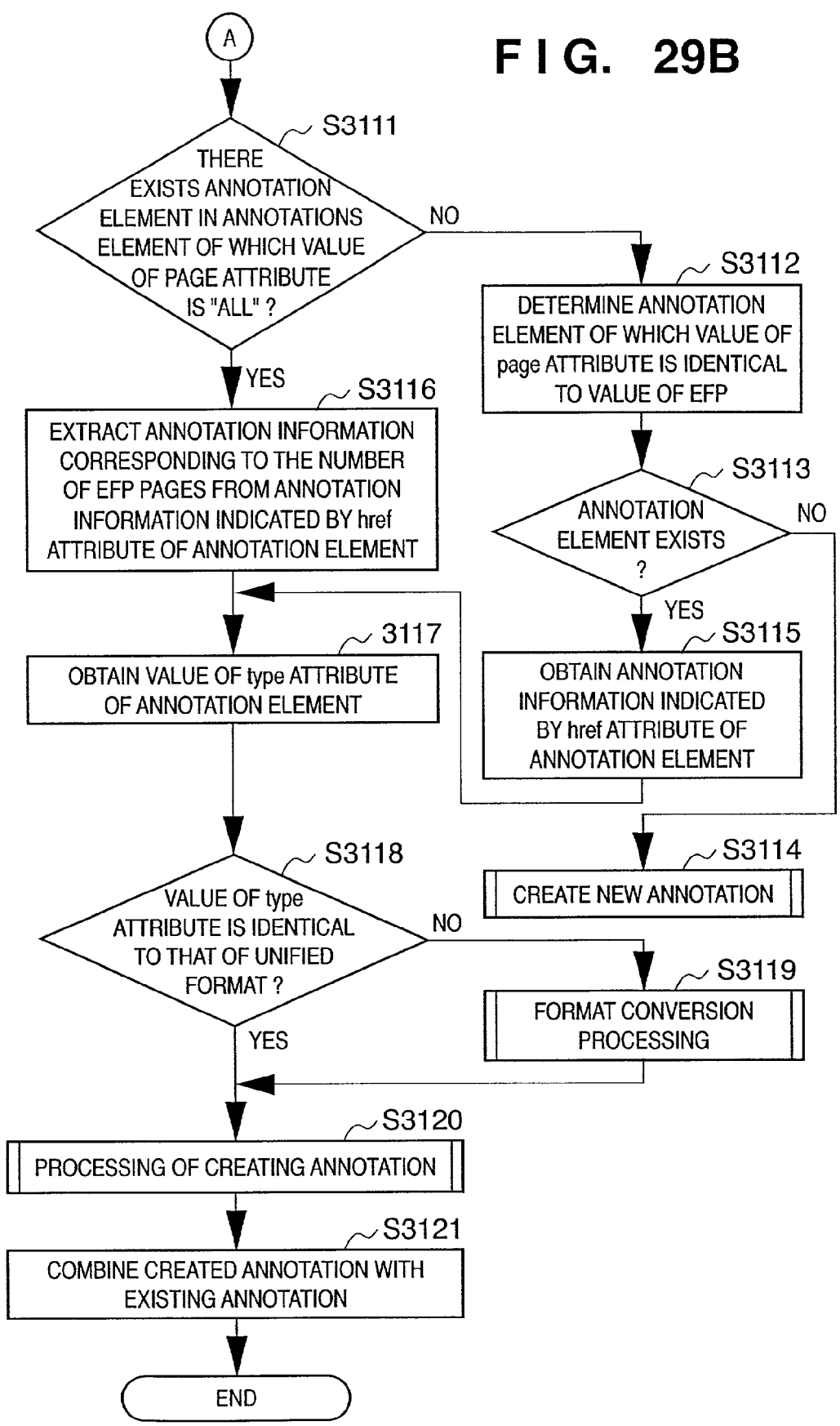
FIG. 29B is a flowchart showing a process for attaching annotation information to the generated electronic document of the third embodiment.

FIGS. 29A and 29B are flowcharts showing the process for attaching annotation information to the generated electronic document of the third embodiment.

In step S3101, a page to which annotation information is attached is selected from the generated electronic document. Here, as an example, the case is first considered where annotation information is attached to the second page of the generated electronic document. In step S3102, an INDEX element in a PAGEINDEX element corresponding to the page (second page) selected in step S3101 is obtained. In this case, it is the INDEX element 3201 in FIG. 30.

Then, in step S3103, whether or not an INDEX element corresponding to the selected page exists is determined. If it does not exist (NO in step S3103), the process proceeds to step S3104, where error handling is carried out. On the other hand, if it exists (YES in step S3103), the process proceeds to step S3105.

In step S3105, the value of the idref= and the value of the efilepage= of the INDEX element are obtained, and are stored in registers IDR and EFP, respectively. In this example, IDR= ef0001 and EFP=2 hold. Of EFILE elements, the EFILE element of which value of id= is identical to the value of IDR is determined, in step S3106. In the case of FIG. 30, EFILE elements are an EFILE element 3203 and an EFILE element 3204, and an EFILE element having the value of id= identical to the value of IDR is the EFILE element 3203.

In step S3107, whether or not there exists an EFILE element of which value is identical to the value of IDR is determined. If such an EFILE element does not exist (NO in step S3107), the process proceeds to step S3108, where error handling is carried out. On the other hand, if such an EFILE element exists (YES in step S3107), the process proceeds to step S3109.

In step S3109, whether or not an ANNOTATIONS element exists in the EFILE element is determined. If it does not exist (NO in step S3109), existing annotation information does not exist, and the process proceeds to step S3110, where processing of creating new annotation is performed. On the other hand, if it exists (YES in step S3109), the process proceeds to step S3111. In the case of FIG. 30, an ANNOTATIONS element 3205 exists in the EFILE element 3203.

In step S3111, whether or not the "all" exists in the value of page= of the ANNOTATION element in the ANNOTATIONS element is determined. In the case of FIG. 30, the value of page= of the ANNOTATION element 3206 in the ANNOTATIONS element 3205 is "all".

In step S3111, if the "all" exists (YES in step S3111), the process proceeds to step S3116, where annotation information corresponding to the value of EFP (the number of pages) is extracted from the annotation information indicated by the value of href= of the ANNOTATION element. Furthermore, in this case, although not clearly shown, error handling is carried out if there exists no corresponding annotation information.

On the other hand, if the "all" does not exist in step S3111 (NO in step S3111), the process proceeds to step S3112. At this point, the case is considered where after annotation information is attached to the second page of the generated electronic document, annotation information is attached to the first page of the generated electronic document shown in FIG. 30 (INDEX element 3202 in FIG. 30). In this case, for the INDEX element 3202 in FIG. 30, the ANNOTATIONS element to be subjected to processing of step S3109 is an ANNOTATIONS element 3207 in FIG. 30, and the value of the page= of the ANNOTATION element therein is not "all", and therefore the process proceeds from step S3111 to step S3112.

Of the values of the page= of each ANNOTATION element in the ANNOTATIONS element, the value identical to the value of EFP is determined, in step S3112. In FIG. 30, the value of the efilepage= of the INDEX element 3202 is "3", and thus the value of EFP is "3". Then, of two ANNOTATION elements 3208 and 3209 in the ANNOTATIONS element, the ANNOTATION element of which value of the page= is identical to the value of EFP is the ANNOTATION element 3209.

In step S3113, whether or not of the values of the page= of each ANNOTATION element in the ANNOTATIONS element, an ANNOTATION element of which value is identical to the value of EFP exists is determined. If such an ANNOTATION element does not exist (NO in step S3113), existing annotation information does not exist, and thus the process proceeds to step S3114, where processing of creating new annotation is performed. On the other hand, if such an ANNOTATION element exists (YES in step S3113), the process proceeds to step S3115.

In step S3115, annotation information indicated by the value of the href= of the ANNOTATION element is obtained. In step S3117, the value of the type= of the ANNOTATION element is determined. In step S3118, whether or not the unified format for use in annotation information and the format indicated by the value of the type= are identical to each other is determined. If they are not identical to each other, the process proceeds to step S3119, where format conversion processing for unifying the format of all annotation information that is attached to the generated electronic document is performed. Thereafter, the process proceeds to step S3120. On the other hand, if those formats are identical to each other (YES in step S3118), the process proceeds to step S3120.

In step S3120, annotation creation processing is performed. In step S3121, processing of superimposing the created annotation information over the existing annotation information obtained in steps S3115 and S3116, or converted in format in step S3119 is performed, and the annotation information is combined together and stored. This means that the XML description of annotation information as described above is added to the XML description of the generated electronic document to be attached, and is stored.

Now, an example of the XML description of the generated electronic document with annotation information added thereto through the above described processing is shown in FIG. 31. This is an example of using an image file format called bmp as a unified format that is used for annotation information. Annotation information 3301 in FIG. 31 is the annotation information added to the first and second pages of the generated electronic document.

As described above, according to the third embodiment, one integrated electronic document (generated electronic document) is created from a plurality of different electronic documents (electronic source documents) with annotation information attached thereto, and is composed as one electronic document in a situation in which the annotation information attached to the electronic source document is related closely with the annotation information newly added/further added to the integrated electronic document. That is, a single document structure can be provided in which relation between annotation information attached to the electronic source document and annotation information attached to the generated electronic document is maintained.

For example, if annotation information is further added to the electronic source document with annotation information attached thereto that constitutes the generated electronic document, the annotation information is combined together in such a manner that the file format of the annotation information attached to the electronic source document for composition is made to be identical to the file format of the annotation information that is further added to the generated electronic document, thereby making it possible to manage the generated electronic document efficiently as a generated electronic document with annotation information in unified file format attached thereto.

Also, even if the electronic source document with annotation information attached thereto that constitutes the generated electronic document is changed, the annotation information can be incorporated in the changed electronic source document.

Figure 32:
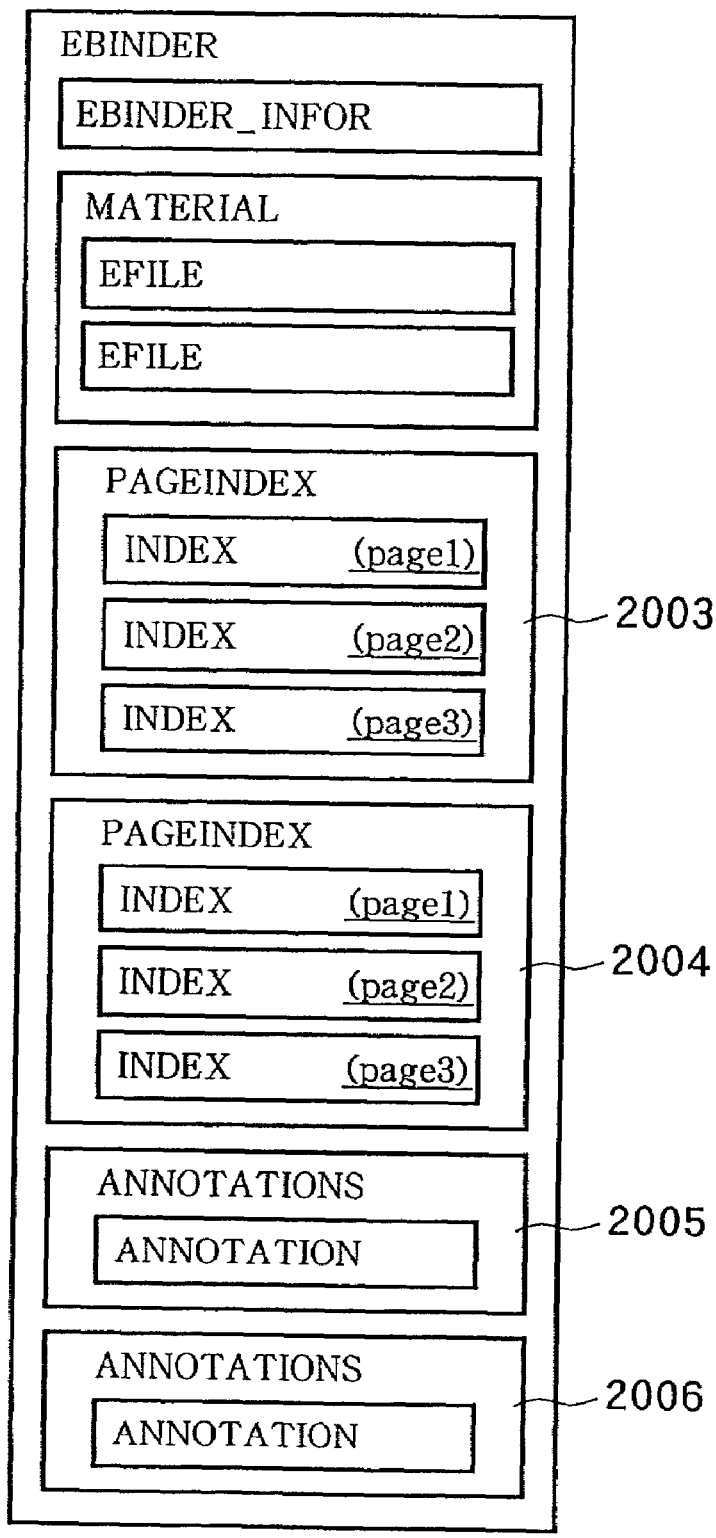
FIG. 32 is a view showing the format block structure of the generated electronic document composed by the electronic binder builder of the third embodiment.

A structure in the case of attaching annotation information with respect to the format block structure in FIG. 20B of the second embodiment is shown in FIG. 32.

Figure 33:
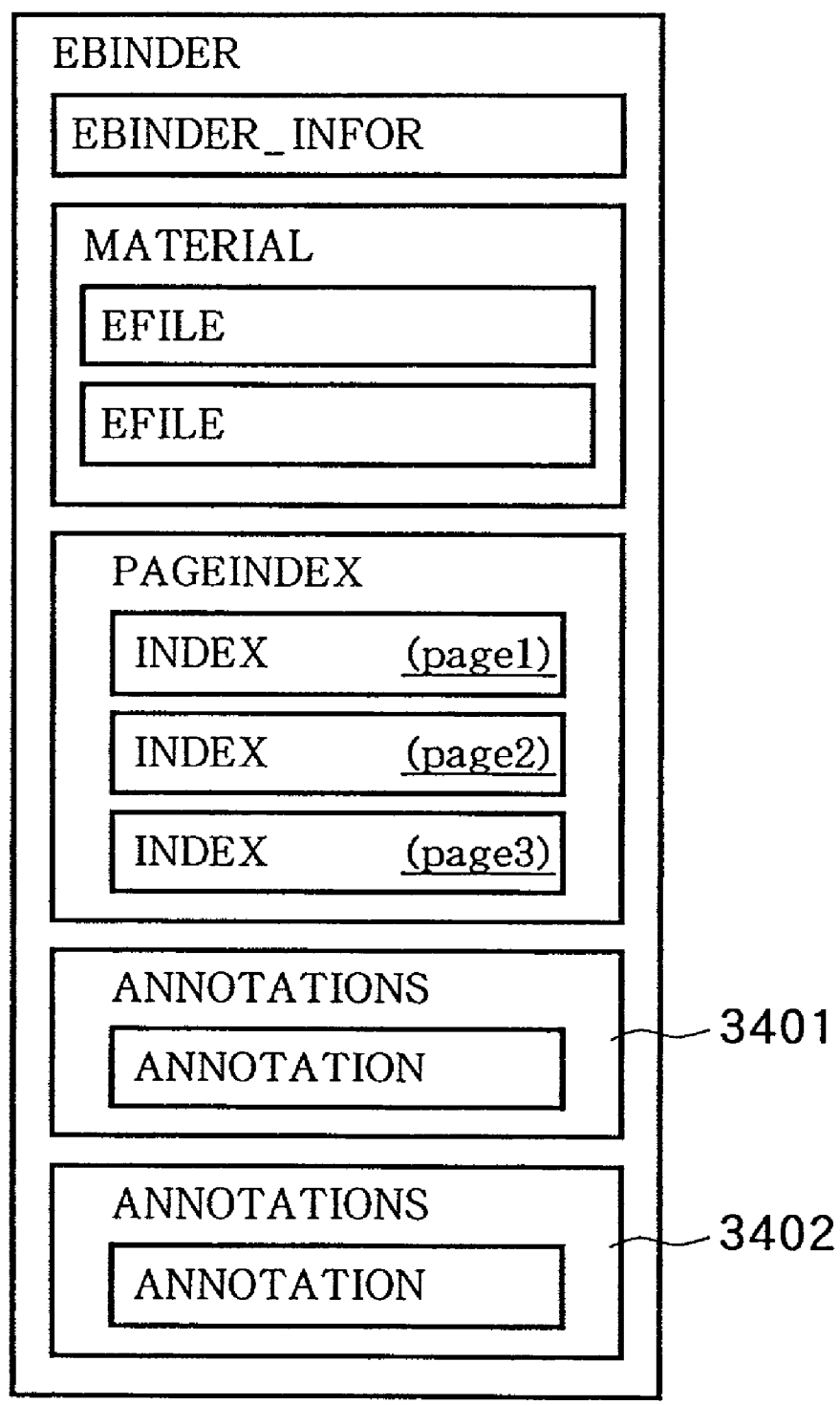
FIG. 33 is a view showing the format block structure of the generated electronic document composed by the electronic binder builder of the third embodiment.

Here, reference numerals 2005 and 2006 in FIG. 32 denote examples of structures in which annotation information is held in each of a plurality of generated electronic documents. Thereby, different annotation information can be added to each of a plurality of generated electronic documents. Also, reference numerals 3401 and 3402 in FIG. 33 denote examples of structures in which a plurality of annotation information is held in one generated electronic document. For example, it is possible to make changed points of a material known to the members inside the project using annotation information, and show the part in which pointed portions are enlightened (surrounded by circle, and so on) using annotation information in the case where the material is made available on the outside.

Also, the format (4) of the generated electronic document described in the second embodiment can also be applied to the third embodiment.

Figure 34:
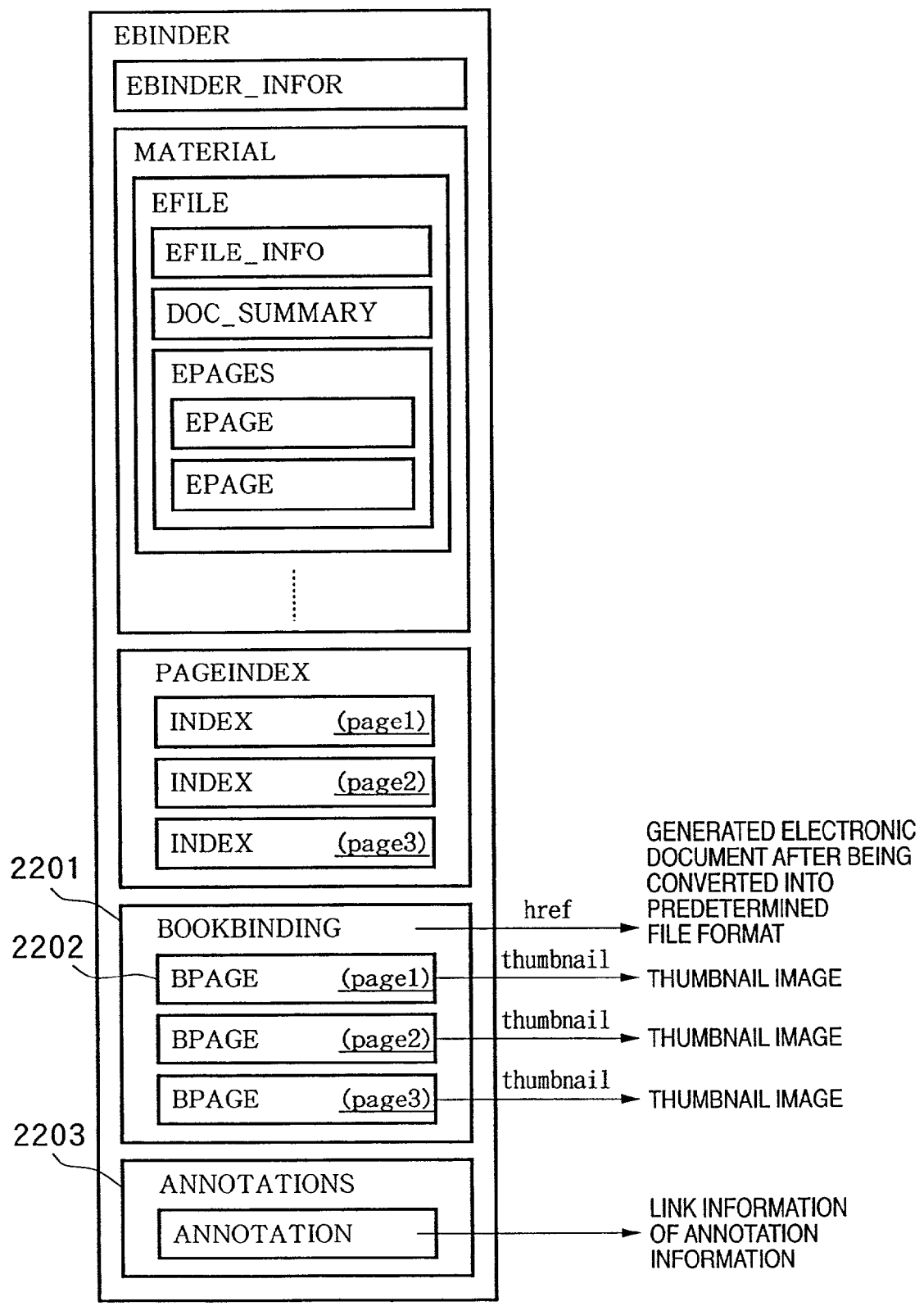
FIG. 34 is a view showing the format block structure of the generated electronic document composed by the electronic binder builder of the third embodiment.

A format block structure in this case is shown in FIG. 34. Information of the electronic source document (information showing which page of which electronic source document) is obtained for the BOOKBINDING portion 2201 of FIG. 34, using the PAGEINDEX portion and the thumbnail image of the electronic source document is extracted from the electronic source document and held. Also, annotation information is held. This state is as follows if shown with excerpts from the XML description of FIG. 2B.

```
<EBINDER>
  <MATERIAL files ="2">
    <EFILE href="Material¥ef0001¥Original¥F_c01.ppt"
type="pdf" totalpage="2" id="ef0001">
      <EFILE_INFO datatype="PowerPoint2000">
        . . . . .
      </EFILE_INFO>
    </EFILE>
    <EFILE->
      . . . . .
    </EFILE>
  </MATERIAL>
  <PAGEINDEX>
    <INDEX page="1" idref=" ef0002"efilepage="3"/>
    <INDEX page="2" idref="ef0001" efilepage="1"/>
    <INDEX page="3" idref="ef0002" efilepage="2"/>
  </PAGEINDEX>
  <BOOKBINDING href="Bookbinding¥bind.tiff" type="tiff">
    <BPAGE page="1" thumbnail="Bookbinding¥page1.png"/>
    <BPAGE page="2" thumbnail="Bookbinding¥page2.png"/>
    <BPAGE page="3" thumbnail="Bookbinding¥page3.png"/>
  </BOOKBINDING>
  <ANNOTATIONS>
    <ANNOTATION href="Annotation¥annotation.tiff"
type="tiff" page="all"/>
  </ANNOTATIONS>
</EBINDER>
```

It should be noted here that the portion of <EPAGES> to </EPAGES> does not exist below the <EFILE->, and the composedpagefile="Material¥efile0001.pdf is not described in the description of <EFILE->. The portion of <EPAGES> to </EPAGES> is not described because the description for holding the thumbnail image of the electronic source document is made in the BOOKBINDING portion, and thus redundancy should be prevented. However, it is possible to prepare the portion of <EPAGES> to </EPAGES> and make therein a description for holding the thumbnail image of the electronic source document, if redundancy is accepted. Also, the composedpagefile="Material¥efile0001.pdf is not described because the generated electronic document is created using the electronic source document including the electronic source document when it is required, which is characterisctic of this storage format. Even in this case, annotation information that is attached to the generated electronic document can be held. Also, in the case where annotation information exists also in the electronic source document, the annotation information can be held as in the case where it is attached to the generated electronic document. However, this storage form is characterized in that the total file size is reduced, and therefore it is not necessary to have annotation information for the electronic source document.

Also, as another storage format, there is a format in which the electronic source document itself is not stored, but only those divided per page created from the electronic source document are held. This can be applied to all the cases previously described where the electronic source document is stored, including how to hold annotation information. Specifically, it is described as follows.

```
<EBINDER>
  <MATERIAL files="2">
    <EFILE href="Material¥ef0001¥Original¥F_c01.ppt"
nohref="YES" type="pdf" totalpage="2" id="ef0001">
      <EFILE_INFO datatype="PowerPoint2000">
        . . . . .
      </EFILE INFO>
      <ANNOTATIONS>
        <ANNOTATION
href="Material¥ef0001¥Anotation¥an0001.tiff" type ="TIFF"
type="ALL"/>
      </ANNOTATIONS>
      <EPAGES>
        <EPAGE page="1"
thumbnail="Material¥ef0001¥thumb1.bmp">
        <EPAGE page="2"
thumbnail="Material¥ef0001¥thumb2.bmp¥>
      </EPAGES>
    </EFILE>
    <EFILE href="Material¥ef0001¥Original¥HTML.doc"
nohref="YES" composedpagefile="Material¥efile0002.pdf"
type="pdf" totalpage="3" id="ef0002">
      <EFILE_INFO datatype="Word2000">
        . . . . .
      </EFILE_INFO>
      <EPAGES>
        . . . . .
      </EPAGES>
    </EFILE>
  </MATERIAL>
</EBINDER>
```

In the <EFILE> portion of this description, an attribute of nohref="YES" is added. If this nohref attribute is YES, then it shows that the electronic source document itself does not exist. That is, for example, the href= "Material¥ef0001¥Original¥F_c01.ppt" is described, but a file shown by the href does not exist. In the case of such a storage format, edition operations such as rearrangement of pages can be performed even if the electronic source document is not held. In addition, since the annotation file remains held, edition relating to annotation can also be performed. The format can be used when the size of the electronic source document is large, one does not want to modify the material, one wants to perform edition operations but does not want to attach the material and so on.

Also, the previously described storage formats are for dealing with a plurality of files as shown in FIG. 4, but those may be combined together to form a compressed format.

Figure 35:
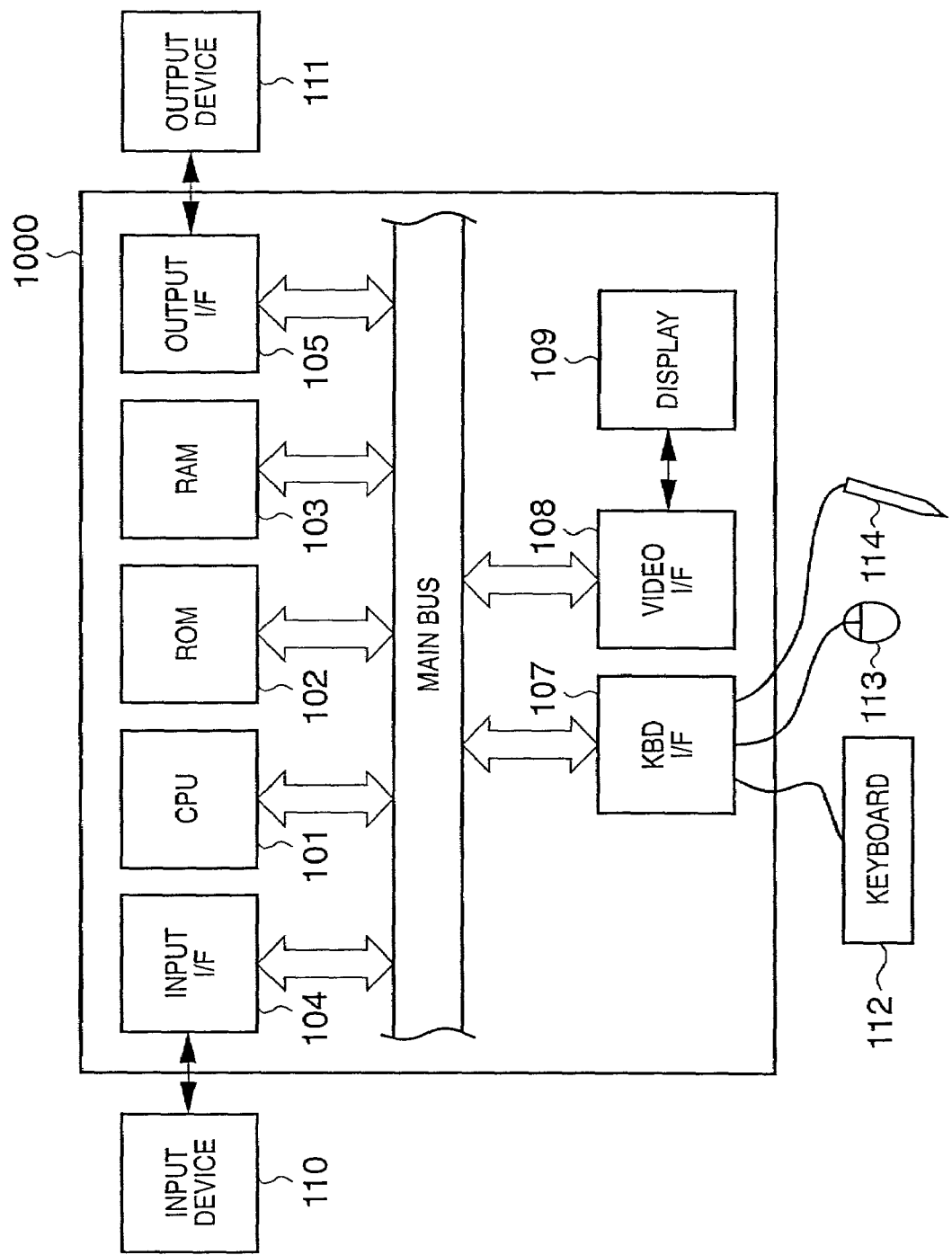
FIG. 35 is a block diagram showing the arrangement of an information processing apparatus applicable to the document management system of each embodiment of the present invention.

An information processing apparatus applicable to the above-described document management system of each embodiment of the present invention is shown in FIG. 35.

FIG. 35 is a block diagram showing the arrangement of the information processing apparatus applicable to the document management system of the present invention.

Referring to FIG. 22, a CPU 101 controls an entire information processing apparatus 1000 through a main bus 106 and also controls through an input I/F (interface) 104 an input device 110 (e.g., an image scanner, storage device, another information processing apparatus connected through a network line, or a facsimile apparatus connected through a telephone line) externally connected to the information processing apparatus 1000. The CPU 101 also controls through an output I/F (interface) 105 an output device 111 (e.g., a printer, monitor, another information processing apparatus connected through a network line, or a facsimile apparatus connected through a telephone line) externally connected to the information processing apparatus 1000. The CPU 101 executes a series of processing operations such as image input, image processing, color conversion processing, and image output control in accordance with an instruction input from an input section (e.g., a keyboard 112, pointing device 113, or pen 114) through a KBD I/F (keyboard interface) 107. The CPU 101 also controls through a video I/F (interface) 108 a display section 109 for displaying image data input from the input device 110 or image data created using the keyboard 112, pointing device 113, or pen 114.

A ROM 102 stores various control programs for executing various control operations of the CPU 101. An OS and control programs including a control program for implementing the present invention are loaded to a RAM 103 and executed by the CPU 101. The RAM 103 also functions as various work areas used to execute the control programs or temporary save area. In addition, a VRAM (not shown) for temporarily holding image data input from the input device 110 or image data created using the keyboard 112, pointing device 113, or pen 114 is constructed.

The present invention may be applied to either a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium which stores the program codes of software for implementing the functions of the above-described embodiments and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for attaching annotation information to an integrated electronic document composed of a plurality of kinds of electronic source documents, said apparatus comprising:

a computer processing unit controlling:

holding means for holding the plurality of kinds of electronic source documents, each source document being composed of a plurality of pages;

selection means for selecting at least one user-desired electronic source document page from a plurality of electronic source document pages which are created by converting each page of the electronic source document;

composition means for composing the integrated electronic document including the at least one user-desired electronic source document pages selected by said selection means, wherein the integrated electronic document includes first annotation information attached to the user-desired electronic source document pages; and attaching means for attaching second annotation information to the integrated electronic document, wherein, when automatically determining the file format of the first annotation information and the file format of the second annotation information are different, said attaching means unifies the file format of the first annotation information and the file format of the second annotation information by executing a format conversion process, and attaches the second annotation information of the unified format to the integrated electronic document.

2. The information processing apparatus according to claim 1, wherein each of the annotation information is attached to the whole pages of an electronic source document included in said integrated electronic document or each electronic source document page constituting the integrated electronic document.

3. An information processing method of attaching annotation information to an integrated electronic document composed of a plurality of kinds of electronic source documents, said method comprising:

a holding step of holding in a storage medium the plurality of kinds of electronic source documents, each electronic source document being composed of a plurality of pages;

a selection step of selecting at least one user-desired electronic source document pages from the plurality of electronic source document pages which are created by converting each page of the electronic source document;

a composition step of composing the integrated electronic document including the at least one user-desired electronic source document pages selected in said selection step, wherein the integrated electronic document includes first annotation information attached to the user-desired electronic source document pages; and an attaching step of attaching second annotation information to the integrated electronic document, wherein, when automatically determining the file format of the first annotation information and the file format of the second annotation information are different, said attaching step unifies the file format of the first annotation information and the file format of the second annotation information by executing a format conversion process, and attaches the second annotation information of the unified format to the integrated electronic document.

4. The information processing method according to claim 3, wherein each of the annotation information is attached to the whole pages of an electronic source document included in said integrated electronic document or each electronic source document page constituting the integrated electronic document.

5. The information processing method according to claim 3, wherein in said composition step, the electronic source document with said annotation information attached thereto constituting said integrated electronic document and the integrated electronic document with annotation information attached thereto are composed as one document.

6. The information processing method according to claim 5, wherein said composition step comprises a converting step of converting first annotation information attached to said electronic source document and second annotation information attached to said integrated electronic document into a predetermined file format.

7. A computer-readable memory which stores program codes of information processing for attaching annotation information to an integrated electronic document composed of a plurality of kinds of electronic source documents, said program codes comprising:

a program code of a holding step of holding in a storage medium the plurality of kinds of electronic source documents, each electronic source document being composed of a plurality of pages;

a program code of a selection step of selecting at least one user-desired electronic source document pages from the plurality of electronic source document pages which are created by converting each page of the electronic source document;

a program code of a composition step of composing the integrated electronic document including the at least one user-desired electronic source document pages selected in said selection step, wherein the integrated electronic document includes first annotation information attached to the user-desired electronic source document pages; and a program code of an attaching step of attaching second annotation information to the integrated electronic document, wherein, when automatically determining the file format of the first annotation information and the file format of the second annotation information are different, said attaching step unifies the file format of the first annotation information and the file format of the second annotation information by executing a format conversion process, and attaches the second annotation information of the unified format to the integrated electronic document.

* * * * *